(12) United States Patent
Milburn et al.

(10) Patent No.: US 12,253,944 B2
(45) Date of Patent: Mar. 18, 2025

(54) SYSTEMS AND METHODS FOR CACHING METADATA

(71) Applicant: Dover Microsystems, Inc., Wayland, MA (US)

(72) Inventors: Steven Milburn, Wayland, MA (US); Nirmal Nepal, Wayland, MA (US)

(73) Assignee: Dover Microsystems, Inc., Wayland, MA (US)

( * ) Notice: Subject to any disclaimer, the term of this patent is extended or adjusted under 35 U.S.C. 154(b) by 0 days.

(21) Appl. No.: 17/908,879

(22) PCT Filed: Mar. 3, 2021

(86) PCT No.: PCT/US2021/020602
§ 371 (c)(1),
(2) Date: Sep. 1, 2022

(87) PCT Pub. No.: WO2021/178493
PCT Pub. Date: Sep. 10, 2021

(65) Prior Publication Data
US 2024/0296122 A1 Sep. 5, 2024

Related U.S. Application Data

(60) Provisional application No. 62/984,730, filed on Mar. 3, 2020.

(51) Int. Cl.
*G06F 12/0802* (2016.01)
*G06F 12/1009* (2016.01)
*G06F 21/79* (2013.01)

(52) U.S. Cl.
CPC ...... *G06F 12/0802* (2013.01); *G06F 12/1009* (2013.01); *G06F 21/79* (2013.01)

(58) Field of Classification Search
CPC .. G06F 12/0802; G06F 12/1009; G06F 21/79; G06F 12/0895; G06F 12/0875; G06F 21/52; G06F 2212/452
See application file for complete search history.

(56) References Cited

U.S. PATENT DOCUMENTS 5,201,056 A 4/1993 Daniel et al.
5,377,336 A 12/1994 Eickemeyer et al.
(Continued)

FOREIGN PATENT DOCUMENTS

CN 101558388 A 10/2009
CN 102160033 A 8/2011
(Continued)

OTHER PUBLICATIONS

U.S. Appl. No. 16/062,796, filed Jun. 15, 2018, DeHon et al.
(Continued)

*Primary Examiner* — Rocio Del Mar Perez-Velez
*Assistant Examiner* — Tong B. Vo
(74) *Attorney, Agent, or Firm* — Wolf, Greenfield & Sacks, P.C.

(57) ABSTRACT

Systems and methods for caching metadata. In some embodiments, in response to an access request comprising an application memory address, it may be determined whether the application memory address matches an entry of at least one cache. In response to determining that the application memory address does not match any entry of the at least one cache: the application memory address may be used to retrieve application data; the application memory address may be mapped to at least one metadata memory address; and the at least one metadata memory address may be used to retrieve metadata corresponding to the application memory address. An entry in the at least one cache may be created, wherein: the entry is indexed by the application
(Continued)

memory address; and the entry stores both the application data retrieved using the application memory address, and the corresponding metadata retrieved using the at least one metadata memory address.

25 Claims, 17 Drawing Sheets

(56) References Cited

U.S. PATENT DOCUMENTS

| | | | |
|---|---|---|---|
| 5,488,730 A | 1/1996 | Brown, III et al. |
| 5,521,910 A | 5/1996 | Matthews |
| 5,559,952 A | 9/1996 | Fujimoto |
| 5,655,100 A | 8/1997 | Ebrahim et al. |
| 5,664,197 A | 9/1997 | Kardach et al. |
| 5,664,223 A | 9/1997 | Bender et al. |
| 5,684,977 A | 11/1997 | Van Loo et al. |
| 5,764,946 A | 6/1998 | Tran et al. |
| 5,778,423 A | 7/1998 | Sites et al. |
| 5,848,433 A | 12/1998 | Tran et al. |
| 5,890,008 A | 3/1999 | Panwar et al. |
| 5,941,981 A | 8/1999 | Tran |
| 6,014,734 A | 1/2000 | Tran et al. |
| 6,035,374 A | 3/2000 | Panwar et al. |
| 6,058,466 A | 5/2000 | Panwar et al. |
| 6,240,502 B1 | 5/2001 | Panwar et al. |
| 6,269,436 B1 | 7/2001 | Tran et al. |
| 6,298,432 B1 | 10/2001 | Goto |
| 6,321,297 B1 | 11/2001 | Shamanna et al. |
| 6,324,599 B1 | 11/2001 | Zhou et al. |
| 6,351,784 B1 | 2/2002 | Neal et al. |
| 6,438,673 B1 | 8/2002 | Jourdan et al. |
| 6,449,714 B1 | 9/2002 | Sinharoy |
| 6,549,903 B1 | 4/2003 | Babaian et al. |
| 6,549,959 B1 | 4/2003 | Yates et al. |
| 6,622,182 B1 | 9/2003 | Miller et al. |
| 6,625,146 B1 | 9/2003 | Merchant et al. |
| 6,636,523 B1 | 10/2003 | Lau et al. |
| 6,748,589 B1 | 6/2004 | Johnson et al. |
| 6,922,740 B2 | 7/2005 | Kondratiev et al. |
| 6,976,147 B1 | 12/2005 | Isaac et al. |
| 7,047,394 B1 | 5/2006 | Van Dyke et al. |
| 7,058,918 B2 | 6/2006 | Abramovici et al. |
| 7,095,783 B1 | 8/2006 | Sotheran et al. |
| 7,137,086 B2 | 11/2006 | Abramovici |
| 7,146,548 B1 | 12/2006 | Abramovici |
| 7,213,247 B1 | 5/2007 | Wilner et al. |
| 7,263,572 B2 | 8/2007 | Hiji |
| 7,296,201 B2 | 11/2007 | Abramovici |
| 7,301,541 B2 | 11/2007 | Hansen et al. |
| 7,305,635 B1 | 12/2007 | Abramovici et al. |
| 7,313,820 B2 | 12/2007 | Kilroy |
| 7,340,469 B1 | 3/2008 | Alghathbar et al. |
| 7,348,796 B2 | 3/2008 | Crouch et al. |
| 7,426,705 B1 | 9/2008 | Kolaric |
| 7,430,650 B1 | 9/2008 | Ross |
| 7,434,002 B1 | 10/2008 | Zedlewski et al. |
| 7,467,414 B2 | 12/2008 | Schlesinger |
| 7,487,264 B2 | 2/2009 | Pandya |
| 7,493,247 B2 | 2/2009 | Memmi |
| 7,493,434 B1 | 2/2009 | Abramovici |
| 7,574,536 B2 | 8/2009 | Johnsen et al. |
| 7,580,914 B2 | 8/2009 | Wang et al. |
| 7,581,064 B1 | 8/2009 | Zedlewski et al. |
| 7,631,107 B2 | 12/2009 | Pandya |
| 7,688,838 B1 | 3/2010 | Aloni et al. |
| 7,698,402 B2 | 4/2010 | Santos et al. |
| 7,813,342 B2 | 10/2010 | Gadelrab |
| 7,886,148 B2 | 2/2011 | Kiriansky et al. |
| 8,074,052 B2 | 12/2011 | Iadonato et al. |
| 8,121,828 B2 | 2/2012 | Yates, Jr. et al. |
| 8,127,121 B2 | 2/2012 | Yates, Jr. et al. |
| 8,131,663 B1 | 3/2012 | Taylor |
| 8,131,762 B2 | 3/2012 | Smetters et al. |
| 8,166,404 B2 | 4/2012 | Grinstein |
| 8,181,219 B2 | 5/2012 | Golan et al. |
| 8,271,447 B1 | 9/2012 | Natanzon et al. |
| 8,326,774 B2 | 12/2012 | Candelore |
| 8,335,754 B2 | 12/2012 | Dawson et al. |
| 8,346,760 B2 | 1/2013 | Wang et al. |
| 8,364,910 B2 | 1/2013 | Wilkerson et al. |
| 8,380,933 B2 | 2/2013 | Uchiyama |
| 8,423,720 B2 | 4/2013 | Döring |
| 8,516,193 B1 | 8/2013 | Clinton et al. |
| 8,543,606 B2 | 9/2013 | Pulfer et al. |
| 8,572,410 B1 | 10/2013 | Tkacik et al. |
| 8,677,457 B2 | 3/2014 | Fullerton |
| 8,701,200 B2 | 4/2014 | Naldurg et al. |
| 8,738,860 B1 | 5/2014 | Griffin et al. |
| 8,756,185 B2 | 6/2014 | Dawson et al. |
| 8,788,792 B2 | 7/2014 | Yates, Jr. et al. |
| 8,826,391 B2 | 9/2014 | Tkacik et al. |
| 8,843,734 B2 | 9/2014 | Lim |
| 8,904,477 B2 | 9/2014 | Barton et al. |
| 8,874,850 B1 | 10/2014 | Goodson et al. |
| 8,875,170 B1 | 10/2014 | Daniel |
| 8,887,230 B2 | 11/2014 | Barton et al. |
| 8,938,783 B2 | 1/2015 | Becker et al. |
| 9,026,733 B1 | 5/2015 | Clinton et al. |
| 9,047,178 B2 | 6/2015 | Talagala et al. |
| 9,087,200 B2 | 7/2015 | McKeen et al. |
| 9,165,078 B2 | 10/2015 | Bester et al. |
| 9,208,082 B1 | 12/2015 | Cheriton et al. |
| 9,219,752 B2 | 12/2015 | Balinksy et al. |
| 9,251,052 B2 | 2/2016 | Talagala et al. |
| 9,311,093 B2 | 4/2016 | Gschwind et al. |
| 9,317,708 B2 | 4/2016 | Lee et al. |
| 9,323,684 B2 | 4/2016 | Koker et al. |
| 9,467,474 B2 | 10/2016 | Barton et al. |
| 9,507,589 B2 | 11/2016 | Rao et al. |
| 9,507,598 B1 | 11/2016 | Bonnano et al. |
| 9,513,884 B2 | 12/2016 | Bates et al. |
| 9,525,606 B1 | 12/2016 | Staggs et al. |
| 9,571,509 B1 | 2/2017 | Satish et al. |
| 9,576,147 B1 | 2/2017 | McClintock et al. |
| 9,665,603 B2 | 5/2017 | Bester et al. |
| 9,680,736 B2 | 6/2017 | Kamboh |
| 9,680,738 B2 | 6/2017 | Jackson et al. |
| 9,703,956 B1 | 7/2017 | Watson et al. |
| 9,736,185 B1 | 8/2017 | Belamaric et al. |
| 9,785,440 B2 | 10/2017 | DeHon |
| 9,792,472 B1 | 10/2017 | Robshaw et al. |
| 9,906,557 B2 | 2/2018 | Hsiung et al. |
| 9,953,095 B1 | 4/2018 | Scott et al. |
| 10,073,977 B2 | 9/2018 | Pappachan et al. |
| 10,078,763 B2 | 9/2018 | Chiricescu et al. |
| 10,114,958 B2 | 10/2018 | Sell |
| 10,133,866 B1 | 11/2018 | Kumar et al. |
| 10,152,330 B2 | 12/2018 | Chiricescu et al. |
| 10,235,176 B2 | 3/2019 | DeHon et al. |
| 10,261,794 B2 | 4/2019 | DeHon |
| 10,424,043 B1 | 9/2019 | Koston et al. |
| 10,503,904 B1 | 12/2019 | Singh et al. |
| 10,521,230 B2 | 12/2019 | DeHon |
| 10,545,760 B2 | 1/2020 | DeHon |
| 10,642,616 B2 | 5/2020 | DeHon et al. |
| 10,642,753 B1 | 5/2020 | Steinberg |
| 10,719,630 B2 | 7/2020 | Chiricescu et al. |
| 10,725,778 B2 | 7/2020 | DeHon et al. |
| 10,754,650 B2 | 8/2020 | DeHon et al. |
| 10,936,713 B2 | 3/2021 | DeHon et al. |
| 11,150,910 B2 | 10/2021 | Milburn et al. |
| 11,182,162 B2 | 11/2021 | DeHon et al. |
| 11,340,902 B2 | 5/2022 | DeHon |
| 11,417,109 B1 | 8/2022 | Theimer et al. |
| 11,507,373 B2 | 11/2022 | Dehon et al. |
| 11,556,664 B2 | 1/2023 | Levy et al. |
| 11,635,960 B2 | 4/2023 | DeHon |
| 2002/0083298 A1 | 6/2002 | Cook et al. |
| 2002/0087795 A1 | 7/2002 | Hum et al. |
| 2002/0124156 A1 | 9/2002 | Yoaz et al. |
| 2003/0014466 A1 | 1/2003 | Berger et al. |
| 2003/0023783 A1 | 1/2003 | Arimilli et al. |

(56) References Cited

U.S. PATENT DOCUMENTS

| | | |
|---|---|---|
| 2003/0058889 A1 | 3/2003 | Lansing et al. |
| 2003/0120892 A1 | 6/2003 | Hum et al. |
| 2003/0145235 A1 | 7/2003 | Choo |
| 2003/0149895 A1 | 8/2003 | Choo et al. |
| 2003/0172109 A1 | 9/2003 | Dalton et al. |
| 2003/0196108 A1 | 10/2003 | Kung |
| 2004/0015845 A1 | 1/2004 | Hickman |
| 2004/0117599 A1 | 6/2004 | Mittal et al. |
| 2004/0133777 A1 | 7/2004 | Kiriansky et al. |
| 2004/0236876 A1 | 11/2004 | Kondratiev et al. |
| 2004/0255267 A1 | 12/2004 | Meijer |
| 2005/0055565 A1 | 3/2005 | Fournet et al. |
| 2005/0108518 A1 | 5/2005 | Pandya |
| 2005/0149521 A1 | 7/2005 | Wang et al. |
| 2005/0149719 A1 | 7/2005 | Kilroy |
| 2005/0154838 A1 | 7/2005 | DeWitt et al. |
| 2005/0182667 A1 | 8/2005 | Metzger et al. |
| 2006/0004548 A1 | 1/2006 | Santos et al. |
| 2006/0059567 A1 | 3/2006 | Bird et al. |
| 2006/0080489 A1 | 4/2006 | Hiji |
| 2006/0080553 A1 | 4/2006 | Hall |
| 2006/0090084 A1 | 4/2006 | Buer |
| 2006/0112261 A1 | 5/2006 | Yourst et al. |
| 2006/0143689 A1 | 6/2006 | Yu et al. |
| 2006/0242332 A1 | 10/2006 | Johnsen et al. |
| 2006/0277392 A1 | 12/2006 | Bittner, Jr. |
| 2007/0006294 A1 | 1/2007 | Hunter |
| 2007/0050586 A1 | 3/2007 | Shin et al. |
| 2007/0226365 A1 | 9/2007 | Hildreth et al. |
| 2007/0239861 A1 | 10/2007 | Reeves et al. |
| 2007/0261033 A1 | 11/2007 | Chen et al. |
| 2007/0279264 A1 | 12/2007 | Nakagawa |
| 2008/0010233 A1 | 1/2008 | Sack et al. |
| 2008/0016547 A1 | 1/2008 | Anderson et al. |
| 2008/0028196 A1 | 1/2008 | Kailas |
| 2008/0052488 A1 | 2/2008 | Fritz et al. |
| 2008/0066160 A1 | 3/2008 | Becker et al. |
| 2008/0083298 A1 | 4/2008 | Lin |
| 2008/0126841 A1 | 5/2008 | Benhanokh et al. |
| 2008/0140737 A1 | 6/2008 | Garst et al. |
| 2008/0168529 A1 | 7/2008 | Anderson et al. |
| 2008/0201333 A1 | 8/2008 | Rowley |
| 2008/0216073 A1 | 9/2008 | Yates et al. |
| 2008/0216102 A1 | 9/2008 | Quinn |
| 2008/0222397 A1 | 9/2008 | Wilkerson et al. |
| 2008/0240111 A1 | 10/2008 | Gadelrab |
| 2008/0244232 A1 | 10/2008 | Sherman et al. |
| 2008/0248599 A1 | 10/2008 | Jaiswal et al. |
| 2008/0250216 A1 | 10/2008 | Kershaw et al. |
| 2008/0282040 A1 | 11/2008 | Doring |
| 2008/0282093 A1 | 11/2008 | Hatakeyama |
| 2008/0288941 A1 | 11/2008 | Adams et al. |
| 2008/0301256 A1 | 12/2008 | McWilliams et al. |
| 2008/0301471 A1 | 12/2008 | Demarest et al. |
| 2008/0320235 A1 | 12/2008 | Beckmann et al. |
| 2009/0006519 A1 | 1/2009 | Nandan et al. |
| 2009/0063951 A1 | 3/2009 | Rjaibi et al. |
| 2009/0097815 A1 | 4/2009 | Lahr et al. |
| 2009/0113110 A1 | 4/2009 | Chen et al. |
| 2009/0113132 A1 | 4/2009 | Cain, III et al. |
| 2009/0113135 A1 | 4/2009 | Cain et al. |
| 2009/0144388 A1 | 6/2009 | Gross et al. |
| 2009/0164705 A1 | 6/2009 | Gorobets |
| 2009/0164766 A1 | 6/2009 | Suggs et al. |
| 2009/0165078 A1 | 6/2009 | Samudrala et al. |
| 2009/0178102 A1 | 7/2009 | Alghathbar et al. |
| 2009/0204785 A1 | 8/2009 | Yates, Jr. et al. |
| 2009/0241097 A1 | 9/2009 | Wang et al. |
| 2009/0254543 A1 | 10/2009 | Ber et al. |
| 2009/0254572 A1 | 10/2009 | Redlich et al. |
| 2010/0011209 A1 | 1/2010 | Kiriansky et al. |
| 2010/0011446 A1 | 1/2010 | Klucher et al. |
| 2010/0022869 A1 | 1/2010 | Kimura |
| 2010/0049974 A1 | 2/2010 | Winjum et al. |
| 2010/0138613 A1 | 6/2010 | Parker |
| 2010/0154026 A1 | 6/2010 | Chatterjee et al. |
| 2010/0169382 A1 | 7/2010 | Sheaffer et al. |
| 2010/0191922 A1 | 7/2010 | Dickey et al. |
| 2010/0228693 A1 | 9/2010 | Dawson et al. |
| 2010/0235580 A1 | 9/2010 | Bouvier |
| 2010/0250729 A1 | 9/2010 | Morris |
| 2010/0332456 A1 | 12/2010 | Prahlad et al. |
| 2010/0332716 A1 | 12/2010 | Sheaffer et al. |
| 2011/0016295 A1 | 1/2011 | Catherwood et al. |
| 2011/0078389 A1 | 3/2011 | Patel et al. |
| 2011/0099336 A1 | 4/2011 | Yasufuku et al. |
| 2011/0126265 A1 | 5/2011 | Fullerton |
| 2011/0161623 A1 | 6/2011 | Eichenberger et al. |
| 2011/0219424 A1 | 9/2011 | Panasyuk et al. |
| 2011/0238805 A1 | 9/2011 | Signori |
| 2012/0036507 A1 | 2/2012 | Jonnala et al. |
| 2012/0079458 A1 | 3/2012 | Williams et al. |
| 2012/0117610 A1 | 5/2012 | Pandya |
| 2012/0144167 A1 | 6/2012 | Yates, Jr. et al. |
| 2012/0151184 A1 | 6/2012 | Wilkerson et al. |
| 2012/0180031 A1 | 7/2012 | Eichenberger et al. |
| 2012/0203970 A1 | 8/2012 | Biran et al. |
| 2012/0210066 A1 | 8/2012 | Joshi et al. |
| 2012/0210068 A1 | 8/2012 | Joshi et al. |
| 2012/0233212 A1 | 9/2012 | Newton et al. |
| 2012/0236756 A1 | 9/2012 | Bennett et al. |
| 2012/0255018 A1 | 10/2012 | Sallam |
| 2012/0297057 A1 | 11/2012 | Ghosh et al. |
| 2013/0006993 A1 | 1/2013 | Kobayashi |
| 2013/0010779 A1 | 1/2013 | Fischer et al. |
| 2013/0016075 A1 | 1/2013 | Kim et al. |
| 2013/0047142 A1 | 2/2013 | Bates et al. |
| 2013/0067593 A1 | 3/2013 | Candelore |
| 2013/0081134 A1 | 3/2013 | Glew et al. |
| 2013/0097369 A1 | 4/2013 | Talagala et al. |
| 2013/0097421 A1 | 4/2013 | Lim |
| 2013/0097667 A1 | 4/2013 | Pulfer et al. |
| 2013/0138892 A1 | 5/2013 | Loh et al. |
| 2013/0159726 A1 | 6/2013 | McKeen et al. |
| 2013/0160075 A1 | 6/2013 | Schlesinger et al. |
| 2013/0160775 A1 | 6/2013 | Curnow |
| 2013/0185475 A1 | 7/2013 | Talagala et al. |
| 2013/0185488 A1 | 7/2013 | Talagala et al. |
| 2013/0212321 A1 | 8/2013 | Talagala et al. |
| 2013/0227218 A1 | 8/2013 | Chang et al. |
| 2013/0254838 A1 | 9/2013 | Ahuja et al. |
| 2013/0275656 A1 | 10/2013 | Talagala et al. |
| 2013/0283017 A1 | 10/2013 | Wilkerson et al. |
| 2013/0290607 A1 | 10/2013 | Chang et al. |
| 2013/0312099 A1 | 11/2013 | Edwards et al. |
| 2013/0326117 A1 | 12/2013 | Aune |
| 2014/0006804 A1 | 1/2014 | Tkacik et al. |
| 2014/0019385 A1 | 1/2014 | Dawson et al. |
| 2014/0047181 A1 | 2/2014 | Peterson et al. |
| 2014/0047183 A1 | 2/2014 | Chawla et al. |
| 2014/0101396 A1 | 4/2014 | Bonanno et al. |
| 2014/0140342 A1 | 5/2014 | Narad |
| 2014/0173211 A1 | 6/2014 | Loh et al. |
| 2014/0223445 A1 | 8/2014 | Beckmann et al. |
| 2014/0280248 A1 | 9/2014 | Bester et al. |
| 2014/0281192 A1 | 9/2014 | Gilda et al. |
| 2014/0282832 A1 | 9/2014 | Chanoch et al. |
| 2014/0283040 A1 | 9/2014 | Wilkerson et al. |
| 2014/0283107 A1 | 9/2014 | Walton et al. |
| 2015/0012689 A1 | 1/2015 | Atkisson et al. |
| 2015/0046658 A1 | 2/2015 | Wilson |
| 2015/0058997 A1 | 2/2015 | Lee et al. |
| 2015/0089186 A1 | 3/2015 | Kim et al. |
| 2015/0092778 A1 | 4/2015 | Jackson et al. |
| 2015/0120699 A1 | 4/2015 | Faerber et al. |
| 2015/0149673 A1 | 5/2015 | Balkan et al. |
| 2015/0205535 A1 | 7/2015 | Joshi et al. |
| 2015/0220453 A1 | 8/2015 | Heisswolf et al. |
| 2015/0249668 A1 | 9/2015 | Reddy et al. |
| 2015/0278311 A1 | 10/2015 | Isherwood et al. |
| 2015/0339062 A1 | 11/2015 | Toyoda et al. |
| 2015/0339329 A1 | 11/2015 | Bester et al. |
| 2015/0378780 A1 | 12/2015 | Busaba et al. |
| 2015/0381660 A1 | 12/2015 | Hsiung et al. |

(56) References Cited

U.S. PATENT DOCUMENTS

| | | |
|---|---|---|
| 2016/0048551 A1 | 2/2016 | Baldwin et al. |
| 2016/0062803 A1 | 3/2016 | Beckmann et al. |
| 2016/0077816 A1 | 3/2016 | Eilam et al. |
| 2016/0092702 A1 | 3/2016 | Durham et al. |
| 2016/0132536 A1 | 5/2016 | Lee |
| 2016/0140363 A1 | 5/2016 | Chiricescu et al. |
| 2016/0154833 A1 | 6/2016 | Isherwood, Jr. et al. |
| 2016/0170769 A1 | 6/2016 | LeMay |
| 2016/0182408 A1 | 6/2016 | Jani et al. |
| 2016/0188891 A1 | 6/2016 | Schlesinger et al. |
| 2016/0196432 A1 | 7/2016 | Main et al. |
| 2016/0239223 A9 | 8/2016 | Joshi et al. |
| 2016/0274810 A1 | 9/2016 | Godard et al. |
| 2016/0335187 A1 | 11/2016 | Greenspan et al. |
| 2016/0350019 A1 | 12/2016 | Koufaty et al. |
| 2016/0350230 A1 | 12/2016 | Murphy |
| 2016/0366102 A1 | 12/2016 | Smith |
| 2016/0371496 A1 | 12/2016 | Sell |
| 2017/0024568 A1 | 1/2017 | Pappachan et al. |
| 2017/0031708 A1 | 2/2017 | Chen et al. |
| 2017/0048249 A1 | 2/2017 | Berrangé |
| 2017/0061160 A1 | 3/2017 | Simonov et al. |
| 2017/0083338 A1 | 3/2017 | Burger et al. |
| 2017/0091107 A1 | 3/2017 | Peterson et al. |
| 2017/0126687 A1 | 5/2017 | Martinelli |
| 2017/0126738 A1 | 5/2017 | Wilkerson et al. |
| 2017/0177367 A1 | 6/2017 | DeHon |
| 2017/0177368 A1 | 6/2017 | DeHon et al. |
| 2017/0192986 A1 | 7/2017 | Isherwood et al. |
| 2017/0220806 A1 | 8/2017 | Munoz et al. |
| 2017/0235840 A1 | 8/2017 | Bester et al. |
| 2017/0286119 A1 | 10/2017 | Al Sheikh et al. |
| 2017/0286151 A1 | 10/2017 | Landers et al. |
| 2017/0293563 A1 | 10/2017 | DeHon et al. |
| 2017/0308480 A1 | 10/2017 | Wilson |
| 2017/0329961 A1 | 11/2017 | Shanbhogue et al. |
| 2018/0011708 A1 | 1/2018 | DeHon |
| 2018/0046579 A1 | 2/2018 | Greenspan et al. |
| 2018/0082055 A1 | 3/2018 | Fleming et al. |
| 2018/0121650 A1 | 5/2018 | Brown |
| 2018/0143890 A1 | 5/2018 | Ogawa et al. |
| 2018/0189062 A1 | 7/2018 | Baghsorkhi et al. |
| 2018/0276085 A1 | 9/2018 | Mitkar et al. |
| 2018/0302443 A1 | 10/2018 | Weiss et al. |
| 2018/0336031 A1 | 11/2018 | DeHon et al. |
| 2018/0336032 A1 | 11/2018 | DeHon et al. |
| 2018/0336033 A1 | 11/2018 | DeHon |
| 2018/0341490 A1 | 11/2018 | DeHon |
| 2019/0034665 A1 | 1/2019 | Chiricescu et al. |
| 2019/0141059 A1 | 5/2019 | Shimizu et al. |
| 2019/0155606 A1 | 5/2019 | Rotem et al. |
| 2019/0171457 A1 | 6/2019 | DeHon et al. |
| 2019/0205244 A1 | 7/2019 | Smith |
| 2019/0213322 A1 | 7/2019 | DeHon et al. |
| 2019/0236272 A1 | 8/2019 | Piatt |
| 2019/0243655 A1 | 8/2019 | Milburn et al. |
| 2019/0243768 A1 | 8/2019 | Doshi et al. |
| 2019/0354675 A1 | 11/2019 | Gan et al. |
| 2019/0384604 A1 | 12/2019 | DeHon et al. |
| 2019/0392146 A1 | 12/2019 | Gezalov et al. |
| 2019/0392147 A1 | 12/2019 | Gezalov et al. |
| 2020/0089500 A1 | 3/2020 | DeHon |
| 2020/0125502 A1 | 4/2020 | Durham et al. |
| 2020/0201576 A1 | 6/2020 | Yudanov et al. |
| 2020/0387374 A1 | 12/2020 | DeHon |
| 2020/0387384 A1 | 12/2020 | Huang |
| 2021/0004231 A1 | 1/2021 | DeHon |
| 2021/0026934 A1 | 1/2021 | Boling et al. |
| 2021/0042100 A1 | 2/2021 | Boling et al. |
| 2021/0055954 A1 | 2/2021 | Milburn et al. |
| 2021/0073375 A1 | 3/2021 | Milburn et al. |
| 2021/0075797 A1 | 3/2021 | Gan et al. |
| 2021/0255890 A1 | 8/2021 | Milburn et al. |
| 2021/0406028 A1 | 12/2021 | Boling et al. |
| 2021/0406137 A1 | 12/2021 | Sutherland et al. |
| 2022/0012329 A1 | 1/2022 | Boling et al. |
| 2022/0043654 A1 | 2/2022 | DeHon et al. |
| 2022/0050904 A1 | 2/2022 | Sullivan et al. |
| 2022/0076733 A1* | 3/2022 | Yudanov ................. G06F 9/546 |
| 2022/0092173 A1 | 3/2022 | Sutherland et al. |
| 2022/0121738 A1* | 4/2022 | DeHon ................... G06F 21/54 |
| 2022/0129343 A1 | 4/2022 | Milburn et al. |
| 2022/0198014 A1 | 6/2022 | Boling et al. |
| 2022/0300583 A1 | 9/2022 | Boling et al. |
| 2022/0309134 A1 | 9/2022 | Boling et al. |
| 2022/0374415 A1 | 11/2022 | Boling et al. |
| 2022/0398312 A1 | 12/2022 | Sutherland et al. |
| 2023/0054942 A1 | 2/2023 | Milburn et al. |

FOREIGN PATENT DOCUMENTS

| | | |
|---|---|---|
| CN | 103282889 A | 9/2013 |
| CN | 104657500 A | 5/2015 |
| CN | 104794067 A | 7/2015 |
| GB | 2519608 A | 4/2015 |
| JP | 2013-242633 A | 12/2013 |
| TW | 201333722 A | 8/2013 |
| TW | 201729068 A | 8/2017 |
| TW | 201737675 A | 10/2017 |
| WO | WO 92/03779 A1 | 3/1992 |
| WO | WO 2010/028316 A1 | 3/2010 |
| WO | WO 2015/047295 A1 | 4/2015 |
| WO | WO 2015/183481 A1 | 12/2015 |
| WO | WO 2017/106101 A2 | 6/2017 |
| WO | WO 2017/106103 A1 | 6/2017 |
| WO | WO 2017/221373 A1 | 12/2017 |
| WO | WO 2019/152772 A1 | 8/2019 |
| WO | WO 2019/152792 A1 | 8/2019 |
| WO | WO 2019/152795 A1 | 8/2019 |
| WO | WO 2019/152805 A1 | 8/2019 |
| WO | WO 2019/152822 A1 | 8/2019 |
| WO | WO 2019/213061 A1 | 11/2019 |
| WO | WO 2020/097177 A1 | 5/2020 |
| WO | WO 2020/097179 A1 | 5/2020 |
| WO | WO 2020/102064 A1 | 5/2020 |
| WO | WO 2020/132012 A1 | 6/2020 |
| WO | WO 2020/150351 A1 | 7/2020 |
| WO | WO 2021/076871 A1 | 4/2021 |
| WO | WO 2021/092138 A1 | 5/2021 |

OTHER PUBLICATIONS

U.S. Appl. No. 16/905,680, filed Jun. 18, 2020, DeHon.
U.S. Appl. No. 16/929,692, filed Jul. 15, 2020, DeHon.
U.S. Appl. No. 16/966,863, filed Jul. 31, 2020, Milburn et al.
U.S. Appl. No. 16/966,865, filed Jul. 31, 2020, Milburn et al.
U.S. Appl. No. 17/051,741, filed Oct. 29, 2020, Sutherland et al.
U.S. Appl. No. 17/292,694, filed May 10, 2021, Boling et al.
U.S. Appl. No. 17/312,675, filed Jun. 10, 2021, Sullivan et al.
U.S. Appl. No. 17/423,701, filed Jul. 16, 2021, Sutherland et al.
U.S. Appl. No. 17/452,271, filed Oct. 26, 2021, DeHon.
U.S. Appl. No. 17/474,830, filed Sep. 14, 2021, Milburn et al.
U.S. Appl. No. 17/507,398, filed Oct. 21, 2021, Milburn et al.
U.S. Appl. No. 17/560,975, filed Dec. 23, 2021, Boling et al.
U.S. Appl. No. 17/711,092, filed Apr. 1, 2022, Boling et al.
U.S. Appl. No. 17/720,035, filed Apr. 13, 2022, Boling et al.
U.S. Appl. No. 17/769,868, filed Apr. 18, 2022, Boling et al.
U.S. Appl. No. 17/774,799, filed May 5, 2022, Sutherland et al.
U.S. Appl. No. 17/880,539, filed Aug. 3, 2022, Milburn et al.
International Search Report and Written Opinion for International Application No. PCT/US2019/016272 mailed Apr. 8, 2019.
International Preliminary Report on Patentability for International Application No. PCT/US2019/016272 mailed Aug. 13, 2020.
International Search Report and Written Opinion for International Application No. PCT/US2019/016276 mailed Apr. 26, 2019.
International Preliminary Report on Patentability for International Application No. PCT/US2019/016276 mailed Aug. 13, 2020.
International Search Report and Written Opinion for International Application No. PCT/US2019/029880 mailed Aug. 8, 2019.
International Preliminary Report on Patentability for International Application No. PCT/US2019/029880 mailed Nov. 12, 2020.

(56) References Cited

OTHER PUBLICATIONS

International Search Report and Written Opinion for International Application No. PCT/US2019/016317 mailed Apr. 16, 2019.
International Preliminary Report on Patentability for International Application No. PCT/US2019/016317 mailed Aug. 13, 2020.
International Search Report and Written Opinion for International Application No. PCT/US2020/059057 mailed Feb. 8, 2021.
International Preliminary Report on Patentability for International Application No. PCT/US2020/059057, mailed May 19, 2022.
International Search Report and Written Opinion for International Application No. PCT/US2016/066188 mailed Jul. 13, 2017.
International Search Report and Written Opinion for International Application No. PCT/US2016/066194 mailed Apr. 7, 2017.
International Search Report and Written Opinion for International Application No. PCT/US2019/016242 mailed Mar. 29, 2019.
International Search Report and Written Opinion for International Application No. PCT/US2019/060030 mailed Mar. 19, 2020.
International Search Report and Written Opinion for International Application No. PCT/US2019/060698 mailed Feb. 3, 2020.
International Search Report and Written Opinion for International Application No. PCT/US2019/067084 mailed Mar. 19, 2020.
Invitation to Pay Additional Fees for International Application No. PCT/US2019/013678 mailed Apr. 15, 2020.
International Search Report and Written Opinion for International Application No. PCT/US2019/013678 mailed Jun. 23, 2020.
Invitation to Pay Additional Fees for International Application No. PCT/US2019/016295 mailed May 3, 2019.
International Search Report and Written Opinion for International Application No. PCT/US2019/016295 mailed Jun. 26, 2019.
International Preliminary Report on Patentability for International Application No. PCT/US2019/016295 mailed Aug. 13, 2020.
International Search Report and Written Opinion for International Application No. PCT/US2021/020602 mailed May 11, 2021.
International Preliminary Report on Patentability for International Application No. PCT/US2021/020602, mailed Sep. 15, 2022.
International Search Report and Written Opinion for International Application No. PCT/US2020/055952 mailed Jan. 28, 2021.
International Preliminary Report on Patentability for International Application No. PCT/US2020/055952 mailed Apr. 28, 2022.
International Search Report and Written Opinion for International Application No. PCT/US2019/060028 mailed Mar. 23, 2020.
International Preliminary Report on Patentability for International Application No. PCT/US2019/060028 mailed May 20, 2021.
[No Author Listed] Arm Limited: AMBA® AXI™ and ACE™ Protocol Specification. Oct. 28, 2011:1-306. [https://capocaccia.ethz.ch/capo/raw-attachment/wiki/2014/microblaze 14/AX14_specification.pdf.].
Alves-Foss et al., Evaluating the Use of Security Tags in Security Policy Enforcement Mechanisms. 2015 48th Hawaii International Conference on System Sciences Jan. 5, 2015:5201-10.
Berlekamp, Algebraic coding theory (revised edition). World Scientific; Mar. 26, 2015. 34 pages.
Calder et al., Process Algebra for Event-Driven Runtime Verification: A Case Study of Wireless Network Management. IFM LNCS 2012;21-23.
Dalton et al., Raksha: a flexible information flow architecture for software security. ACM Proceedings of the 34$^{th}$ Annual International Symposium In Computer Architecture. Jun. 9, 2007;35(2):482-93.
Dalton et al., Real-World Buffer Overflow Protection for Userspace and Kernelspace. USENIX Security Symposium Jul. 28, 2008;395-410.
De Amorim et al., A verified information-flow architecture. Proceedings of the 41st ACM SIGPLAN-SIGACT Symposium on Principles of Programming Languages Jan. 8, 2014:165-78.
De Amorim et al., Micro-policies: Formally verified, tag-based security monitors. 2015 IEEE Symposium on Security and Privacy May 17, 2015:813-30.
Dehon et al., DOVER A Metadata-Extended RISC-V. Jan. 6, 2016:34. [https://web.archive.org/web/20160331131339 if /http://riscv.org/wp-content/uploads/2016/01/Wed1430-dover riscv jan2016 v3.pdf].
Dehon et al., DOVER: A metadata-extended RISC-V. RISC-V Workshop Oracle Conference Center, Redwood Shores, CA. Jan. 6, 2016. 33 pages.
Dhawan et al., Architectural support for software-defined metadata processing. Proceedings of the Twentieth International Conference on Architectural Support for Programming Languages and Operating Systems (ASPLOS). Mar. 14, 2015:487-502.
Dhawan et al., Area-efficient near-associative memories on FPGAs. ACM Transactions on Reconfigurable Technology and Systems (TRETS). Jan. 23, 2015;7(4):1-22.
Dhawan et al., PUMP: a programmable unit for metadata processing. Proceedings of the Third Workshop on Hardware and Architectural Support for Security and Privacy (HASP). Jun. 15, 2014:1-8.
Engelke et al., Efficient LLVM-Based Dynamic Binary Translation. ACM VEE. Apr. 16, 2021;165-71.
Evans et al., Melding security metadata between software and hardware. Proceedings of the Posters and Demo Track Dec. 3, 2012:1-2.
Geater, TEE requirements for ISA. Thales eSecurity. 2018. 21 pages.
Hriţcu, Micro-policies: Formally verified, tag-based security monitors. Proceedings of the 10th ACM Workshop on Programming Languages and Analysis for Security Jul. 4, 2015.
Hunt et al., The Seven Properties of Highly Secure Devices. 2021. 10 pages.
Juglaret et al., Towards a fully abstract compiler using Micro-Policies: Secure compilation for mutually distrustful components. arXiv preprint arXiv:1510.00697. Oct. 2, 2015. 31 pages.
Kane, Runtime Monitoring for Safety-Critical Embedded Systems. Carnegie Mellon University. Feb. 2015;207 pages.
Kannan et al., Decoupling dynamic information flow tracking with a dedicated coprocessor. 2009 IEEE/IFIP International Conference on Dependable Systems & Networks. Jun. 29, 2009:105-14.
Mambretti et al., Trellis: Privilege separation for multi-user applications made easy. International Symposium on Research in Attacks, Intrusions, and Defenses. Springer, Cham. Sep. 19, 2016:437-56.
Mutlu, 18-447 Computer Architecture Lecture 11: Precise Exceptions, State Maintenance, State Recovery. Carnegie Mellon University Lecture. Feb. 11, 2015, 49 pages.
Nagarakatte et al., SoftBound: Highly Compatible and Complete Spatial Memory Safety for C. University of Pennsylvania Department of Computer and Information Science Technical Report. Jan. 2009. 12 pages.
Okhravi et al., One Giant Leap for Computer Security. IEEE Computer and Reliability Societies. Jul./Aug. 2020;18(4):8-19.
Ozsoy et al., SIFT: A low-overhead dynamic information flow tracking architecture for smt processors. Proceedings of the 8th ACM International Conference on Computing Frontiers. May 3, 2011:1-11.
Roessler et al., Protecting the stack with metadata policies and tagged hardware. 2018 IEEE Symposium on Security and Privacy (SP) May 20, 2018;478-95.
Song et al., Security tagging for a zero-kernel operating system. 2013 46th Hawaii International Conference on System Sciences Jan. 7, 2013:5049-58.
Song et al., The 4th lowRISC Release: Tagged Memory and Minion Core. University of Cambridge. May 2017. 20 pages. https://riscv.org/wp-content/uploads/2017/05/Wed0930riscv201705_ppt.pdf [Last accessed Mar. 31, 2022].
Suh et al., Secure Program Execution via Dynamic Information Flow Tracking. MIT CSAIL. Jul. 2003. 14 pages.
Sullivan et al., The dover inherently secure processor. 2017 IEEE International Symposium on Technologies for Homeland Security (HST) Apr. 25, 2017:1-5.
Tiwari et al., A small cache of large ranges: Hardware methods for efficiently searching, storing, and updating big dataflow tags. 2008 41st IEEE/ACM International Symposium on Microarchitecture Nov. 8, 2008:94-105.

(56) References Cited

OTHER PUBLICATIONS

Tiwari et al., Complete information flow tracking from the gates up. InProceedings of the 14th international conference on Architectural support for programming languages and operating systems Mar. 7, 2009;109-20.
Waterman et al., The RISC-V Instruction Set Manual, vol. I: Unprivileged ISA, Document Version 20191213. RISC-V Foundation. Dec. 2019. 238 pages.
Watson et al., Cheri: A hybrid capability-system architecture for scalable software compartmentalization. 2015 IEEE Symposium on Security and Privacy Sep. 2015;20-37.
Witchel et al., Mondrian Memory Protection. ASPLOS-X. 2002;13 pages.
Woodruff, Cheri: a RISC capability machine for practical memory safety. University of Cambridge, Computer Laboratory; 2014. 112 pages.
Zeldovich et al., Hardware Enforcement of Application Security Policies Using Tagged Memory. USENIX Symposium on Operating Systems Design and Implementation. Dec. 8, 2008:8;225-40.
International Search Report and Written Opinion for International Application No. PCT/US2022/042492 mailed Jan. 11, 2023.

\* cited by examiner

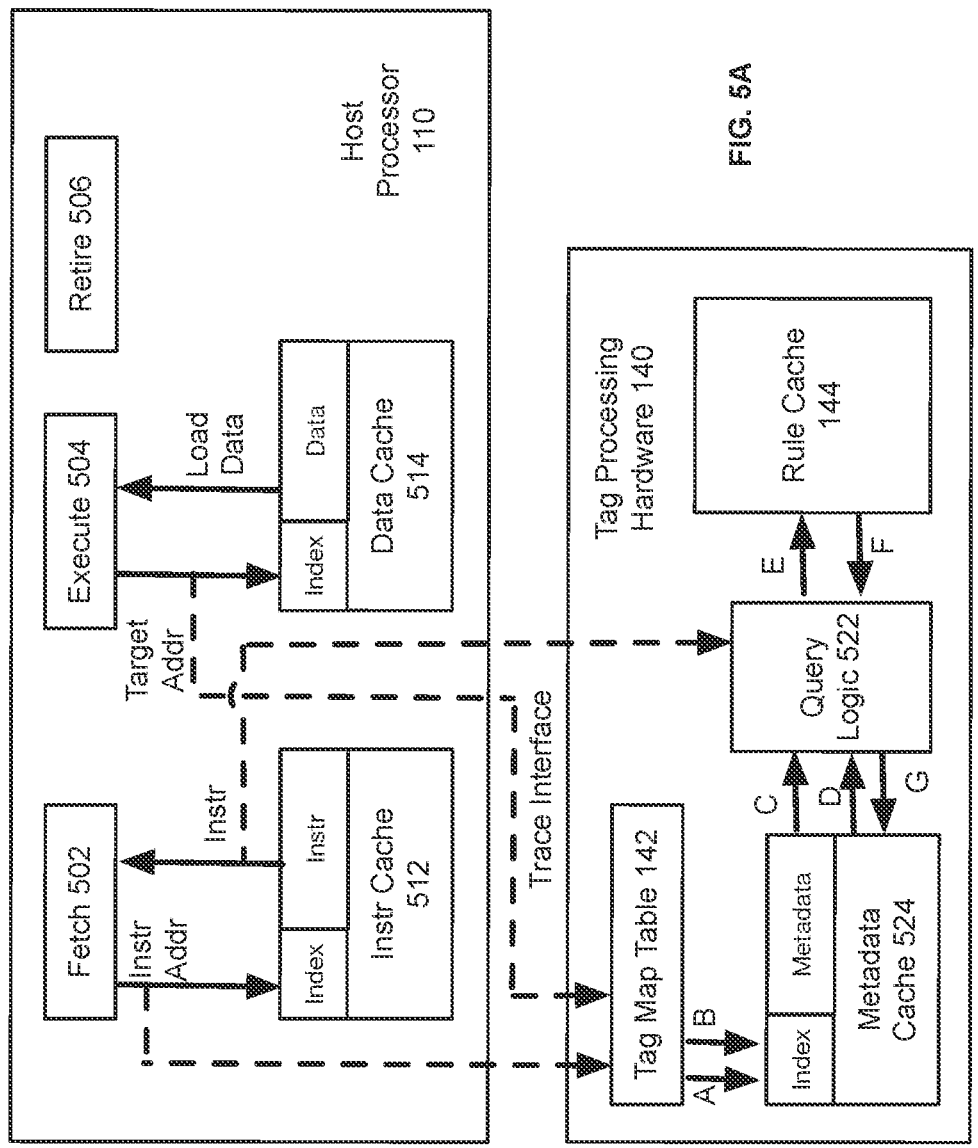

SYSTEMS AND METHODS FOR CACHING METADATA

RELATED APPLICATION

This application is a national stage filing under 35 U.S.C. § of International Patent Application Serial No. PCT/US2021/020602, filed Mar. 3, 2021, which claims the benefit under 35 U.S.C. § 119 (e) of U.S. Provisional Patent Application Ser. No. 62/984,730, filed on Mar. 3, 2020, titled "SYSTEMS AND METHODS FOR CACHING METADATA," which is hereby incorporated by reference in its entirety.

BACKGROUND

Computer security has become an increasingly urgent concern at all levels of society, from individuals to businesses to government institutions. For example, in 2015, security researchers identified a zero-day vulnerability that would have allowed an attacker to hack into a Jeep Cherokee's on-board computer system via the Internet and take control of the vehicle's dashboard functions, steering, brakes, and transmission. In 2017, the WannaCry ransomware attack was estimated to have affected more than 200,000 computers worldwide, causing at least hundreds of millions of dollars in economic losses. Notably, the attack crippled operations at several National Health Service hospitals in the UK. In the same year, a data breach at Equifax, a US consumer credit reporting agency, exposed person data such as full names, social security numbers, birth dates, addresses, driver's license numbers, credit card numbers, etc. That attack is reported to have affected over 140 million consumers.

Security professionals are constantly playing catch-up with attackers. As soon as a vulnerability is reported, security professionals rush to patch the vulnerability. Individuals and organizations that fail to patch vulnerabilities in a timely manner (e.g., due to poor governance and/or lack of resources) become easy targets for attackers.

Some security software monitors activities on a computer and/or within a network, and looks for patterns that may be indicative of an attack. Such an approach does not prevent malicious code from being executed in the first place. Often, the damage has been done by the time any suspicious pattern emerges.

SUMMARY

In accordance with some embodiments, a computer-implemented method for caching metadata may be provided, the method comprising acts of: in response to an access request comprising an application memory address, determining whether the application memory address matches an entry of at least one cache; in response to determining that the application memory address does not match any entry of the at least one cache: using the application memory address to retrieve application data; mapping the application memory address to at least one metadata memory address; and using the at least one metadata memory address to retrieve metadata corresponding to the application memory address; and creating an entry in the at least one cache, wherein: the entry is indexed by the application memory address; and the entry stores both the application data retrieved using the application memory address, and the corresponding metadata retrieved using the at least one metadata memory address.

In accordance with some embodiments, a computer-implemented method for caching metadata may be provided, the method comprising acts of: upon a cache miss, fetching application data and associated metadata from, respectively, a first address and a second address of the at least one memory, wherein the first and second addresses are not adjacent; storing the application data and the associated metadata in an entry of the at least one cache; and presenting the application data and the associated metadata to the processor and the metadata processing system, respectively.

In accordance with some embodiments, a system may be provided, comprising circuitry and/or one or more processors programmed by executable instructions, wherein the circuitry and/or the one or more programmed processors are configured to perform any of the methods described herein.

In accordance with some embodiments, at least one computer-readable medium may be provided, having stored thereon at least one netlist for any of the circuitries described herein.

In accordance with some embodiments, at least one computer-readable medium may be provided, having stored thereon at least one hardware description that, when synthesized, produces any of the netlists described herein.

In some embodiments, the at least one hardware description may be in an encrypted form.

In accordance with some embodiments, at least one computer-readable medium may be provided, having stored thereon any of the executable instructions described herein.

BRIEF DESCRIPTION OF DRAWINGS

FIGS. 5A-B show an illustrative instruction cache 512, an illustrative data cache 514, and an illustrative metadata cache 524, in accordance with some embodiments.

DETAILED DESCRIPTION

Many vulnerabilities exploited by attackers trace back to a computer architectural design where data and executable instructions are intermingled in a same memory. This intermingling allows an attacker to inject malicious code into a remote computer by disguising the malicious code as data. For instance, a program may allocate a buffer in a computer's memory to store data received via a network. If the program receives more data than the buffer can hold, but does not check the size of the received data prior to writing the data into the buffer, part of the received data would be written beyond the buffer's boundary, into adjacent memory. An attacker may exploit this behavior to inject malicious code into the adjacent memory. If the adjacent memory is allocated for executable code, the malicious code may eventually be executed by the computer.

Techniques have been proposed to make computer hardware more security aware. For instance, memory locations may be associated with metadata for use in enforcing security policies, and instructions may be checked for compliance with the security policies. For example, given an instruction to be executed, metadata associated with the instruction and/or metadata associated with one or more operands of the instruction may be checked to determine if the instruction should be allowed. Additionally, or alternatively, appropriate metadata may be associated with an output of the instruction.

Figure 1:
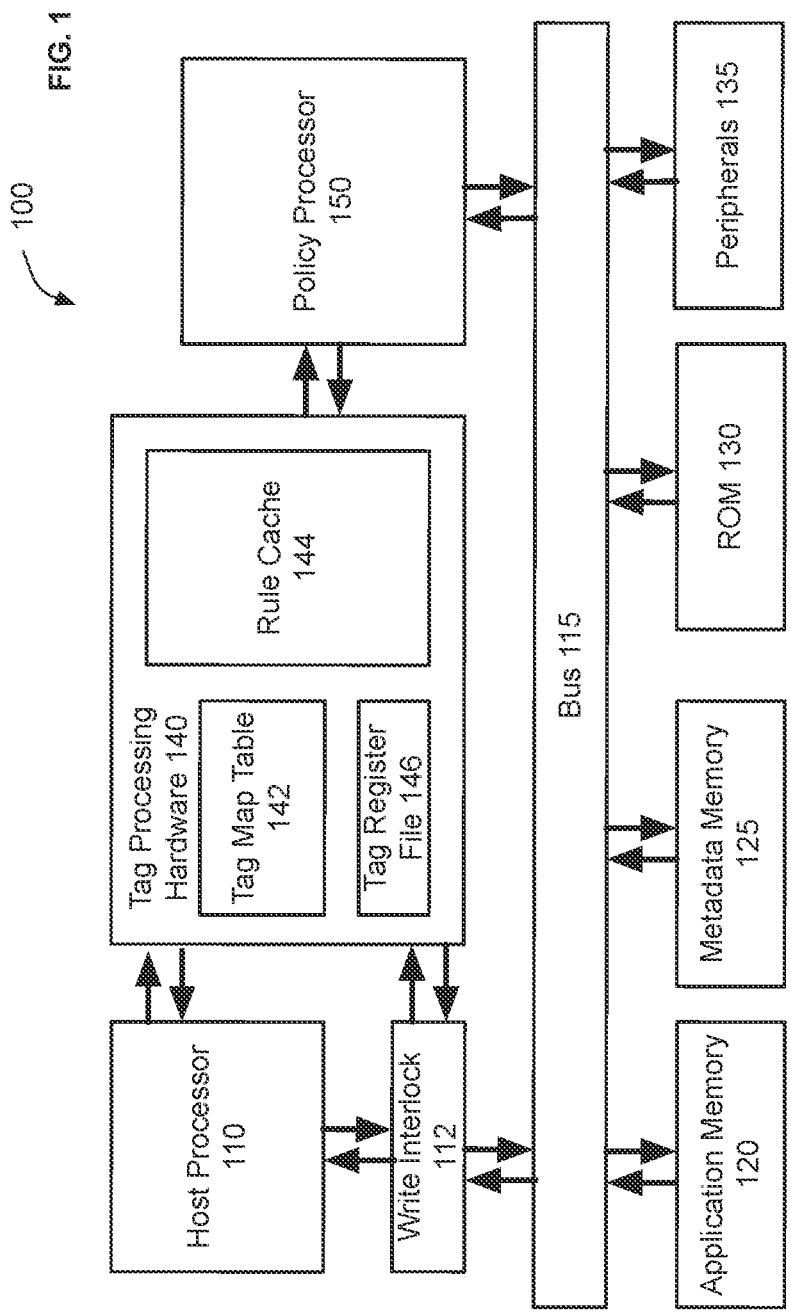
FIG. 1 shows an illustrative hardware system 100 for enforcing policies, in accordance with some embodiments.

FIG. 1 shows an illustrative hardware system 100 for enforcing policies, in accordance with some embodiments. In this example, the system 100 includes a host processor 110, which may have any suitable instruction set architecture (ISA) such as a reduced instruction set computing (RISC) architecture or a complex instruction set computing (CISC) architecture. The host processor 110 may perform memory accesses via a write interlock 112. The write interlock 112 may be connected to a system bus 115 configured to transfer data between various components such as the write interlock 112, an application memory 120, a metadata memory 125, a read-only memory (ROM) 130, one or more peripherals 135, etc.

In some embodiments, data that is manipulated (e.g., modified, consumed, and/or produced) by the host processor 110 may be stored in the application memory 120. Such data is referred to herein as "application data," as distinguished from metadata used for enforcing policies. The latter may be stored in the metadata memory 125. It should be appreciated that application data may include data manipulated by an operating system (OS), instructions of the OS, data manipulated by one or more user applications, and/or instructions of the one or more user applications.

In some embodiments, the application memory 120 and the metadata memory 125 may be physically separate, and the host processor 110 may have no access to the metadata memory 125. In this manner, even if an attacker succeeds in injecting malicious code into the application memory 120 and causing the host processor 110 to execute the malicious code, the metadata memory 125 may not be affected. However, it should be appreciated that aspects of the present disclosure are not limited to storing application data and metadata on physically separate memories. Additionally, or alternatively, metadata may be stored in a same memory as application data, and a memory management component may be used that implements an appropriate protection scheme to prevent instructions executing on the host processor 110 from modifying the metadata. Additionally, or alternatively, metadata may be intermingled with application data in a same memory, and one or more policies may be used to protect the metadata.

In some embodiments, tag processing hardware 140 may be provided to ensure that instructions being executed by the host processor 110 comply with one or more policies. The tag processing hardware 140 may include any suitable circuit component or combination of circuit components. For instance, the tag processing hardware 140 may include a tag map table (TMT) 142 that maps addresses in the application memory 120 to addresses in the metadata memory 125. For example, the tag map table 142 may map an address X in the application memory 120 to an address Y in the metadata memory 125. A value stored at the address Y is sometimes referred to herein as a "metadata tag."

In some embodiments, a value stored at the address Y may in turn be an address Z. Such indirection may be repeated any suitable number of times, and may eventually lead to a data structure in the metadata memory 125 for storing metadata. Such metadata, as well as any intermediate address (e.g., the address Z), are also referred to herein as "metadata tags."

It should be appreciated that aspects of the present disclosure are not limited to a tag map table that stores addresses in a metadata memory. In some embodiments, a tag map table entry itself may store metadata, so that the tag processing hardware 140 may be able to access the metadata without performing a memory operation. In some embodiments, a tag map table entry may store a selected bit pattern, where a first portion of the bit pattern may encode metadata, and a second portion of the bit pattern may encode an address in a metadata memory where further metadata may be stored. This may provide a desired balance between speed and expressivity. For instance, the tag processing hardware 140 may be able to check certain policies quickly, using only the metadata stored in the tag map table entry itself. For other policies with more complex rules, the tag processing hardware 140 may access the further metadata stored in the metadata memory 125.

Referring again to FIG. 1, by mapping application memory addresses to metadata memory addresses, the tag map table 142 may create an association between application data and metadata that describes the application data. In one example, metadata stored at the metadata memory address Y and thus associated with application data stored at the application memory address X may indicate that the application data may be readable, writable, and/or executable. In another example, metadata stored at the metadata memory address Y and thus associated with application data stored at the application memory address X may indicate a type of the application data (e.g., integer, pointer, 16-bit word, 32-bit word, etc.). Depending on a policy to be enforced, any suitable metadata relevant for the policy may be associated with a piece of application data.

In some embodiments, a metadata memory address Z may be stored at the metadata memory address Y. Metadata to be associated with the application data stored at the application memory address X may be stored at the metadata memory address Z, instead of (or in addition to) the metadata memory address Y. For instance, a binary representation of a metadata label RED may be stored at the metadata memory address Z. By storing the metadata memory address Z in the metadata memory address Y, the application data stored at the application memory address X may be tagged RED.

In this manner, the binary representation of the metadata label RED may be stored only once in the metadata memory 125. For instance, if application data stored at another application memory address X' is also to be tagged RED, the tag map table 142 may map the application memory address X' to a metadata memory address Y' where the metadata memory address Z is also stored.

Moreover, in this manner, tag update may be simplified. For instance, if the application data stored at the application memory address X is to be tagged BLUE at a subsequent time, a metadata memory address Z' may be written at the metadata memory address Y, to replace the metadata memory address Z, and a binary representation of the metadata label BLUE may be stored at the metadata memory address Z'.

Thus, the inventors have recognized and appreciated that a chain of metadata memory addresses of any suitable length N may be used for tagging, including N=0 (e.g., where a binary representation of a metadata label is stored at the metadata memory address Y itself).

The association between application data and metadata (also referred to herein as "tagging") may be done at any suitable level of granularity, and/or variable granularity. For instance, tagging may be done on a word-by-word basis. Additionally, or alternatively, a region in memory may be mapped to a single metadata tag, so that all words in that region are associated with the same metadata. This may advantageously reduce a size of the tag map table 142 and/or the metadata memory 125. For example, a single metadata tag may be maintained for an entire address range, as opposed to maintaining multiple metadata tags corresponding, respectively, to different addresses in the address range.

In some embodiments, the tag processing hardware 140 may be configured to apply one or more rules to metadata associated with an instruction and/or metadata associated with one or more operands of the instruction to determine if the instruction should be allowed. For instance, the host processor 110 may fetch and execute an instruction, and may queue a result of executing the instruction into the write interlock 112. Before the result is written back into the application memory 120, the host processor 110 may send, to the tag processing hardware 140, an instruction type (e.g., opcode), an address where the instruction is stored, one or more memory addresses referenced by the instruction, and/or one or more register identifiers. Such a register identifier may identify a register used by the host processor 110 in executing the instruction, such as a register for storing an operand or a result of the instruction.

In some embodiments, destructive read instructions may be queued in addition to, or instead of, write instructions. For instance, subsequent instructions attempting to access a target address of a destructive read instruction may be queued in a memory region that is not cached. If and when it is determined that the destructive read instruction should be allowed, the queued instructions may be loaded for execution.

In some embodiments, a destructive read instruction may be allowed to proceed, and data read from a target address may be captured in a buffer. If and when it is determined that the destructive read instruction should be allowed, the data captured in the buffer may be discarded. If and when it is determined that the destructive read instruction should not be allowed, the data captured in the buffer may be restored to the target address. Additionally, or alternatively, a subsequent read may be serviced by the buffered data.

It should be appreciated that aspects of the present disclosure are not limited to performing metadata processing on instructions that have been executed by a host processor, such as instructions that have been retired by the host processor's execution pipeline. In some embodiments, metadata processing may be performed on instructions before, during, and/or after the host processor's execution pipeline.

In some embodiments, given an address received from the host processor 110 (e.g., an address where an instruction is stored, or an address referenced by an instruction), the tag processing hardware 140 may use the tag map table 142 to identify a corresponding metadata tag. Additionally, or alternatively, for a register identifier received from the host processor 110, the tag processing hardware 140 may access a metadata tag from a tag register file 146 within the tag processing hardware 140.

In some embodiments, if an application memory address does not have a corresponding entry in the tag map table 142, the tag processing hardware 140 may send a query to a policy processor 150. The query may include the application memory address in question, and the policy processor 150 may return a metadata tag for that application memory address. Additionally, or alternatively, the policy processor 150 may create a new tag map entry for an address range including the application memory address. In this manner, the appropriate metadata tag may be made available, for future reference, in the tag map table 142 in association with the application memory address in question.

In some embodiments, the tag processing hardware 140 may send a query to the policy processor 150 to check if an instruction executed by the host processor 110 should be allowed. The query may include one or more inputs, such as an instruction type (e.g., opcode) of the instruction, a metadata tag for a program counter, a metadata tag for an application memory address from which the instruction is fetched (e.g., a word in memory to which the program counter points), a metadata tag for a register in which an operand of the instruction is stored, and/or a metadata tag for an application memory address referenced by the instruction. In one example, the instruction may be a load instruction, and an operand of the instruction may be an application memory address from which application data is to be loaded. The query may include, among other things, a metadata tag for a register in which the application memory address is stored, as well as a metadata tag for the application memory address itself. In another example, the instruction may be an arithmetic instruction, and there may be two operands. The query may include, among other things, a first metadata tag for a first register in which a first operand is stored, and a second metadata tag for a second register in which a second operand is stored.

It should also be appreciated that aspects of the present disclosure are not limited to performing metadata processing on a single instruction at a time. In some embodiments, multiple instructions in a host processor's ISA may be checked together as a bundle, for example, via a single query to the policy processor 150. Such a query may include more inputs to allow the policy processor 150 to check all of the instructions in the bundle. Similarly, a CISC instruction, which may correspond semantically to multiple operations, may be checked via a single query to the policy processor 150, where the query may include sufficient inputs to allow the policy processor 150 to check all of the constituent operations within the CISC instruction.

In some embodiments, the policy processor 150 may include a configurable processing unit, such as a microprocessor, a field-programmable gate array (FPGA), and/or any other suitable circuitry. The policy processor 150 may have loaded therein one or more policies that describe allowed operations of the host processor 110. In response to a query from the tag processing hardware 140, the policy processor 150 may evaluate one or more of the policies to determine if an instruction in question should be allowed. For instance, the tag processing hardware 140 may send an interrupt signal to the policy processor 150, along with one or more inputs relating to the instruction in question (e.g., as described above). The policy processor 150 may store the inputs of the query in a working memory (e.g., in one or more queues) for immediate or deferred processing. For example, the policy processor 150 may prioritize processing of queries in some suitable manner (e.g., based on a priority flag associated with each query).

In some embodiments, the policy processor 150 may evaluate one or more policies on one or more inputs (e.g., one or more input metadata tags) to determine if an instruction in question should be allowed. If the instruction is not to be allowed, the policy processor 150 may so notify the tag processing hardware 140. If the instruction is to be allowed, the policy processor 150 may compute one or more outputs (e.g., one or more output metadata tags) to be returned to the tag processing hardware 140. As one example, the instruction may be a store instruction, and the policy processor 150 may compute an output metadata tag for an application memory address to which application data is to be stored. As another example, the instruction may be an arithmetic instruction, and the policy processor 150 may compute an output metadata tag for a register for storing a result of executing the arithmetic instruction.

In some embodiments, the policy processor 150 may be programmed to perform one or more tasks in addition to, or instead of, those relating to evaluation of policies. For instance, the policy processor 150 may perform tasks relating to tag initialization, boot loading, application loading, memory management (e.g., garbage collection) for the metadata memory 125, logging, debugging support, and/or interrupt processing. One or more of these tasks may be performed in the background (e.g., between servicing queries from the tag processing hardware 140).

In some embodiments, the tag processing hardware 140 may include a rule cache 144 for mapping one or more inputs to a decision and/or one or more outputs. For instance, a query into the rule cache 144 may be similarly constructed as a query to the policy processor 150 to check if an instruction executed by the host processor 110 should be allowed. If there is a cache hit, the rule cache 144 may output a decision as to whether to the instruction should be allowed, and/or one or more output metadata tags (e.g., as described in connection with the policy processor 150). Such a mapping in the rule cache 144 may be created using a query response from the policy processor 150. However, that is not required, as in some embodiments, one or more mappings may be installed into the rule cache 144 ahead of time.

In some embodiments, the rule cache 144 may be used to provide a performance enhancement. For instance, before querying the policy processor 150 with one or more input metadata tags, the tag processing hardware 140 may first query the rule cache 144 with the one or more input metadata tags. In case of a cache hit, the tag processing hardware 140 may proceed with a decision and/or one or more output metadata tags from the rule cache 144, without querying the policy processor 150. This may provide a significant speedup. In case of a cache miss, the tag processing hardware 140 may query the policy processor 150, and may install a response from the policy processor 150 into the rule cache 144 for potential future use.

In some embodiments, the tag processing hardware 140 may form a hash key based on one or more input metadata tags, and may present the hash key to the rule cache 144. In case of a cache miss, the tag processing hardware 140 may send an interrupt signal to the policy processor 150. In response to the interrupt signal, the policy processor 150 may fetch metadata from one or more input registers (e.g., where the one or more input metadata tags are stored), process the fetched metadata, and write one or more results to one or more output registers. The policy processor 150 may then signal to the tag processing hardware 140 that the one or more results are available.

In some embodiments, if the tag processing hardware 140 determines that an instruction in question should be allowed (e.g., based on a hit in the rule cache 144, or a miss in the rule cache 144, followed by a response from the policy processor 150 indicating no policy violation has been found), the tag processing hardware 140 may indicate to the write interlock 112 that a result of executing the instruction may be written back to memory. Additionally, or alternatively, the tag processing hardware 140 may update the metadata memory 125, the tag map table 142, and/or the tag register file 146 with one or more output metadata tags (e.g., as received from the rule cache 144 or the policy processor 150). As one example, for a store instruction, the metadata memory 125 may be updated based on an address translation by the tag map table 142. For instance, an application memory address referenced by the store instruction may be used to look up a metadata memory address from the tag map table 142, and metadata received from the rule cache 144 or the policy processor 150 may be stored to the metadata memory 125 at the metadata memory address. As another example, where metadata to be updated is stored in an entry in the tag map table 142 (as opposed to being stored in the metadata memory 125), that entry in the tag map table 142 may be updated. As another example, for an arithmetic instruction, an entry in the tag register file 146 corresponding to a register used by the host processor 110 for storing a result of executing the arithmetic instruction may be updated with an appropriate metadata tag.

In some embodiments, if the tag processing hardware 140 determines that the instruction in question represents a policy violation (e.g., based on a miss in the rule cache 144, followed by a response from the policy processor 150 indicating a policy violation has been found), the tag processing hardware 140 may indicate to the write interlock 112 that a result of executing the instruction should be discarded, instead of being written back to memory. Additionally, or alternatively, the tag processing hardware 140 may send an interrupt to the host processor 110. In response to receiving the interrupt, the host processor 110 may switch to any suitable violation processing code. For example, the host processor 100 may halt, reset, log the violation and continue, perform an integrity check on application code and/or application data, notify an operator, etc.

In some embodiments, the rule cache 144 may be implemented with a hash function and a designated portion of a memory (e.g., the metadata memory 125). For instance, a hash function may be applied to one or more inputs to the rule cache 144 to generate an address in the metadata memory 125. A rule cache entry corresponding to the one or more inputs may be stored to, and/or retrieved from, that address in the metadata memory 125. Such an entry may include the one or more inputs and/or one or more corresponding outputs, which may be computed from the one or more inputs at run time, load time, link time, or compile time.

In some embodiments, the tag processing hardware 140 may include one or more configuration registers. Such a register may be accessible (e.g., by the policy processor 150) via a configuration interface of the tag processing hardware 140. In some embodiments, the tag register file 146 may be implemented as configuration registers. Additionally, or alternatively, there may be one or more application configuration registers and/or one or more metadata configuration registers.

Although details of implementation are shown in FIG. 1 and discussed above, it should be appreciated that aspects of the present disclosure are not limited to any particular component, or combination of components, or to any particular arrangement of components. For instance, in some embodiments, one or more functionalities of the policy processor 150 may be performed by the host processor 110. As an example, the host processor 110 may have different operating modes, such as a user mode for user applications and a privileged mode for an operating system. Policy-related code (e.g., tagging, evaluating policies, etc.) may run in the same privileged mode as the operating system, or a different privileged mode (e.g., with even more protection against privilege escalation).

Figure 2:
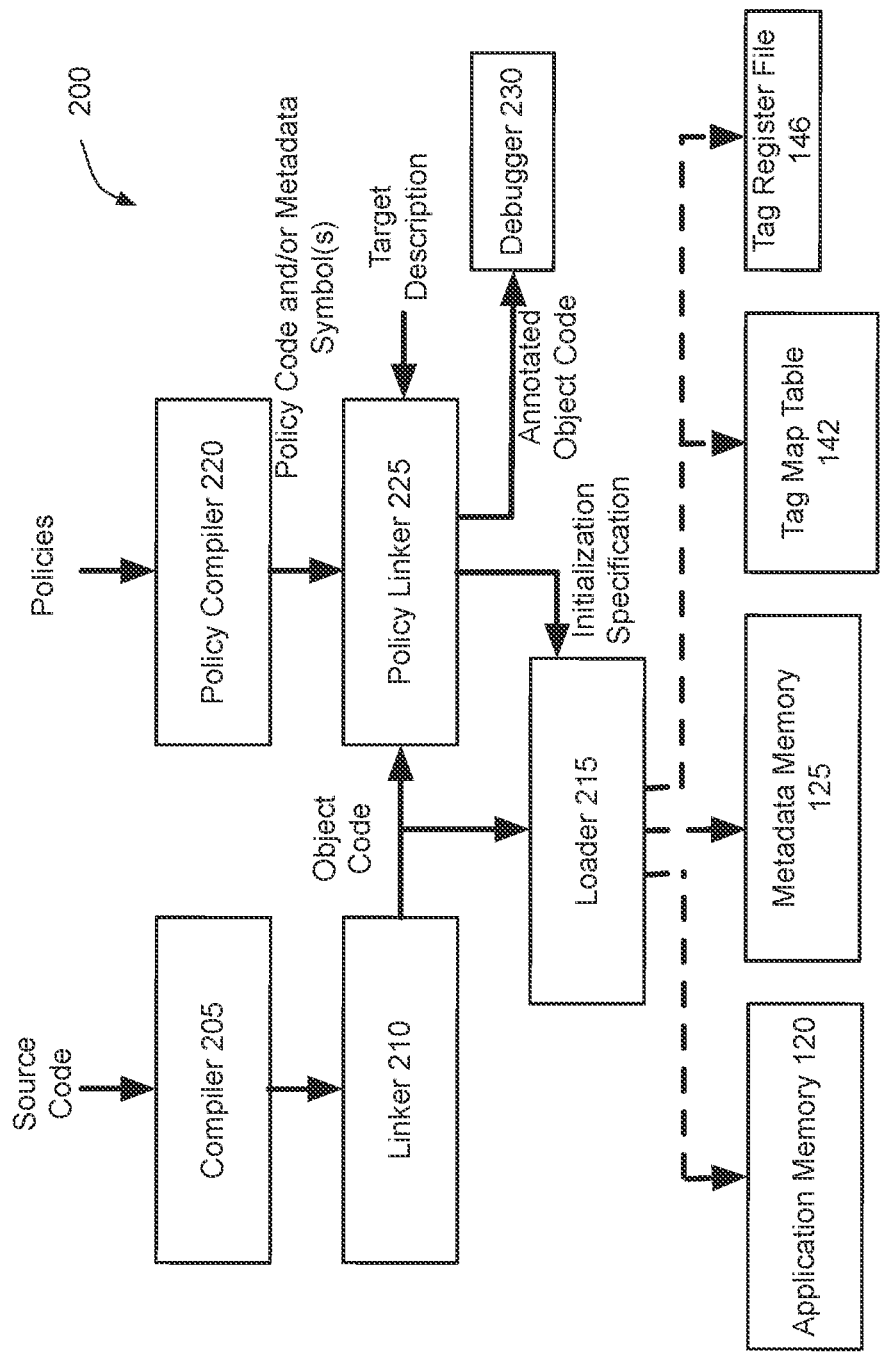
FIG. 2 shows an illustrative software system 200 for enforcing policies, in accordance with some embodiments.

FIG. 2 shows an illustrative software system 200 for enforcing policies, in accordance with some embodiments. For instance, the software system 200 may be programmed to generate executable code and/or load the executable code into the illustrative hardware system 100 in the example of FIG. 1.

In the example of FIG. 2, the software system 200 includes a software toolchain having a compiler 205, a linker 210, and a loader 215. The compiler 205 may be programmed to process source code into executable code, where the source code may be in a higher-level language and the executable code may be in a lower level language. The linker 210 may be programmed to combine multiple object files generated by the compiler 205 into a single object file to be loaded by the loader 215 into memory (e.g., the illustrative application memory 120 in the example of FIG. 1). Although not shown, the object file output by the linker 210 may be converted into a suitable format and stored in persistent storage, such as flash memory, hard disk, read-only memory (ROM), etc. The loader 215 may retrieve the object file from the persistent storage, and load the object file into random-access memory (RAM).

In some embodiments, the compiler 205 may be programmed to generate information for use in enforcing policies. For instance, as the compiler 205 translates source code into executable code, the compiler 205 may generate information regarding data types, program semantics and/or memory layout. As one example, the compiler 205 may be programmed to mark a boundary between one or more instructions of a function and one or more instructions that implement calling convention operations (e.g., passing one or more parameters from a caller function to a callee function, returning one or more values from the callee function to the caller function, storing a return address to indicate where execution is to resume in the caller function's code when the callee function returns control back to the caller function, etc.). Such boundaries may be used, for instance, during initialization to tag certain instructions as function prologue or function epilogue. At run time, a stack policy may be enforced so that, as function prologue instructions execute, certain locations in a call stack (e.g., where a return address is stored) may be tagged as FRAME locations, and as function epilogue instructions execute, the FRAME metadata tags may be removed. The stack policy may indicate that instructions implementing a body of the function (as opposed to function prologue and function epilogue) only have read access to FRAME locations. This may prevent an attacker from overwriting a return address and thereby gaining control.

As another example, the compiler 205 may be programmed to perform control flow analysis, for instance, to identify one or more control transfer points and respective destinations. Such information may be used in enforcing a control flow policy. As yet another example, the compiler 205 may be programmed to perform type analysis, for example, by applying type labels such as Pointer, Integer, Floating-Point Number, etc. Such information may be used to enforce a policy that prevents misuse (e.g., using a floating-point number as a pointer).

Although not shown in FIG. 2, the software system 200 may, in some embodiments, include a binary analysis component programmed to take, as input, object code produced by the linker 210 (as opposed to source code), and perform one or more analyses similar to those performed by the compiler 205 (e.g., control flow analysis, type analysis, etc.).

In the example of FIG. 2, the software system 200 further includes a policy compiler 220 and a policy linker 225. The policy compiler 220 may be programmed to translate one or more policies written in a policy language into policy code. For instance, the policy compiler 220 may output policy code in C or some other suitable programming language. Additionally, or alternatively, the policy compiler 220 may output one or more metadata labels referenced by the one or more policies. At initialization, such a metadata label may be associated with one or more memory locations, registers, and/or other machine state of a target system, and may be resolved into a binary representation of metadata to be loaded into a metadata memory or some other hardware storage (e.g., registers) of the target system. As discussed above, such a binary representation of metadata, or a pointer to a location at which the binary representation is stored, is sometimes referred to herein as a "metadata tag."

It should be appreciated that aspects of the present disclosure are not limited to resolving metadata labels at load time. In some embodiments, one or more metadata labels may be resolved statically (e.g., at compile time or link time). For example, the policy compiler 220 may process one or more applicable policies, and resolve one or more metadata labels defined by the one or more policies into a statically-determined binary representation. Additionally, or alternatively, the policy linker 225 may resolve one or more metadata labels into a statically-determined binary representation, or a pointer to a data structure storing a statically-determined binary representation. The inventors have recognized and appreciated that resolving metadata labels statically may advantageously reduce load time processing. However, aspects of the present disclosure are not limited to resolving metadata labels in any particular manner.

In some embodiments, the policy linker 225 may be programmed to process object code (e.g., as output by the linker 210), policy code (e.g., as output by the policy compiler 220), and/or a target description, to output an initialization specification. The initialization specification may be used by the loader 215 to securely initialize a target system having one or more hardware components (e.g., the illustrative hardware system 100 in the example of FIG. 1) and/or one or more software components (e.g., an operating system, one or more user applications, etc.).

In some embodiments, the target description may include descriptions of a plurality of named entities. A named entity may represent a component of a target system. As one example, a named entity may represent a hardware component, such as a configuration register, a program counter, a register file, a timer, a status flag, a memory transfer unit, an input/output device, etc. As another example, a named entity may represent a software component, such as a function, a module, a driver, a service routine, etc.

In some embodiments, the policy linker 225 may be programmed to search the target description to identify one or more entities to which a policy pertains. For instance, the policy may map certain entity names to corresponding metadata labels, and the policy linker 225 may search the target description to identify entities having those entity names. The policy linker 225 may identify descriptions of those entities from the target description, and use the descriptions to annotate, with appropriate metadata labels, the object code output by the linker 210. For instance, the policy linker 225 may apply a Read label to a .rodata section of an Executable and Linkable Format (ELF) file, a Read label and a Write label to a .data section of the ELF file, and an Execute label to a .text section of the ELF file. Such information may be used to enforce a policy for memory access control and/or executable code protection (e.g., by checking read, write, and/or execute privileges).

It should be appreciated that aspects of the present disclosure are not limited to providing a target description to the policy linker 225. In some embodiments, a target description may be provided to the policy compiler 220, in addition to, or instead of, the policy linker 225. The policy compiler 220 may check the target description for errors. For instance, if an entity referenced in a policy does not exist in the target description, an error may be flagged by the policy compiler 220. Additionally, or alternatively, the policy compiler 220 may search the target description for entities that are relevant for one or more policies to be enforced, and may produce a filtered target description that includes entities descriptions for the relevant entities only. For instance, the policy compiler 220 may match an entity name in an "init" statement of a policy to be enforced to an entity description in the target description, and may remove from the target description (or simply ignore) entity descriptions with no corresponding "init" statement.

In some embodiments, the loader 215 may initialize a target system based on an initialization specification produced by the policy linker 225. For instance, referring to the example of FIG. 1, the loader 215 may load data and/or instructions into the application memory 120, and may use the initialization specification to identify metadata labels associated with the data and/or instructions being loaded into the application memory 120. The loader 215 may resolve the metadata labels in the initialization specification into respective binary representations. However, it should be appreciated that aspects of the present disclosure are not limited to resolving metadata labels at load time. In some embodiments, a universe of metadata labels may be known during policy linking, and therefore metadata labels may be resolved at that time, for example, by the policy linker 225. This may advantageously reduce load time processing of the initialization specification.

In some embodiments, the policy linker 225 and/or the loader 215 may maintain a mapping of binary representations of metadata back to human readable versions of metadata labels. Such a mapping may be used, for example, by a debugger 230. For instance, in some embodiments, the debugger 230 may be provided to display a human readable version of an initialization specification, which may list one or more entities and, for each entity, a set of one or more metadata symbols associated with the entity. Additionally, or alternatively, the debugger 230 may be programmed to display assembly code annotated with metadata labels, such as assembly code generated by disassembling object code annotated with metadata labels. During debugging, the debugger 230 may halt a program during execution, and allow inspection of entities and/or metadata tags associated with the entities, in human readable form. For instance, the debugger 230 may allow inspection of entities involved in a policy violation and/or metadata tags that caused the policy violation. The debugger 230 may do so using the mapping of binary representations of metadata back to metadata labels.

In some embodiments, a conventional debugging tool may be extended to allow review of issues related to policy enforcement, for example, as described above. Additionally, or alternatively, a stand-alone policy debugging tool may be provided.

In some embodiments, the loader 215 may load the binary representations of the metadata labels into the metadata memory 125, and may record the mapping between application memory addresses and metadata memory addresses in the tag map table 142. For instance, the loader 215 may create an entry in the tag map table 142 that maps an application memory address where an instruction is stored in the application memory 120, to a metadata memory address where metadata associated with the instruction is stored in the metadata memory 125. Additionally, or alternatively, the loader 215 may store metadata in the tag map table 142 itself (as opposed to the metadata memory 125), to allow access without performing any memory operation.

In some embodiments, the loader 215 may initialize the tag register file 146 in addition to, or instead of, the tag map table 142. For instance, the tag register file 146 may include a plurality of registers corresponding, respectively, to a plurality of entities. The loader 215 may identify, from the initialization specification, metadata associated with the entities, and store the metadata in the respective registers in the tag register file 146.

Referring again to the example of FIG. 1, the loader 215 may, in some embodiments, load policy code (e.g., as output by the policy compiler 220) into the metadata memory 125 for execution by the policy processor 150. Additionally, or alternatively, a separate memory (not shown in FIG. 1) may be provided for use by the policy processor 150, and the loader 215 may load policy code and/or associated data into the separate memory.

In some embodiments, a metadata label may be based on multiple metadata symbols. For instance, an entity may be subject to multiple policies, and may therefore be associated with different metadata symbols corresponding, respectively, to the different policies. The inventors have recognized and appreciated that it may be desirable that a same set of metadata symbols be resolved by the loader 215 to a same binary representation (which is sometimes referred to herein as a "canonical" representation). For instance, a metadata label {A, B, C} and a metadata label {B, A, C} may be resolved by the loader 215 to a same binary representation. In this manner, metadata labels that are syntactically different but semantically equivalent may have the same binary representation.

The inventors have further recognized and appreciated it may be desirable to ensure that a binary representation of metadata is not duplicated in metadata storage. For instance, as discussed above, the illustrative rule cache 144 in the example of FIG. 1 may map input metadata tags to output metadata tags, and, in some embodiments, the input metadata tags may be metadata memory addresses where binary representations of metadata are stored, as opposed to the binary representations themselves. The inventors have recognized and appreciated that if a same binary representation of metadata is stored at two different metadata memory addresses X and Y, the rule cache 144 may not recognize an input pattern having the metadata memory address Y as matching a stored mapping having the metadata memory address X. This may result in a large number of unnecessary rule cache misses, which may degrade system performance.

Moreover, the inventors have recognized and appreciated that having a one-to-one correspondence between binary representations of metadata and their storage locations may facilitate metadata comparison. For instance, equality between two pieces of metadata may be determined simply by comparing metadata memory addresses, as opposed to comparing binary representations of metadata. This may result in significant performance improvement, especially where the binary representations are large (e.g., many metadata symbols packed into a single metadata label).

Accordingly, in some embodiments, the loader 215 may, prior to storing a binary representation of metadata (e.g., into the illustrative metadata memory 125 in the example of FIG. 1), check if the binary representation of metadata has already been stored. If the binary representation of metadata has already been stored, instead of storing it again at a different storage location, the loader 215 may refer to the existing storage location. Such a check may be done at startup and/or when a program is loaded subsequent to startup (with or without dynamic linking).

Additionally, or alternatively, a similar check may be performed when a binary representation of metadata is created as a result of evaluating one or more policies (e.g., by the illustrative policy processor 150 in the example of FIG. 1). If the binary representation of metadata has already been stored, a reference to the existing storage location may be used (e.g., installed in the illustrative rule cache 144 in the example of FIG. 1).

In some embodiments, the loader 215 may create a hash table mapping hash values to storage locations. Before storing a binary representation of metadata, the loader 215 may use a hash function to reduce the binary representation of metadata into a hash value, and check if the hash table already contains an entry associated with the hash value. If so, the loader 215 may determine that the binary representation of metadata has already been stored, and may retrieve, from the entry, information relating to the binary representation of metadata (e.g., a pointer to the binary representation of metadata, or a pointer to that pointer). If the hash table does not already contain an entry associated with the hash value, the loader 215 may store the binary representation of metadata (e.g., to a register or a location in a metadata memory), create a new entry in the hash table in association with the hash value, and store appropriate information in the new entry (e.g., a register identifier, a pointer to the binary representation of metadata in the metadata memory, a pointer to that pointer, etc.). However, it should be appreciated that aspects of the present disclosure are not limited to using a hash table to keep track of binary representations of metadata that have already been stored. Additionally, or alternatively, other data structures may be used, such as a graph data structure, an ordered list, an unordered list, etc. Any suitable data structure or combination of data structures may be selected based on any suitable criterion or combination of criteria, such as access time, memory usage, etc.

It should be appreciated that the techniques introduced above and/or discussed in greater detail below may be implemented in any of numerous ways, as these techniques are not limited to any particular manner of implementation. Examples of implementation details are provided herein solely for purposes of illustration. Furthermore, the techniques disclosed herein may be used individually or in any suitable combination, as aspects of the present disclosure are not limited to any particular technique or combination of techniques.

For instance, while examples are discussed herein that include a compiler (e.g., the illustrative compiler 205 and/or the illustrative policy compiler 220 in the example of FIG. 2), it should be appreciated that aspects of the present disclosure are not limited to using a compiler. In some embodiments, a software toolchain may be implemented as an interpreter. For example, a lazy initialization scheme may be implemented, where one or more default labels (e.g., DEFAULT, PLACEHOLDER, etc.) may be used for tagging at startup, and a policy processor (e.g., the illustrative policy processor 150 in the example of FIG. 1) may evaluate one or more policies and resolve the one or more default labels in a just-in-time manner.

The inventors have recognized and appreciated that it may be desirable to reduce an amount of memory used for storing metadata. This may be achieved by using smaller metadata tags. For instance, by associating each application data word with 16 bits of metadata, as opposed to 32 bits of metadata, a 50% reduction in metadata memory usage may be achieved. However, if each metadata value is only 16 bits long, at most $2^{16}$ (=65,536) distinct metadata values may be available, which may be insufficient if many complex policies are to be enforced simultaneously. For instance, a metadata value in memory may be a binary representation of a metadata label, which may be based on multiple metadata symbols corresponding to multiple polices. With an encoding that uses one bit for each distinct metadata symbol, a metadata value of 16 bits long may accommodate only 16 distinct metadata symbols.

Accordingly, in some embodiments, techniques are provided for reducing metadata memory usage while making available a sufficiently large number of distinct metadata values. For instance, different metadata encoding/decoding schemes may be provided, such that a single metadata value of a reduced size (e.g., 16 bits) may be converted into different metadata values of an unreduced size (e.g., 32 bits) depending on which encoding/decoding scheme is used. In this manner, metadata values of the reduced size may be stored in a metadata memory (e.g., the illustrative metadata memory 125 in the example of FIG. 1), and may be converted into metadata values of the unreduced size for use in evaluating policies (e.g., by the illustrative policy processor 150 or the illustrative rule cache 144 in the example of FIG. 1).

In some embodiments, an application memory (e.g., the illustrative application memory 120 in the example of FIG. 1) may include a plurality of regions, and a different metadata encoding/decoding scheme may be provided for each region. The inventors have recognized and appreciated that some metadata symbols may be associated only with addresses in certain application memory regions. As one example, an EXECUTE symbol for a Read-Write-eXecute (RWX) policy may be associated only with addresses in an application memory region for storing code.[1] Likewise, a PROLOGUE or EPILOGUE symbol for a stack policy may be associated only with addresses in an application memory region for storing code. Thus, the EXECUTE, PROLOGUE, and EPILOGUE symbols may be disregarded when generating an encoding for an application memory region that only stores data (as opposed to code). Such a regionalized encoding may therefore use fewer bits than a global encoding that encodes all symbols.

[1] A WRITE symbol for the RWX policy may be associated only with addresses in an application memory region for storing data, and a READ symbol for the RWX policy may be associated with addresses in both memory regions.

Moreover, the inventors have recognized and appreciated that a same metadata value may be used to encode different metadata labels, provided there is a way to disambiguate (e.g., based on application memory region). For instance, the EXECUTE symbol for the RWX policy may be associated only with addresses in an application memory region for storing code, whereas the WRITE symbol for the RWX policy may be associated only with addresses in an application memory region for storing data. Thus, a same bit position in a metadata value (e.g., a 16-bit value) may be used to encode the EXECUTE symbol and the WRITE symbol.

To disambiguate, the code memory region and the data memory region may, in some embodiments, be associated with different prefixes (e.g., different 16-bit prefixes), respectively. When tagging an address in the code memory region, the metadata value encoding both the EXECUTE symbol and the WRITE symbol may be decoded by prepending the prefix associated with the code memory region, resulting in a metadata value (e.g., a 32-bit value) corresponding to a metadata label comprising the EXECUTE symbol. By contrast, when tagging an address in the data memory region, the metadata value encoding both the EXECUTE symbol and the WRITE symbol may be decoded by prepending the prefix associated with the data memory region, resulting in a metadata value (e.g., a 32-bit value) corresponding to a metadata label comprising the WRITE symbol. However, it should be appreciated that aspects of the present disclosure are not limited to any particular metadata encoding/decoding scheme, or any particular reduced size for metadata tags. In some embodiments, different reduced sizes (e.g., 1 bit, 2 bits, 3 bits, 4 bits, 5 bits, 7 bits, 8 bits, etc.) may be provided, for example, based on a number of distinct metadata symbols to be enumerated.

The inventors have recognized and appreciated that some metadata symbols may be associated with addresses in multiple application memory regions. For instance, a READ symbol for the RWX policy may be associated with addresses in a code memory region, as well as addresses in a data memory region. For a metadata label comprising such symbols, it may be desirable to provide a same encoding across the different application memory regions, so that only one rule may be provided in a rule cache (e.g., the illustrative rule cache 144 in the example of FIG. 1).

Accordingly, in some embodiments, a selected set of metadata values may be designated as "global" metadata values. For instance, a range of metadata values (e.g., 10000 0000 0000 0000, . . . , 0000 0000 0001 11111) may be designated as a "global" metadata range. In some embodiments, a uniform encoding/decoding scheme may be used for global metadata values, whereas variable encoding/decoding schemes may be used for other metadata values. For instance, a global metadata value associated with an address may be decoded by prepending 16 zeros, regardless of which application memory region the address is in. In this manner, by mapping a metadata label into a global metadata range, the metadata label may be encoded uniformly across different application regions.

In some embodiments, different reduced sizes for metadata tags may be used, for example, depending on tagging granularity. For instance, 8-bit metadata values may be used for tagging 16-bit halfwords (e.g., 16-bit instructions), whereas 16-bit metadata values may be used for tagging 32-bit words (e.g., 32-bit instructions), but both types of metadata values may be converted into metadata values of an unreduced size (e.g., 32 bits) for use in evaluating policies (e.g., by a policy processor or a rule cache). In this manner, an appropriate tag size (e.g., a minimum tag size) may be chosen based on metadata complexity associated with a certain tagging granularity.

Figure 3:
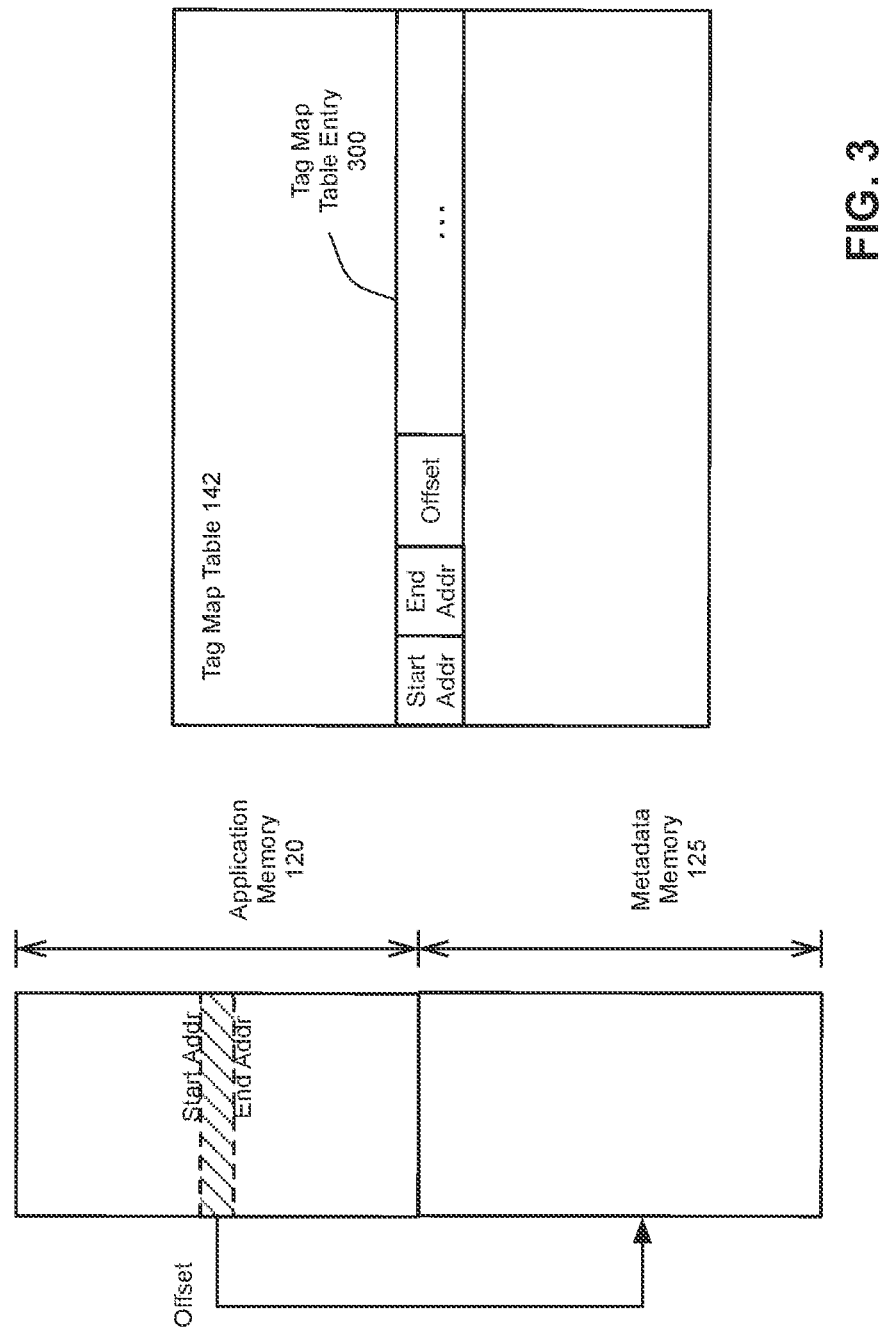
FIG. 3 shows an illustrative tag map table entry 300, in accordance with some embodiments.

In some embodiments, information for mapping application memory addresses to metadata memory addresses may be stored in a tag map table. FIG. 3 shows an illustrative tag map table entry 300, in accordance with some embodiments. For instance, the entry 300 may be an entry in the illustrative tag map table 142 in the example of FIG. 1.

In some embodiments, the tag map table 142 may be implemented using a fully associative array, although that is not required. Additionally, or alternatively, the tag map table 142 may be implemented using a hardware page table walker. For instance, if a fully associative array of the tag map table 142 becomes full, one or more overflow entries may be stored in a table in a metadata memory (e.g., the illustrative metadata memory 125 in the example of FIG. 1). If an input address does not match any entry in the fully associative array, the hardware page table walker may be used to walk through the table in the metadata memory 125 to look for an entry that matches the input address.

In the example of FIG. 3, the tag map table entry 300 stores an offset value to be added to an address in an application memory (e.g., the illustrative application memory 120 in the example of FIG. 1) to obtain an address in the metadata memory 125.

Additionally, or alternatively, the tag map table entry 300 may store information that associates the tag map table entry 300 with one or more application memory addresses. For instance, the tag map table entry 300 may store a start address and an end address, which may indicate an address range with which the tag map table entry 300 is associated.

In some embodiments, when a host processor (e.g., the illustrative host processor 110 in the example of FIG. 1) attempts to load data from the application memory 120, a target address of the load instruction may be used by tag processing hardware (e.g., the illustrative tag processing hardware 140 in the example of FIG. 1) to determine whether the load instruction should be allowed. The tag processing hardware 140 may match the target address to an entry in the tag map table 142, such as the tag map table entry 300. For instance, the tag processing hardware 140 may determine that the target address falls within an application memory range indicated by the start address and the end address stored in the tag map table entry 300. The tag processing hardware 140 may then add the offset value stored in the tag map table entry 300 to the target address to obtain a metadata memory address, and may use the metadata memory address to retrieve, from the metadata memory 125, a metadata tag associated with the target address.

However, it should be appreciated that aspects of the present disclosure are not limited to any particular technique for mapping the target address to a metadata memory address. In some embodiments, a metadata memory address may be obtained by applying a mask to the target address. For instance, the mask may include N zeros, so that a block of $2^N$ addresses may be mapped to a same metadata memory address.

In some embodiments, a result of masking the N least significant bits to zero may be compared to a first value indicative of an address block of size $2^N$ in the application memory 120. If the result matches the first value, the target address may be combined (e.g., using an OR operation) with a second value indicative of an offset with N trailing zeros, thereby obtaining the metadata memory address. The inventors have recognized and appreciated that, if the first and second values do not share any power of 2, then combining the target address with the second value using an OR operation may result in a sum of the target address and the offset. This may provide savings in terms of chip area, because an OR operations may be simpler to implement than an addition operation.

Referring again to the example of FIG. 3, the application memory 120 and the metadata memory 125 may be portions of a same physical memory. A memory management component may be used that implements an appropriate protection scheme to prevent instructions executing on the host processor from modifying metadata stored in the metadata memory 125. However, it should be appreciated that aspects of the present disclosure are not so limited. In some embodiments, the application memory 120 and the metadata memory 125 may be implemented on physically separate memories, and an appropriate mapping scheme may be used to map application memory addresses to metadata memory addresses.

Figure 4:
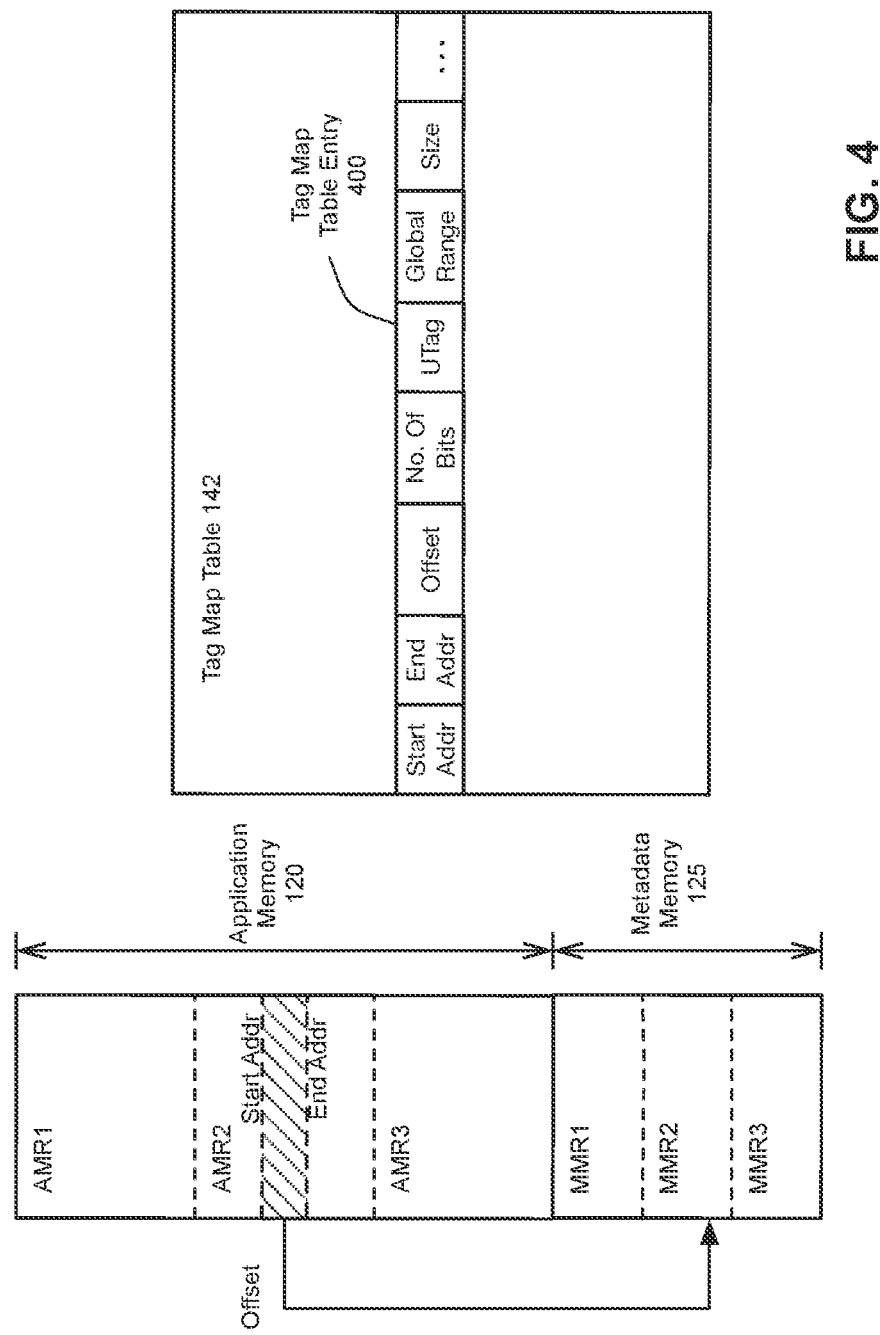
FIG. 4 shows another illustrative tag map table entry 400, in accordance with some embodiments.

In some embodiments, information for decoding metadata values may be stored in the tag map table 142, in addition to, or instead of, information for mapping application memory addresses to metadata memory addresses. FIG. 4 shows another illustrative tag map table entry 400, in accordance with some embodiments. In this example, the tag map table entry 400 includes an upper tag (UTag) field, which may store a value for use in resolving an encoded metadata value retrieved from the metadata memory 125 into a decoded metadata value to be provided to a policy processor (e.g., the illustrative policy processor 150 in the example of FIG. 1) or a rule cache (e.g., the illustrative rule cache 144 in the example of FIG. 1). For instance, the UTag field may store a 16-bit prefix to be prepended to 16-bit encoded metadata values to obtain 32-bit decoded metadata values.

It should be appreciated that aspects of the present disclosure are not limited to any particular metadata encoding/decoding scheme. For instance, the prefix in the UTag field may have any suitable length (e.g., 1 bit, 2 bits, 3 bits, 4 bits, . . . , 8 bits, . . . , 16 bits, etc.). Moreover, the tag map table entry 400 may include a lower tag (LTag) field in addition to, or instead of, the UTag field. The LTag field may store a postfix to be appended to encoded metadata values, and the postfix may have any suitable length (e.g., 1 bit, 2 bits, 3 bits, 4 bits, . . . , 8 bits, . . . , 16 bits, etc.).

Additionally, or alternatively, the tag map table entry 400 may include an additional tag (ATag) field and a position (Pos) field. The Pos field may store a value indicating a bit position dividing an encoded metadata value into upper and lower portions, between which a bit string stored in the ATag field is to be inserted. In some instances, the Pos field may indicate that the lower portion is empty, so that the bit string stored in the ATag field is to be appended, like a postfix stored in an LTag field. In some instances, the Pos field may indicate that the upper portion is empty, so that the bit string stored in the ATag field is to be prepended, like a prefix stored in a UTag field.

In some embodiments, another suitable transformation may be used in addition to, or instead of, inserting values by prepending, appending, or inserting at an internal bit position. Such a transformation may result in a decoded metadata value of any suitable length, which may be larger or small than, or equal to, a length of a corresponding encoded metadata value.

In some embodiments, the prefix in the UTag field may be determined based on an address range indicated by a start address and an end address stored in the tag map table entry 400. Thus, by storing different prefixes in different tag map table entries, different encodings may be provided for different address ranges, respectively. However, it should be appreciated that aspects of the present disclosure are not limited to storing a different prefix in each tag map table entry. For instance, in some embodiments, the application memory 120 may include a plurality of regions, such as regions AMR1, AMR2, and AMR3 in the example of FIG. 4. Metadata associated with addresses in the regions AMR1, AMR2, and AMR3 may be stored in regions MMR1, MMR2, and MMR3, respectively, of the metadata memory 125. For address ranges within a same application memory region, a same metadata prefix may be used, whereas different metadata prefixes may be used for address ranges in different application memory regions, respectively.

In some embodiments, the tag map table entry 400 may include a number of bits (No. of Bits) field, in addition to, or instead of, the UTag field. The No. of Bits field may store a value indicating a length of an encoded metadata value to be retrieved from the metadata memory 125. For instance, the No. of Bits field may store a value indicating that the encoded metadata value may have a length of zero bits, one bit, two bits, three bits, four bits, five bits, . . . , 8 bits (or one byte), . . . , 16 bits (or two bytes), etc. However, it should be appreciated that aspects of the present disclosure are not limited to indicating encoded metadata length in terms of bits. In some embodiments, a number of bytes field may be provided.

The inventors have recognized and appreciated that the No. of Bits field and the UTag field may be used in combination to provide flexible encoding/decoding schemes. For instance, the UTag field may store a 32-bit value. Depending on an encoded metadata length indicated in the No. of Bits field, more or fewer bits from the UTag field may be used for decoding. As an example, the No. of Bits field may indicate an encoded metadata length of 0 bits, and the 32-bit value in the UTag field may be used as a 32-bit decoded metadata value. No metadata value may be retrieved from the metadata memory 125. As another example, the No. of Bits field may indicate an encoded metadata length of 8 bits (or one byte), and the upper 24 bits of the 32-bit value in the UTag field may be prepended to an 8-bit encoded metadata value retrieved from the metadata memory 125, resulting in a 32-bit decoded metadata value. As another example, the No. of Bits field may indicate an encoded metadata length of 16 bits (or two bytes), and the upper 16 bits of the 32-bit value in the UTag field may be prepended to a 16-bit encoded metadata value retrieved from the metadata memory 125, again resulting in a 32-bit decoded metadata value. As another example, the No. of Bits field may indicate an encoded metadata length of 24 bits (or three bytes), and the upper 8 bits of the 32-bit value in the UTag field may be prepended to a 24-bit encoded metadata value retrieved from the metadata memory 125, again resulting in a 32-bit decoded metadata value.

Any suitable combination of one or more bits from the metadata memory 125 and/or one or more bits from the UTag field may be used, as aspects of the present disclosure are not so limited. Also, aspects of the present disclosure are not limited to decoded metadata values of any particular length. For instance, in some embodiments, 64-bit decoded metadata values may be used, in addition to, or instead of, 32-bit decoded metadata values.

It should be appreciated that aspects of the present disclosure are not limited to having a UTag field or a No. of Bits field. In some embodiments, a tag map table entry may include a lower offset (LOffset) and an upper offset (UOffset) field in addition to, or instead of, the illustrative No. of Bits and UTag fields in the example of FIG. 4. The LOffset field may be similar to the Offset field in the illustrative tag map entry 300 in the example of FIG. 3. For instance, an offset value in the LOffset field may be added to an input application memory address to obtain a first metadata memory address, from which one or more first bits may be retrieved. A different offset value may be stored in the UOffset field, and may be added to the input application memory address to obtain a second metadata memory address, from which one or more second bits may be retrieved. The one or more second bits may be prepended to the one or more first bits to provide a decoded metadata value.

In some embodiments, an input application memory address may be shifted to the right by M bit positions before adding an offset value from the LOffset field. In this manner, a block of $2^M$ application memory addresses may be associated with a same lower tag portion. Additionally, or alternatively, an input application memory address may be shifted to the right by N bit positions before adding an offset value from the UOffset field. In this manner, a block of $2^N$ application memory addresses may be associated with a same upper tag portion. N may, although need not, be equal to M. For instance, M may be zero (thus no right shifting), whereas N may be non-zero.

In some embodiments, a tag map table entry may include a field that stores information about a compression mechanism, in addition to, or instead of, the illustrative UTag field in the example of FIG. 4. For instance, metadata values associated with addresses in an application memory region may be known (e.g., at compile time), so that an appropriate lossless compression mechanism may be chosen for that memory region. As an example, a run-length encoding may be used for a page of metadata values in the metadata memory 125. Information regarding the encoding may be stored in a tag map table entry, and may be used for decoding. For instance, in some embodiments, a metadata cache may be used, and the information regarding the encoding may be sent to a caching block that inflates/deflates cache lines as part of its operation. Additionally, or alternatively, static analysis may be performed on metadata values associated with addresses in an application memory region (e.g., a region for storing code, as opposed to data), and an appropriate compression mechanism may be selected based on entropy of the metadata values.

In some embodiments, a tag map table entry may include a field that stores information about an encryption mechanism, in addition to, or instead of, information about a compression mechanism. For instance, metadata values associated with addresses in an application memory region may be stored in an external memory, which may be less secure than an on-chip memory. Therefore, the metadata values may be stored in an encrypted form, and a tag map table entry corresponding to the application memory region may store a key for encrypting and/or decrypting the metadata values.

It should be appreciated that encryption may be applied before or after compression, or without compression. Likewise, compression may be applied without encryption. Neither is required.

The inventors have recognized and appreciated that it may sometimes be desirable to use encoded metadata values having a length that is not a power of 2. However, if a length of a metadata value is not a power of 2 (e.g., 24 bits), a ratio between a tagging granularity (e.g., 32 bits) and the length of the metadata value may not be a power of 2 (e.g., 4/3). Therefore, one or more multipliers may be used to generate a metadata memory address from an input application memory address. For instance, the input application memory address may be divided by 4 (e.g., by right shifting the input address by two bit positions), and then multiplied by 3. The inventors have recognized and appreciated that such multipliers may be costly (e.g., in terms of time, area, and/or power). Accordingly, techniques are provided for handling encoded metadata values having a length that is not a power of 2, without using a multiplier to generate metadata addresses.

In some embodiments, a tag map table entry may store multiple offsets for use in handling encoded metadata values having a length that is not a power of 2. For instance, there may an Offset1 field and an Offset0 field, in addition to, or instead of, the No. of Bits field. An offset value in the Offset1 field may be added to an input application memory address to obtain a first metadata memory address, from which $2^M$ first bits may be retrieved. An offset value in the Offset0 field may be added to the input application memory address to obtain a second metadata memory address, from which $2^N$ second bits may be retrieved. The $2^N$ second bits may be prepended to the $2^M$ first bits, resulting in an encoded metadata value having a length of $2^M+2^N$. In this manner, encoded metadata values may be handled that have a length of 3 bits ($2^1+2^0$), 5 bits ($2^2+2^0$), 6 bits ($2^2+2^1$), 9 bits ($2^3+2^0$), 10 bits ($2^3+2^1$), 12 bits ($2^3+2^2$), 17 bits ($2^4+2^0$), 18 bits ($2^4+2^1$), 20 bits ($2^4+2^2$), or 24 bits ($2^4+2^3$).

In some embodiments, a tag map table entry may store more than two offsets. For instance, there may an Offset2 field, in addition to the Offset1 field and the Offset0 field. An offset value in the Offset2 field may be added to an input application memory address to obtain a third metadata memory address, from which $2^O$ third bits may be retrieved. The $2^O$ third bits, the $2^N$ second bits, and the $2^M$ first bits may be concatenated, resulting in an encoded metadata value having a length of $2^M+2^N+2^O$. In this manner, encoded metadata value may be handled that have a length of 7 bits ($2^2+2^1+2^0$), 11 bits ($2^3+2^1+2^0$), 13 bits ($2^3+2^2+2^0$), 14 bits ($2^3+2^2+2^1$), 19 bits ($2^4+2^1+2^0$), 21 bits ($2^4+2^2+2^0$), 22 bits ($2^4+2^2+2^1$), 25 bits ($2^4+2^3+2^0$), 26 bits ($2^4+2^3+2^1$), or 28 bits ($2^4+2^3+2^2$), It should be appreciated that any suitable number of offsets may be used, such as zero, one, two, three, four, etc. However, the inventors have recognized and appreciated that, with each additional offset, an additional fetch may be performed from the metadata memory 125 or a metadata cache, which may cause a slowdown (e.g., one or more additional clock cycles). Therefore, a suitable number of offsets may be selected to provide a desired level of flexibility with respect to encoded metadata lengths, without significantly impacting performance.

In some embodiments, the tag map table entry 400 may include a global range field in addition to, or instead of, the No. of Bits and UTag fields. The global range field may store a value indicative of a range of metadata values. For instance, the global range field may store a value (e.g., 0000 0000 0001 1111) indicating an upper bound of a range starting at zero (e.g., {0000 0000 0000 0000, . . . , 0000 0000 0001 1111}). In some embodiments, if an encoded metadata value retrieved from the metadata memory 125 falls within the range indicated in the global range field, the encoded metadata value may be decoded by prepending a suitable number of zeros, without using any prefix from the UTag field. In this manner, a uniform encoding/decoding scheme may be used for encoded metadata values within the range indicated in the global range field, whereas variable encoding/decoding schemes may be used for other encoded metadata values.

In some embodiments, the tag map table entry 400 may include a size field, in addition to, or instead of, the No. of Bits, UTag, and Global Range fields. The size field may store a value indicative of a granularity of tagging. As an example, the size field may store a value indicating that, for the address range indicated by the start address and the end address stored in the tag map table entry 400, tagging is done on a block-by-block basis. For instance, each block may include $2^N$ words, where N is the value stored in the size field. In this manner, only one metadata value may be stored for an entire block of application memory addresses, which may reduce an amount of memory used to store metadata values. For example, a host processor (e.g., the illustrative host processor 110 in the example of FIG. 1) may attempt to co-locate buffers that are homogeneously tagged (same metadata value for entire buffer) and are larger than a selected threshold size (e.g., $2^{10}$ bytes, namely, one kilobyte or 1 KB). By storing N=10 in the size field, only one metadata value may be stored for one kilobyte of application memory, which may represent a 1024 times reduction in metadata memory footprint, compared to word-by-word tagging.

The inventors have recognized and appreciated that one or more of the techniques described herein for encoding metadata for different application memory regions may be used, additionally or alternatively, to encode metadata for other storage regions. For instance, in some embodiments, a same metadata value may be used to tag all registers in a memory-mapped peripheral device (e.g., a universal asynchronous receiver-transmitter, or UART). This metadata value may be stored directly in a tag map table entry for the peripheral device. However, in some instances, a size of the metadata value may exceed a capacity of the tag map table entry. Accordingly, in some embodiments, a metadata value for a peripheral device may be stored in the metadata memory 125, and a size field may be provided in a tag map table entry for the peripheral device. The size field may store a value selected based on a size of a range of memory addresses associated with the peripheral device (e.g., N=12 for a 4 KB device).

Although the inventors have recognized and appreciated various advantages of applying a lower granularity of tagging (e.g., via the illustrative size field in the example of FIG. 4), it should be appreciated that aspects of the present disclosure are not limited to any particular granularity of tagging. In some embodiments, a higher granularity of tagging may be applied, for example, via a mask. In some embodiments, a tag map table entry may include a field that stores a two-bit mask, in addition to, or instead of, the size field. As one example, if tagging is to be done on a word-by-word basis (e.g., for 32-bit words) for the address range indicated by the start address and the end address stored in the tag map table entry 400, the two-bit mask may be set to 2'b00. The two-bit mask may be applied to an input application memory address (e.g., 0x123) to obtain a masked application memory address (e.g., 0x120), which may then be mapped to a metadata memory address. In this manner, four different byte-addresses (e.g., 0x120, 0x121, 0x122, and 0x123) may be mapped to a same metadata memory address, thereby effecting word-by-word tagging.

As another example, if tagging is to be done on a halfword-by-halfword basis (e.g., for 16-bit halfwords) for the address range indicated by the start address and the end address stored in the tag map table entry 400, the two-bit mask may be set to 2'b10. The two-bit mask may be applied to an input application memory address (e.g., 0x123) to obtain a masked application memory address (e.g., 0x122), which may then be mapped to a metadata memory address. In this manner, two different byte-addresses (e.g., 0x122 and 0x123) may be mapped to a same metadata memory address, thereby effecting halfword-by-halfword tagging.

Although various metadata encoding techniques are described in connection with a tag map table entry, it should be appreciated that aspects of the present disclosure are not limited to using a tag map table. In some embodiments, fixed hardware logic and/or a processor programmed by software may be used in addition to, or instead of, a tag map table.

Referring again to the example of FIG. 1, the illustrative host processor 110 may, in some embodiments, include one or more caches. Such a cache may provider faster access than the illustrative application memory 120, but may be more costly. Accordingly, application data from selected locations in the application memory 120 may be replicated in a cache to improve performance of the host processor 110. For instance, application data from recently and/or frequently accessed locations may be cached.

FIG. 5A shows an illustrative instruction cache 512 and an illustrative data cache 514, in accordance with some embodiments. In this example, the host processor 110 has a pipelined architecture with a fetch stage 502, an execute stage 504, and a retire stage 506. However, it should be appreciated that aspects of the present disclosure are not limited to having any particular stage or combination of stages in a pipeline, or any pipeline at all. For instance, in some embodiments, there may be a decode stage for decoding an instruction fetched at the fetch stage 502.

In some embodiments, the instruction cache 512 may be a set associative cache having N ways of M cache lines each, and thus a total of N*M cache lines. Such a cache is sometimes referred to herein as an "N-way" cache. Any suitable combination of N and M may be used, including N=1 and/or M=1. As an example, N may be 8, and M may be 128, so there may be a total of 1024 cache lines. If each cache line stores 16 bytes of data, a total of 16 KB may be available in the instruction cache 512.

In some embodiments, an application memory address may have 32 bits, where bits [31:4] may identify a memory block of 16=2^4 bytes, and bits [3:2] may identify an offset of a 32-bit word within the memory block. Bits [10:4] of the address may be used to identify a cache line from each of N=8 cache ways. (In this example, M=128=2^7, so 7 bits may be used to identify a cache line from each cache way.) Such bits are sometimes referred to herein as "index bits" of the address, while the collection of identified cache lines is sometimes referred to herein as a "cache set" indexed by the index bits.

In some embodiments, application data from the memory block may be stored in one of the identified cache lines, and bits [31:11] of the address may be stored in a cache tag of the cache line where the application data is stored. Such bits are sometimes referred to herein as "tag bits" of the address.[2] The cache tag and the index of the cache line may be used to determine where in the application memory 120 to write the application data when the cache line is evicted. For instance, bits from the cache tag may be used as the most significant bits (e.g., [31:11]), and bits from the index may be used as the following bits (e.g., [10:4]).

[2]"Tag" in this context refers to a cache tag, which is different from a metadata tag.

In some embodiments, the data cache 514 may similarly be a set associative cache having N ways of M cache lines each. However, it should be appreciated that aspects of the present disclosure are not limited to having an instruction cache and a data cache that are similarly configured. Moreover, aspects of the present disclosure are not limited to using set associative caches, or any cache at all. A cache of any suitable type may be used, with entries that are configured in any suitable manner.

Referring again to the example of FIG. 5A, at the fetch stage 502, an address stored in a program counter (PC) may be used to look up the instruction cache 512. Such an address is sometimes referred to herein as an "instruction address." If the instruction address matches an entry in the instruction cache 512, application data stored in that entry may be returned to the fetch stage 502 as an instruction to be executed by the host processor 110. For instance, one or more index bits of the instruction address may be used to identify a cache set in the instruction cache 512, and one or more tag bits of the instruction address may be compared against cache tags of all cache lines in the cache set. If the tag bits of the instruction address match the cache tag of one of the cache lines, application data stored in that cache line may be returned.

In some embodiments, if the tag bits of the instruction address do not match the cache tag of any cache line in the indexed cache set, it may be determined that the instruction address does not match any entry in the instruction cache 512. Accordingly, the instruction address may be used to initiate a transaction on the illustrative bus 115 in the example of FIG. 1 to read from the application memory 120 (not shown in FIG. 5A). Application data read from the application memory 120 may be returned to the fetch stage 502. Additionally, or alternatively, a new entry in the instruction cache 512 may be created that matches the instruction address, and may store a copy of the application data read from the application memory 120.

In the example of FIG. 5A, a load instruction is fetched from the instruction cache 512. Accordingly, at the execute stage 504, a target address of the load instruction may be used to look up the data cache 514. If the target address matches an entry in the data cache 514 (e.g., one or more tag bits of the target address matching a cache tag of a cache line in a cache set indexed by one or more index bits of the target address), application data stored in that entry may be returned to the execute stage 504. If there is no match, the target address may be used to initiate a transaction on the bus 115 to read from the application memory 120 (not shown in FIG. 5A). Application data read from the application memory 120 may be returned to the execute stage 504. Additionally, or alternatively, a new entry in the data cache 514 may be created that matches the target address, and may store a copy of the application data read from the application memory 120.

Thus, performance of the host processor 110 may be improved by managing addresses cached at the instruction cache 512 and/or the data cache 514 so as to reduce a frequency of read transactions with the application memory 120.

The inventors have recognized and appreciated that caching may also be used to improve performance of the illustrative tag processing hardware 140 in the example of FIG. 1. Accordingly, in some embodiments, the tag processing hardware 140 may include a metadata cache 524 that stores copies of metadata from selected locations in the illustrative metadata memory 125.

In the example of FIG. 5A, the instruction address used to look up the instruction cache 512 is provided to the tag processing hardware 140 via a trace interface. For instance, the instruction address may be provided to the illustrative tag map table 142, which may map the instruction address to a metadata address A. The metadata address A may in turn be used to look up the metadata cache 524. If the metadata address A matches an entry in the metadata cache 524 (e.g., one or more tag bits of the metadata address A matching a cache tag of a cache line in a cache set indexed by one or more index bits of the metadata address A), metadata C stored in that entry may be output to a query logic 522. If there is no match, the metadata address A may be used to initiate a transaction on the bus 115 to read from the metadata memory 125 (not shown in FIG. 5A). Metadata read from the metadata memory 125 may be output to the query logic 522. Additionally, or alternatively, a new entry in the metadata cache 524 may be created that matches the metadata address A, and may store a copy of the metadata read from the metadata memory 125.

Additionally, or alternatively, the target address of the load instruction may be provided to the tag processing hardware 140 via the trace interface, and may be mapped by the tag map table 142 to a metadata address B. The metadata address B may in turn be used to look up the metadata cache 524. If the metadata address B matches an entry in the metadata cache 524 (e.g., one or more tag bits of the metadata address B matching a cache tag of a cache line in a cache set indexed by one or more index bits of the metadata address B), metadata D stored in that entry may be output to the query logic 522. If there is no match, the metadata address B may be used to initiate a transaction on the bus 115 to read from the metadata memory 125 (not shown in FIG. 5A). Metadata read from the metadata memory 125 may be output to the query logic 522. Additionally, or alternatively, a new entry in the metadata cache 524 may be created that matches the metadata address B, and may store a copy of the metadata read from the metadata memory 125.

Additionally, or alternatively, the instruction returned to the fetch stage 502 may be provided to the tag processing hardware 140 via the trace interface. For instance, the fetched instruction may be provided to the query logic 522, which may use the metadata C, the fetched instruction, and/or the metadata D to construct a query E to the illustrative rule cache 144 in the example of FIG. 1. The rule cache 144 may provide a response F, which may indicate whether the query E matches an entry in the rule cache 144. If a matching entry is found, it may be determined that the instruction should be allowed. If there is no match, the illustrative policy process 150 in the example of FIG. 1 (not shown in FIG. 5A) may be invoked to determine whether the instruction should be allowed.

In some embodiments, the response F from the rule cache 144 may indicate new metadata G to be associated with the target address. The query logic 522 may provide the new metadata G to the metadata cache 524, which may store the metadata G in the entry matching the metadata address B, replacing the metadata D.

It should be appreciated that a load instruction is shown in FIG. 5A and discussed above solely for purposes of illustration. Aspects of the present disclosure are not limited to any particular instruction type.

Figure 5B:
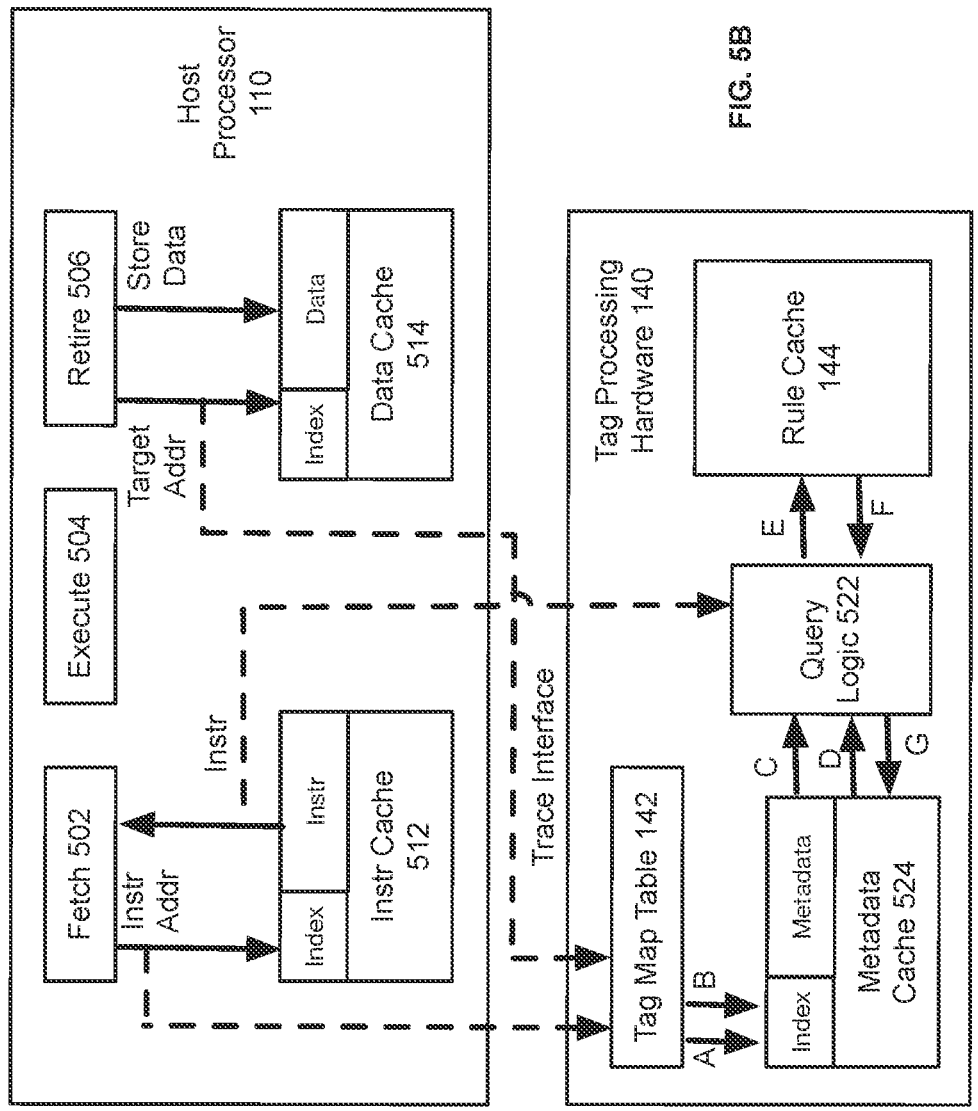

FIG. 5B shows an example in which a store instruction is fetched from the instruction cache 512. Accordingly, at the retire stage 506, a target address of the store instruction and/or application data to be stored may be provided to the data cache 514. If the target address matches an entry in the data cache 514 (e.g., one or more tag bits of the target address matching a cache tag of a cache line in a cache set indexed by one or more index bits of the target address), existing application data in that entry may be replaced by the application data provided by the retire stage 506. If there is no matching entry, a new entry the data cache 514 may be created that matches the target address, and may store the application data provided by the retire stage 506.

In some embodiments, the data cache 514 may check whether the target address is within a non-cacheable range of addresses. If so, no new entry may be created. Instead, the target address may be used to initiate a transaction on the bus 115 to write to the application memory 120 (not shown in FIG. 5B).

In some embodiments, the data cache 514 may be a write-through cache. Accordingly, the application data provided by the retire stage 506 may be written to the application memory 120 (not shown in FIG. 5B), in addition to being cached.

In some embodiments, the target address of the store instruction may be provided to the tag processing hardware 140 via the trace interface, and may be mapped by the tag map table 142 to a metadata address B. The metadata address B may be used to check the store instruction, for instance, in a similar manner as checking the illustrative load instruction in the example of FIG. 5A.

Although details of implementation are shown in FIGS. 5A-B and discussed above, it should be appreciated that aspects of the present disclosure are not limited to any particular component, or combination of components, or to any particular arrangement of components. For instance, aspects of the present disclosure are not limited to having, separately, an instruction cache and a data cache. In some embodiments, a same cache may be used for both instructions and data manipulated by the instructions. Indeed, aspects of the present disclosure are not limited to using any particular number of cache(s), or any cache at all. The cache(s) may be arranged in any suitable manner, for instance, in a hierarchy (e.g., level 1, level 2, etc.).

The inventors have recognized and appreciated that having a metadata cache separate from application data cache(s) may take up additional area on a system-on-a-chip (SoC). For instance, the illustrative metadata cache 524 in the examples of FIGS. 5A-B may have its own set of cache control logic, separate from those of the illustrative instruction cache 512 and the illustrative data cache 514. Moreover, when metadata is cached separately from corresponding application data, an additional cache lookup may be performed to retrieve the metadata, which may consume more power.

Accordingly, in some embodiments, metadata may be cached together with corresponding application data. For instance, a cache may be provided where an entry may store both application data and corresponding metadata. In this manner, the application data and the corresponding metadata may be retrieved via a single cache lookup, which may reduce power consumption. Moreover, a separate set of cache control logic may be eliminated, which may reduce chip area.

Figure 6A:
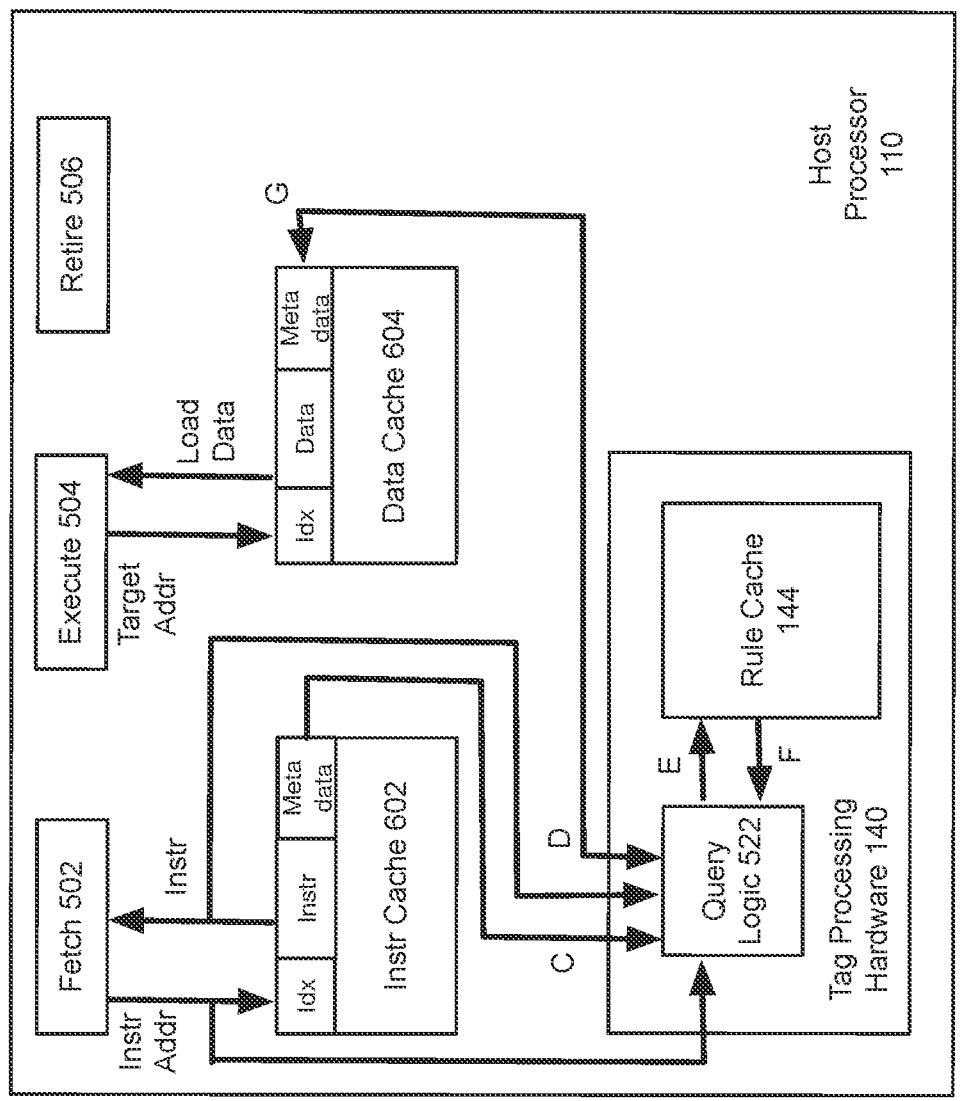
FIGS. 6A-B show another illustrative instruction cache 602 and another illustrative data cache 604, in accordance with some embodiments.

FIG. 6A shows an illustrative instruction cache 602 and an illustrative data cache 604, in accordance with some embodiments. In this example, an entry in the instruction cache 602 may store application data representing an instruction to be executed, as well as corresponding metadata. Similarly, an entry in the data cache 604 may store application data representing data manipulated by one or more instructions, as well as corresponding metadata.

In some embodiments, if the illustrative fetch stage 502 in the examples of FIGS. 5A-B presents an address that matches an entry in the instruction cache 602, application data stored in that entry may be returned to the fetch stage 502 as an instruction to be executed by the host processor 110. Additionally, or alternatively, metadata C stored in that entry may be provided to the illustrative query logic 522 in the examples of FIGS. 5A-B.

In the example of FIG. 6A, a load instruction is fetched from the instruction cache 602. Accordingly, a target address of the load instruction may be used to look up the data cache 604. If the target address matches an entry in the data cache 604, application data stored in that entry may be returned to the illustrative execute stage 504 in the examples of FIGS. 5A-B. Additionally, or alternatively, metadata D stored in that entry may be provided to the query logic 522.

In some embodiments, the metadata C from the instruction cache 602 and/or the metadata D from the data cache 604 may be used to check the load instruction in a manner similar to that in the example of FIG. 5A. Additionally, or alternatively, the query logic 522 may provide new metadata G to the data cache 604, which may store the metadata G in the entry matching the target address, replacing the metadata D. For instance, pursuant to a certain policy, the tag processing hardware 140 may keep track of a number of times the target address has been read. Accordingly, the metadata D may include a current counter value, whereas the metadata G may include an incremented counter value.

In some embodiments, the data cache 604 may be configured as a write-through cache. Accordingly, the metadata G provided by the query logic 522 may be written to the illustrative metadata memory 125 in the example of FIG. 1 (not shown in FIG. 6A), in addition to being cached.

Figure 6B:
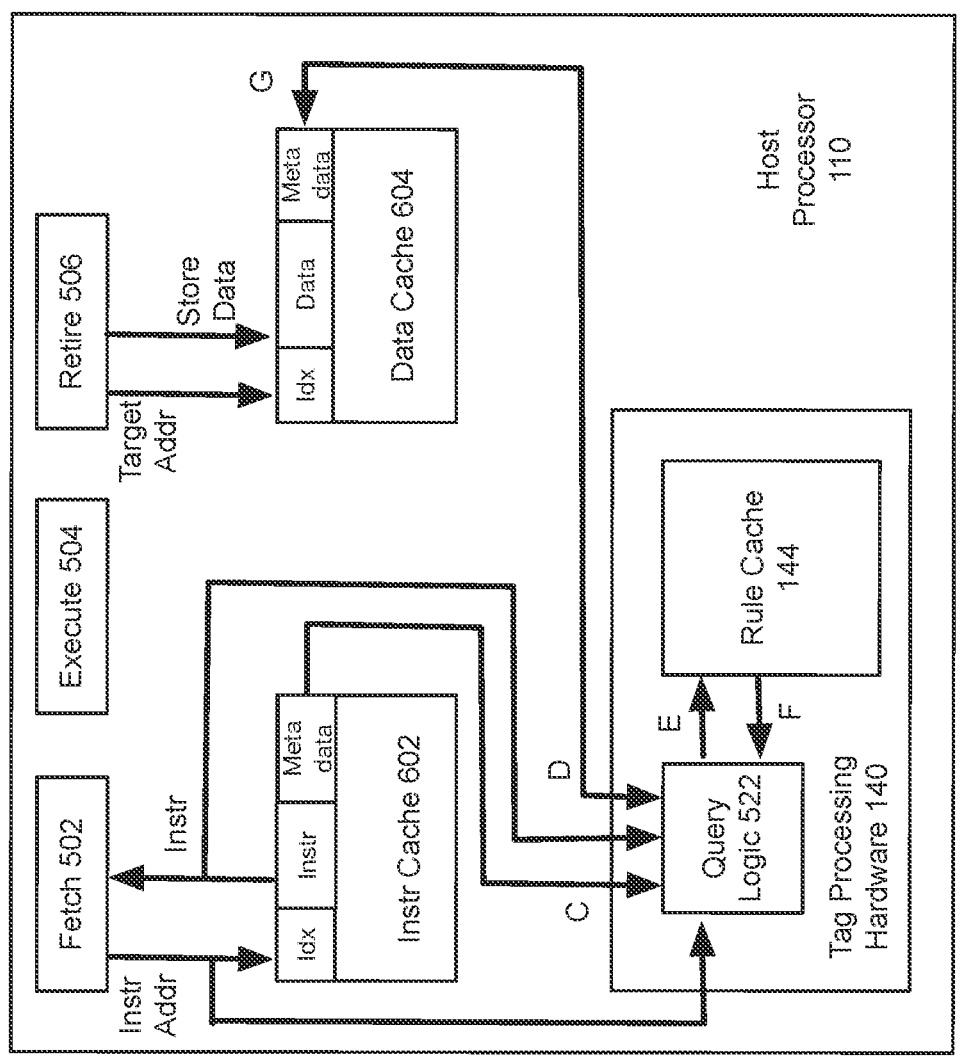

FIG. 6B shows an example in which a store instruction is fetched from the instruction cache 602. Accordingly, a target address of the store instruction and/or application data to be stored may be provided to the data cache 604 by the illustrative retire stage 506 in the examples of FIGS. 5A-B. If the target address matches an entry in the data cache 604, existing application data in that entry may be replaced by the application data provided by the retire stage 506. Additionally, or alternatively, metadata D stored in that entry may be provided to the query logic 522.

In some embodiments, the metadata C from the instruction cache 602 and/or the metadata D from the data cache 604 may be used to check the store instruction in a manner similar to that in the example of FIG. 5B. Additionally, or alternatively, the query logic 522 may provide new metadata G to the data cache 604, which may store the metadata G in the entry matching the target address, replacing the metadata D.

In some embodiments, the data cache 604 may be configured as a write-through cache. Accordingly, the application data provided by the retire stage 506 may be written to the illustrative application memory 120 in the example of FIG. 1 (not shown in FIG. 6B), in addition to being cached. Likewise, the metadata G provided by the query logic 522 may be written to the metadata memory 125 (not shown in FIG. 6B), in addition to being cached.

In some embodiments, the data cache 604 may be configured as a write-back cache. Accordingly, the application data provided by the retire stage 506 may be stored in the entry matching the target address, without being written to the application memory 120. Likewise, the metadata G provided by the query logic 522 may be stored in the entry matching the target address, without being written to the metadata memory 125. Subsequently, the entry matching the target address may be evicted from the data cache 604 (e.g., to make room for a new entry). At that point, the application data provided by the retire stage 506 and the metadata G provided by the query logic 522 may be written to the application memory 120 and the metadata memory 125, respectively.

In some instances, a region of the application memory 120 may be used by a direct memory access (DMA) component (e.g., a graphics peripheral that reads application data directly from the application memory 120, without load instructions executed by the host processor 110). Accordingly, the data cache 604 may be configured as a write-through cache for that region of the application memory 120.

However, the inventors have recognized and appreciated that such a DMA component may be unaware of metadata processing. Therefore, the data cache 604 may, simultaneously, be configured as a write-back cache for metadata. Accordingly, the application data provided by the retire stage 506 may be written to the application memory 120, in addition to be being cached, while the metadata G provided by the query logic 522 may be stored in the entry matching the target address, without being written to the metadata memory 125. This may advantageously reduce power consumption associated with writing metadata to the metadata memory 125. Additionally, or alternatively, bandwidth on the illustrative bus 115 in the example of FIG. 1 may be conserved for other activities.

However, it should be appreciated that aspects of the present disclosure are not limited to configuring the data cache 604 in any particular manner. In some embodiments, the data cache 604 may be configured as a write-back cache for application data, but as a write-through cache for metadata.

In some embodiments, a read request to the instruction cache 602 or the data cache 604 may include a signal to indicate that only application data (and hence no metadata) is requested, or vice versa. For example, instructions from a certain application memory region may be deemed as trusted code. Such instructions may not be checked by the tag processing hardware 140. Additionally, or alternatively, the illustrative policy processor 150 in the example of FIG. 1 may be implemented by the host processor 110 (e.g., executing in a metadata processing mode). Instructions executed by the host processor 110 while acting as the policy processor 150 may not be checked by the tag processing hardware 140. Accordingly, only application data (and hence no metadata) may be requested from the instruction cache 602.

Additionally, or alternatively, only metadata (and hence no application data) may be requested. For instance, to determine if the store instruction should be allowed in the example of FIG. 6B, the metadata D (but not the application data) stored in the entry matching the target address may be requested from the data cache 604.

In some embodiments, a write request to the data cache 604 may include a signal to indicate only application data (and hence no metadata) is provided, or vice versa. For instance, referring to the example of FIG. 6A, the application data to be stored may be written to the data cache 604 in the entry matching the target address of the store instruction, while the metadata in that entry may remain unchanged. Additionally, or alternatively, referring to the example of FIG. 6A, the new metadata G may be written to the data cache 604 in the entry matching the target address of the load instruction, while the application data in that entry may remain unchanged.

The inventors have recognized and appreciated that, in the examples of FIGS. 5A-B, application data and corresponding metadata are indexed using different addresses. For instance, application data in the illustrative data cache 514 may be indexed using a target address from the execute stage 504 or the retire stage 506, whereas metadata in the illustrative metadata cache 524 may be indexed using a metadata address to which the illustrative tag map table 142 maps the target address.

By contrast, in the examples of FIGS. 6A-B, application data and corresponding metadata are indexed using a same address. This may advantageously reduce an amount of cache memory used to store indices.

The inventors have further recognized and appreciated that, in the examples of FIGS. 5A-B, cache miss processing for application data (e.g., by the illustrative instruction cache 512) and cache miss processing for metadata (e.g., by the metadata cache 524) may be serialized. For instance, the instruction address and/or the target address may be provided to the illustrative tag processing hardware 140 via the trace interface after the corresponding instruction has been retired by the illustrative host processor 110. As a result, even though a cache miss at the instruction cache 512 likely implies a cache miss at the metadata cache 524, cache miss processing at the metadata cache 524 may not commence until cache miss processing at the instruction cache 512 has been completed. This may lead to a high penalty in performance.

By contrast, in the examples of FIGS. 6A-B, cache miss processing for application data and cache miss processing for metadata may be performed in parallel by the illustrative instruction cache 602 or the illustrative data cache 604, thereby reducing performance penalty. For instance, in response to receiving an input instruction address that does not match any existing entry, the instruction cache 602 may use the instruction address to read both application data and corresponding metadata from one or more memories. The retrieved application data may be returned to the fetch stage 502, whereas the retrieved metadata may be provided to the query logic 522. Additionally, or alternatively, a new entry in the instruction cache 602 may be created that matches the instruction address, and may store both the retrieved application data and the retrieved metadata.

Although the inventors have recognized and appreciated various advantages of storing both application data and corresponding metadata in a same cache entry, it should be appreciated that aspects of the present disclosure are not so limited. In some embodiments, X bits (e.g., 32 bits) may be available in a cache entry, of which Y bits (e.g., 32 bits, 24 bits, 16 bits, 8 bits, or 0 bits) may be used for application data, and Z bits (e.g., 0 bits, 8 bits, 16 bits, 24 bits, or 32 bits) may be used for metadata. The numbers Y and Z may be statically or dynamically selected. In this manner, if metadata processing is statically disabled, or if the host processor 110 is executing a large number of instructions that do not require checking, more cache memory may be devoted to application data.

Additionally, or alternatively, a cache entry may be indexed by an application memory address, and the numbers Y and Z may be selected for the cache entry based on a memory region to which the application memory address belongs. In this manner, caching density may be improved for an application memory region that is without metadata, or with common metadata for all application data words in the region. For instance, a cache entry may store a flag to indicate that every application data word in the cache entry is associated with a same metadata word, so that the same metadata word may be stored only once, thereby freeing up space in the cache entry for application data. Moreover, because only one metadata word may be read from the metadata memory to populate the cache entry, performance may be improved, and/or power consumption may be reduced.

It should be appreciated that aspects of the present disclosure are not limited to storing only once a metadata word that is shared across multiple application data words. The inventors have recognized and appreciated that additional logic may be used to retrieve a metadata word in response to a read request from the host processor 110. For example, the additional logic may check the flag in the cache entry to determine whether there is a one-to-one or many-to-one correspondence between application data words and metadata words, which may, in turn, allow the additional logic to determine where in the cache entry the desired metadata word may be stored. In some instances, such logic may be complex, and additional pipelining may be required. Therefore, in some embodiments, a metadata word that is shared across multiple application data words may be duplicated (e.g., once for every one of the application words), so that read logic may be simplified.

In some embodiments, application data and corresponding metadata may be stored in separate cache ways. For instance, in an N-way set associative cache (e.g., N=8), $N_0$ cache ways in each set may be used to store application data (e.g., $N_0$=4), while the remaining $N_1$ cache ways in the same set may be used to store corresponding metadata (e.g., $N_1$=4).

Figure 7A:
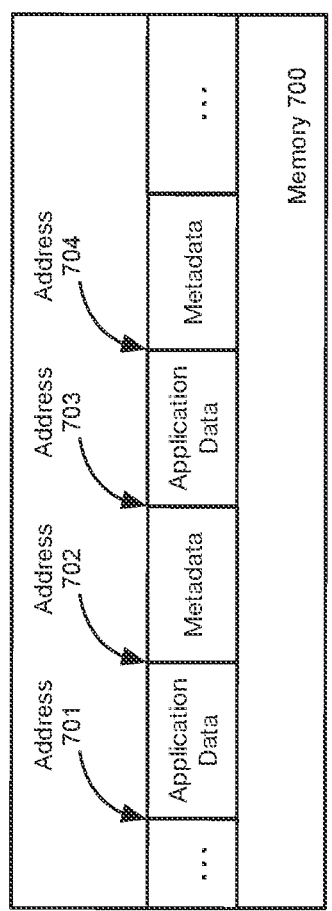
FIG. 7A shows an illustrative memory 700 that stores both application data and metadata, in accordance with some embodiments.

In some embodiments, application data and metadata may be intermingled in a same memory. FIG. 7A shows an illustrative memory 700 that stores both application data and metadata, in accordance with some embodiments. In this example, each word (e.g., 8 bits, 16 bits, 32 bits, 64 bits, 128 bits, etc.) of application data may be immediately followed by a word of corresponding metadata. For instance, metadata corresponding to application data stored at address 701 may be stored at a next address 702, metadata corresponding to application data stored at address 703 may be stored at a next address 704, etc. Thus, application data and corresponding metadata may be retrieved by simply reading two consecutive words from an address for the application data.

The inventors have recognized and appreciated that, while storing application data and corresponding metadata side-by-side in memory (e.g., as in the example of FIG. 7) may provide simplicity, there may be one or more disadvantages. For instance, given a word (e.g., 32 bits) of application data, corresponding metadata may also take up a word (e.g., also 32 bits). This may effectively double memory usage, which may be undesirable. Moreover, to retrieve both the application data and the corresponding metadata, either two read transactions may be performed (e.g., 32 bits each), or a widened bus (e.g., 64 bits) may be used. The former may decrease performance, whereas the latter may increase cost and/or chip area. Lastly, some on-chip components (e.g., a DMA component that is unaware of metadata processing) may require modification to access every other word in memory, so that only application data may be accessed.

Accordingly, in some embodiments, application data and metadata may be stored in separate memories, such as the illustrative application memory 120 and the illustrative metadata memory 125 in the example of FIG. 1. The application memory 120 and the metadata memory 125 may be physically separate. Additionally, or alternatively, a memory management component may enforce a separation between the application memory 120 and the metadata memory 125. In some embodiments, such separation may be statically configured, so that malicious code injected into the application memory 120 at run time may be unable to modify metadata in the metadata memory 125.

In some embodiments, in response to determining that an input instruction address does not match any existing entry, the illustrative instruction cache 602 in the examples of FIG. 6A-B may use the instruction address to read from the application memory 120. In parallel, the instruction cache 602 may map the instruction address to a metadata address, and may use the metadata address to read from the metadata memory 125.

Figure 7B:
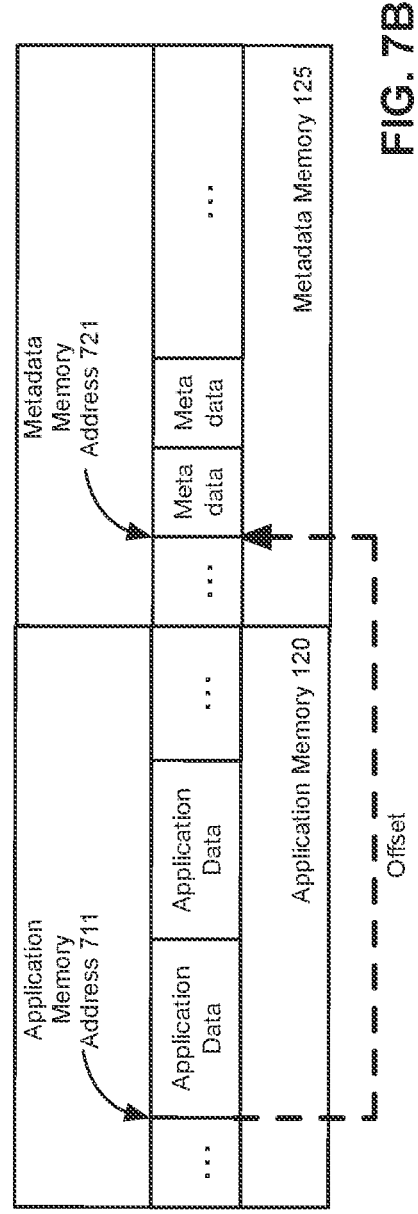
FIG. 7B shows an illustrative translation of application memory addresses to metadata memory addresses, in accordance with some embodiments.

FIG. 7B shows an illustrative translation of application memory addresses to metadata memory addresses, in accordance with some embodiments. In this example, each word (e.g., 32 bits) of application data has a halfword (e.g., 16 bits) of corresponding metadata. The instruction cache 602 may include hardware logic for calculating a corresponding metadata memory address from an application memory address. For instance, application memory address 711 may be divided by 2 (e.g., by right shifting by one bit position), and an appropriate offset may be added to obtain metadata memory address 721.

The inventors have recognized and appreciated that, while fixed hardware logic may provide speed and simplicity, there may be less flexibility. Accordingly, in some embodiments, a tag map table (e.g., the illustrative tag map table 142 in the example of FIG. 4) may be used to map application memory addresses to metadata memory addresses. In this manner, different metadata encoding/decoding schemes, different reduced sizes for metadata tags, etc. may be used for different application memory regions.

For instance, in some embodiments, the illustrative policy linker 225 in the example of FIG. 2 may analyze object code, and may provide a header for one or more software entities identified from the object code. Such a header may be provided to the illustrative loader 215 (e.g., via an initialization specification), and may include information for use by the loader 215 to configure the tag map table 142 accordingly. For instance, the header may indicate, for an application memory address range corresponding to the identified one or more software entities, one or more values for fields such as number of bits, upper tag, global range, size, etc., as described in connection with the example of FIG. 4.

Figure 8A:
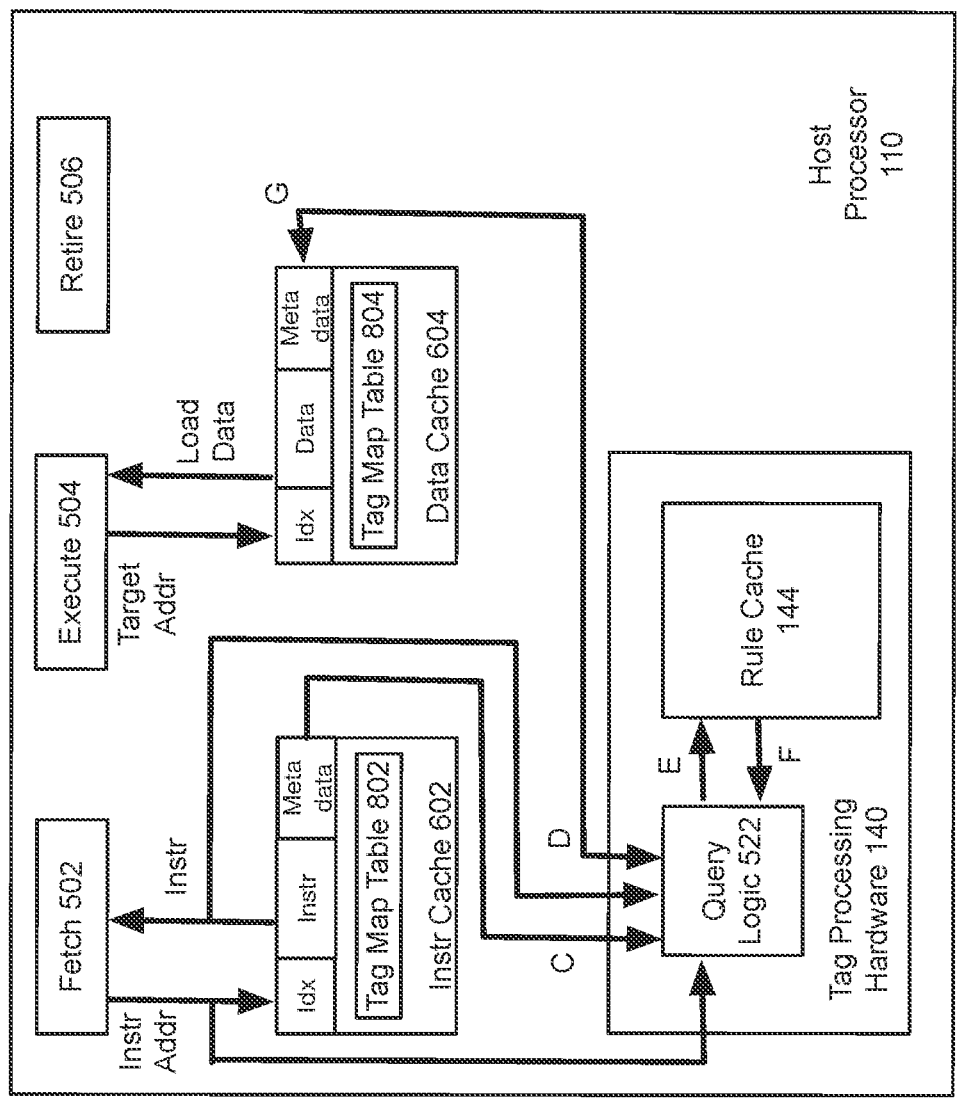
FIGS. 8A-B show illustrative tag map tables 802 and 804, in accordance with some embodiments.

FIG. 8A shows illustrative tag map tables 802 and 804, in accordance with some embodiments. In this example, the tag map table 802 is included as part of cache control logic of the illustrative instruction cache 602 in the examples of FIGS. 6A-B, whereas the tag map table 804 is included as part of cache control logic of the illustrative data cache 604.

In some embodiments, the tag map tables 802 and 804 may be similar to the tag map table 142 in the example of FIG. 4. However, the tag map tables 802 and 804 may perform lookups in response to cache misses. For instance, if an input instruction address matches an entry in the instruction cache 602, no lookup may be performed in the tag map table 802. Likewise, if an input target address matches an entry in the data cache 604, no lookup may be performed in the tag map table 804. This may advantageously improve performance and/or reduce power consumption.

By contrast, in the examples of FIGS. 5A-B, the tag map table 142 may perform a lookup each time an instruction address or a target address is received via the trace interface. Indeed, because the illustrative metadata cache 524 is indexed by metadata addresses, a lookup may be performed in the tag map table 142 to map the received instruction address or target address to a metadata address, which is in turn used to determine if there is a cache miss in the metadata cache 524.

In some embodiments, an entry in the tag map table 802 (or the tag map table 804) may store information about a compression mechanism and/or an encryption mechanism (e.g., as described in connection with the example of FIG. 4). Because the tag map table 802 (or the tag map table 804) is part of the cache control logic of the instruction cache 602 (or the data cache 604), compression and/or encryption may be performed when cached metadata is written to a metadata memory, such as the illustrative metadata memory 125 in the example of FIG. 1. Correspondingly, decompression and/or decryption may be performed when metadata is read from the metadata memory 125.

In some embodiments, an entry in the tag map table 802 (or the tag map table 804) may store information for mapping an input application memory address to a corresponding metadata memory address, such as an offset to be added to the input application memory address, as described in connection with the example of FIG. 4. Additionally, or alternatively, the entry itself may store metadata, as described in connection with the example of FIG. 1, so that the metadata may be accessed and returned to the fetch stage 502 (or the execute stage 504) without reading from the metadata memory 125.

In some embodiments, a tag map table entry may store multiple offsets, such as offsets for use in handling encoded metadata values having a length that is not a power of 2, as described in connection with the example of FIG. 4. These offsets may be added to a received instruction or target address to produce respective metadata addresses. Thus, referring back to the examples of FIGS. 5A-B, multiple offsets may lead to multiple lookups in the metadata cache 524. It may take multiple clock cycles to complete the multiple lookups, which may negatively impact performance. Additionally, or alternatively, cache logic may be replicated to allow simultaneous lookups, which may increase chip area.

By contrast, in the example of FIG. 8A, multiple offsets may lead to multiple transactions to read from the metadata memory 125. While this may also take multiple clock cycles, such performance penalty may be incurred only when there is a cache miss. Once the multiple read transactions from the metadata memory 125 have been completed, combined metadata may be generated and/or stored in the instruction cache 602 (or the data cache 604), and therefore may be accessed with a single cache lookup.

The inventors have recognized and appreciated that having two separate tag map tables (e.g., one for the instruction cache 602 and another for the data cache 604) may help avoid a performance bottleneck in a processor pipeline. For instance, the tag map table 804 may perform a lookup in response to a cache miss due to an earlier instruction in the pipeline, while the tag map table 802 is performing a lookup in response to a cache miss due to a later instruction in the pipeline.

However, it should be appreciated that aspects of the present disclosure are not limited to using any particular number of one or more tag map tables, or any tag map table at all. Moreover, aspects of the present disclosure are not limited to any particular arrangement of tag map table(s). In some embodiments, a single tag map table may be provided that maps both instruction addresses and target addresses to metadata addresses. Such a tag map table may not be part of the instruction cache 602 or the data cache 604, but may respond to queries from both caches.

Figure 8B:
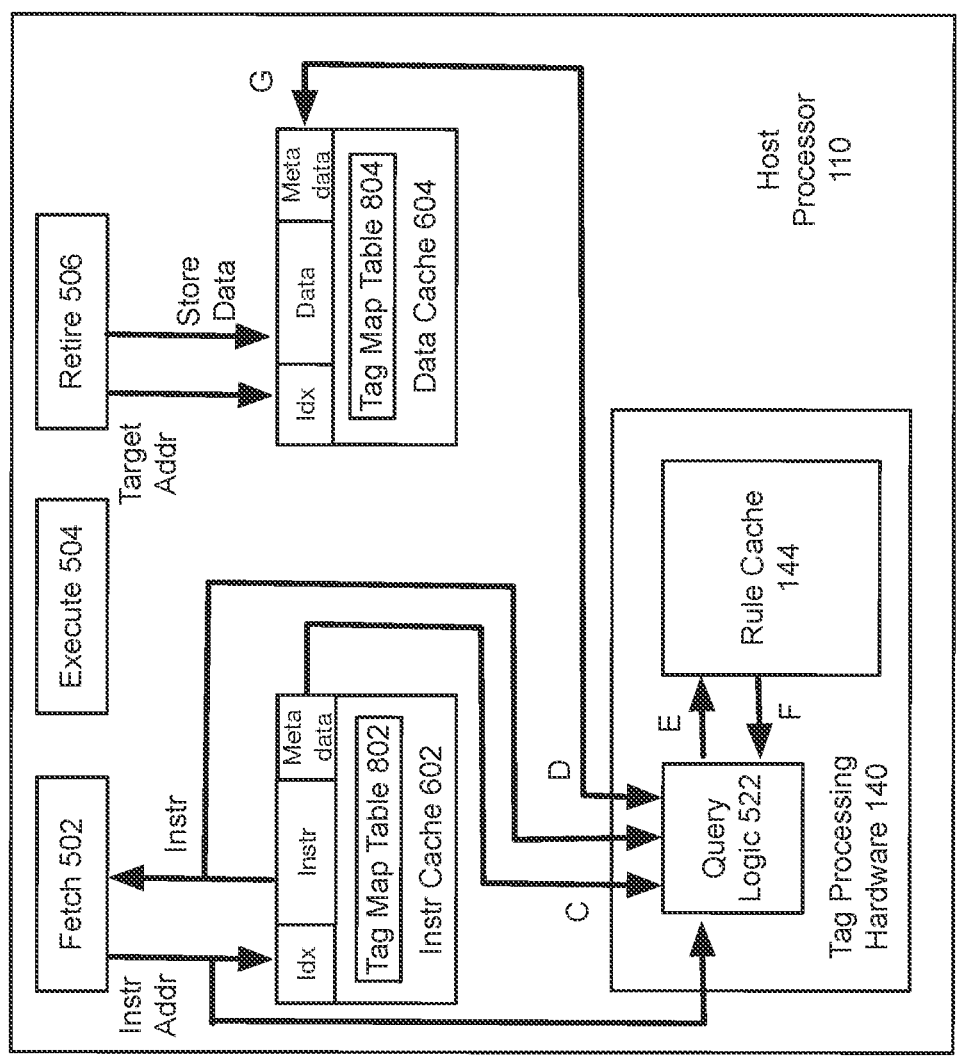

In the example of FIG. 8A, a load instruction is fetched from the instruction cache 602. FIG. 8B shows an example in which a store instruction is fetched from the instruction cache 602. Accordingly, a target address of the store instruction and/or application data to be stored may be provided to the data cache 604 by the illustrative retire stage 506. If the target address matches an entry in the data cache 604, existing application data in that entry may be replaced by the application data provided by the retire stage 506. Additionally, or alternatively, metadata D stored in that entry may be provided to the illustrative query logic 522 of the illustrative tag processing hardware 140, which may check whether the store instruction should be allowed.

In some instances, the tag processing hardware 140 may determine that the store instruction is in violation of one or more policies, and therefore should not be allowed. The inventors have recognized and appreciated that, in such a situation, it may be desirable to remove the matching entry from the data cache 604, because the previous application data in that entry has been overwritten by the application data of the (disallowed) store instruction. As a result, if the target address is presented again in the future, there may be a cache miss, and the target address may be used to read from an application memory (e.g., the illustrative application memory 120 in the example of FIG. 1). This may lead to some degradation of performance.

The inventors have further recognized and appreciated that, in some instances, simply removing the matching entry from the data cache 604 may be insufficient. For instance, there may be a delay between: (1) the matching entry being overwritten by the application data of the (disallowed) store instruction, and (2) the tag processing hardware 140 returning a determination that the store instruction should not be allowed. During such a delay, the matching entry may be accessed by another instruction, such as a subsequent load instruction.

Moreover, even if the tag processing hardware 140 determines that the store instruction should be allowed, there may be a delay between: (1) the matching entry being overwritten, and (2) the tag processing hardware 140 returning a determination may cause a synchronization issue. For instance, during that delay, the matching entry may have post-store application data (i.e., the application data of the store instruction), but pre-store metadata (i.e., the metadata D).

Accordingly, in some embodiments, application data of a store instruction that is pending checking by the tag processing hardware 140 may not be written into the data cache 604 right away. For instance, such application data may be held in a buffer until the tag processing hardware 140 determines that the store instruction should be allowed.

Figure 9:
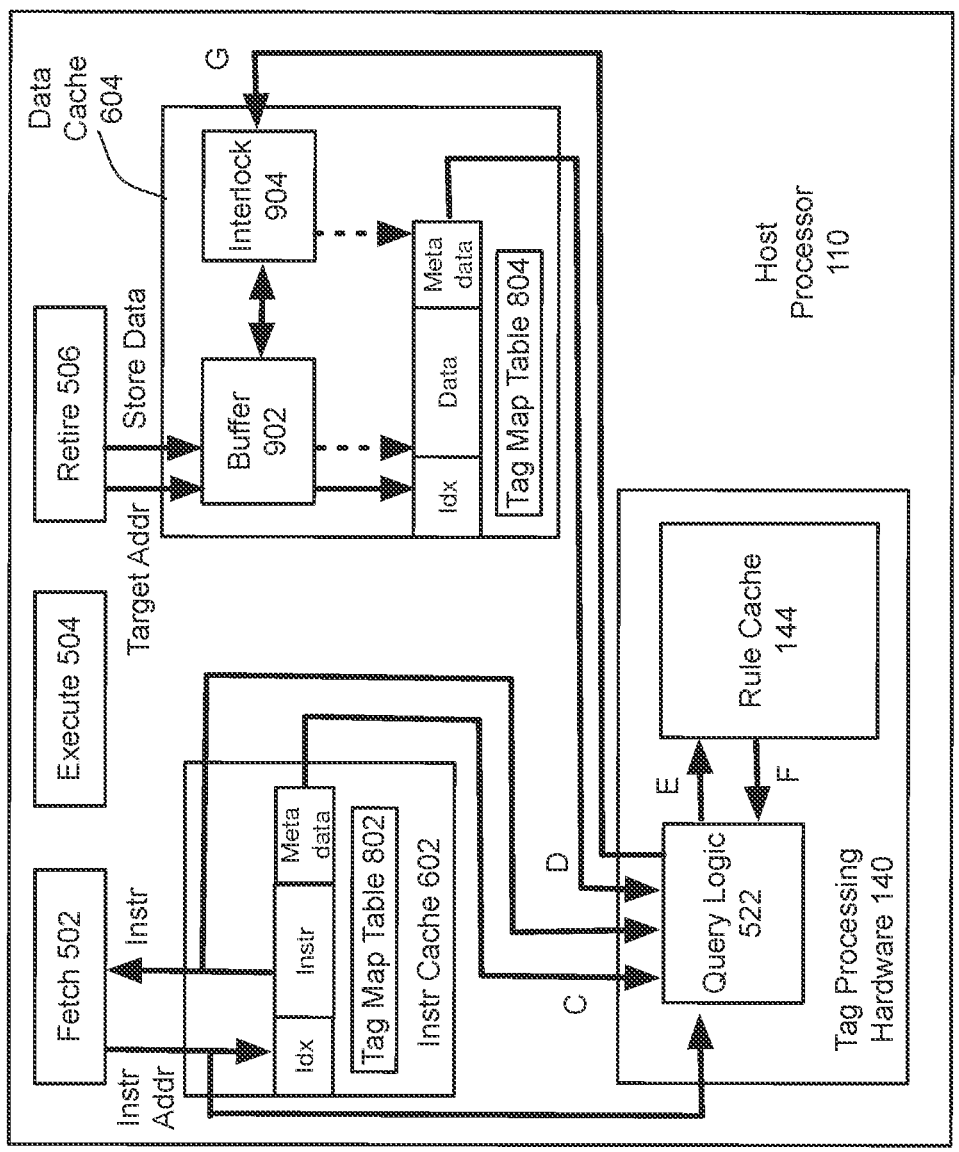
FIG. 9 shows an illustrative buffer 902 and an illustrative interlock 904, in accordance with some embodiments.

FIG. 9 shows an illustrative buffer 902 and an illustrative interlock 904, in accordance with some embodiments. In this example, a target address of a store instruction is provided to the data cache 604, whereas application data to be stored is intercepted and held in the buffer 902. The buffer 902 may be implemented in any suitable manner, for instance, as a First-In First-Out (FIFO) buffer.

In some embodiments, if the target address matches an entry in the data cache 604, metadata D stored in that entry may be provided to the query logic 522 of the tag processing hardware 140, which may check whether the store instruction should be allowed. If the tag processing hardware 140 determines that the store instruction should be allowed, the interlock 904 may release the application data from the buffer 902. The application data may be written into the data cache 604 at the entry matching the target address. Additionally, or alternatively, the query logic 522 may provide new metadata G to the interlock 904, which may store the metadata G in the entry matching the target address, replacing the metadata D.

In this manner, existing application data and metadata in the matching entry may remain undisturbed unless and until the tag processing hardware 140 has determined that the store instruction should be allowed.

Although a store instruction is shown in FIG. 9 and described above, it should be appreciated that aspects of the present disclosure are not limited to any particular instruction type. In some embodiments, the interlock 904 may be used to hold a destruction read instruction until that instruction has been checked by the tag processing hardware 140.

The inventors have recognized and appreciated that, because the instruction cache 602 is indexed by application memory addresses, as opposed to metadata memory addresses, an entry in the instruction cache 602 may not record a metadata memory address, even though the entry may store metadata. Therefore, a lookup may be performed in the tag map table 802 during cache eviction, to determine a metadata memory address to which to evict the metadata. For instance, an application memory address indexing an entry to be evicted may be used to write application data of the entry to the illustrative application memory 120 in the example of FIG. 1. Additionally, or alternatively, the application memory address may be used to look up the tag map table 802 to obtain a metadata memory address, which may in turn be used to write metadata of the entry to the illustrative metadata memory 125 in the example of FIG. 1.

The inventors have recognized and appreciated that such a lookup in the tag map table 802 may lead to performance degradation during cache eviction. Accordingly, in some embodiments, an entry in the instruction cache 602 may store a metadata memory address from which metadata stored in that entry has been read. In this manner, when the entry is evicted, metadata stored in the entry (which may or may not have been updated) may be written to the metadata memory address, without performing any lookup in the tag map table 802.

Similarly, an entry in the data cache 604 may store a metadata memory address from which metadata stored in that entry has been read. However, it should be appreciated that aspects of the present disclosure are not limited to storing metadata memory addresses in the instruction cache 602 or the data cache 604.

In the examples of FIGS. 6A-B, 8A-B, and 9, the illustrative tag processing hardware 140 is part of the illustrative host process 110. For instance, a pipeline logic control path of the host processor 110 may control both a data path of the host processor 110 and a data path of the tag processing hardware 140. This sharing of control logic may advantageously reduce power consumption and/or chip area. However, it should be appreciated that aspects of the present disclosure are not limited to integrating the tag processing hardware 140 into the host processor 110 in any particular manner, or at all.

In some embodiments, the tag processing hardware 140 may check an instruction while the instruction is being executed by the host processor 110, as opposed to checking the instruction after the host processor 110 has finished executing the instruction. For instance, the instruction address, the instruction, and/or the metadata C may be provided to the tag processing hardware 140 before the fetch stage 502 passes the instruction to a decode stage (not shown). Additionally, or alternatively, the metadata D may be provided to the tag processing hardware 140 before the retire stage 506 retires the instruction.

The inventors have recognized and appreciated that processing metadata in parallel with instruction execution may improve performance. Additionally, or alternatively, policy violation processing may be simplified. For instance, if an instruction is checked after the instruction has been retired by the host processor 110, one or more subsequent instructions may also have been retired by the time the tag processing hardware 140 determines that the earlier instruction violates a policy. Such a subsequent instruction may be deemed high risk, and therefore may be unwound. In some instances, this may even impact one or more instructions from a thread different from that of the disallowed instruction. By contrast, if an instruction is found to be a policy violation before the instruction has been retired by the host processor 110, all subsequent instructions may still be in a pipeline of the host processor 110, and may simply be flushed.

The inventors have further recognized and appreciated that processing metadata in parallel with instruction execution may reduce chip area and/or power consumption. For instance, if an instruction is found to be a policy violation sufficiently early in the pipeline, a corresponding write request to the data cache 604, or a corresponding write transaction to the application memory 120 (e.g., in case of a target address that is not cached), may not be issued at all. Accordingly, the illustrative interlock 904 in the example of FIG. 9 may be omitted. Additionally, or alternatively, the illustrative interlock 112 in the example of FIG. 1 may be omitted.

However, it should be appreciated that aspects of the present disclosure are not limited to processing metadata in parallel with instruction execution. Also, aspects of the present disclosure are not limited to the tag processing hardware 140 being part of the host processor 110. In some embodiments, the tag processing hardware 140 may be separate from the host processor 110, and a trace interface may be configured to provide the instruction address, the instruction, the metadata C, and/or the metadata D to the tag processing hardware 140, before the host processor 110 retires the instruction.

Figure 10:
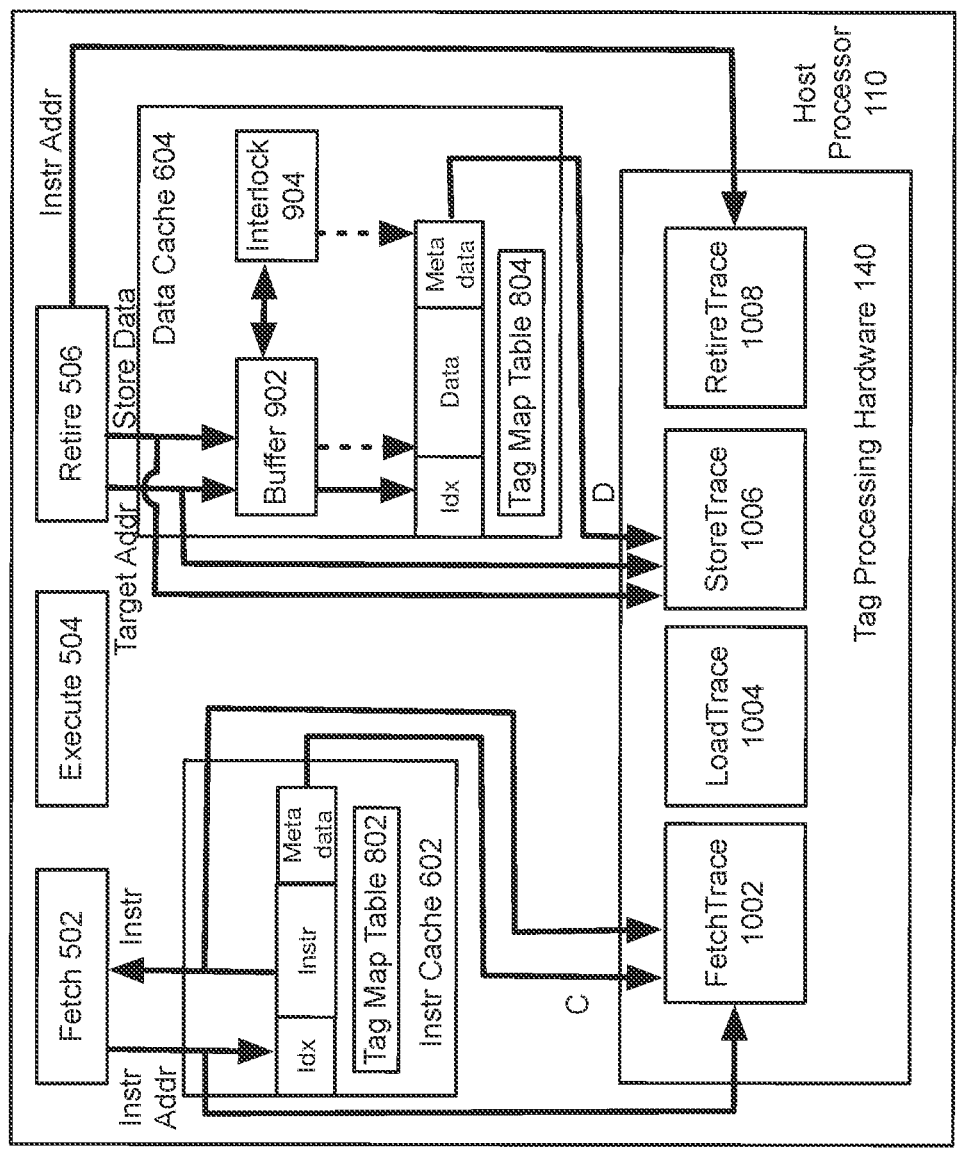
FIG. 10 shows an illustrative fetch trace buffer 1002, an illustrative load trace buffer 1004, an illustrative store trace buffer 1006, and an illustrative retire trace buffer 1008, in accordance with some embodiments.

FIG. 10 shows illustrative buffers 1002, 1004, 1006, and 1008, in accordance with some embodiments. In this example, the buffers 1002, 1004, 1006, and 1008 are used by the tag processing hardware 140 to hold information received from the host processor 110 (e.g., instruction addresses, instructions, metadata corresponding to instructions addresses, and/or metadata corresponding to target addresses of instructions). Such information may be used to construct queries to the illustrative rule cache 144 in the example of FIG. 1. This may be done, for instance, by the illustrative query logic 522 in the examples of FIGS. 5A-B, 6A-B, 8A-B, and 9 (not shown in FIG. 10).

The buffers 1002, 1004, 1006, and 1008 may be implemented in any suitable manner, for instance, as FIFO buffers.

In some embodiments, the buffer 1002 may be a fetch trace buffer. For instance, the fetch stage 502 may provide an instruction address (i.e., an address from a program counter) to the instruction cache 602. An entry in the fetch trace buffer 1002 may store the instruction address, an instruction returned by the instruction cache 602 in response to receiving the instruction address, and/or metadata corresponding to the instruction address.

In some embodiments, an entry in the fetch trace buffer 1002 may store a representation of an instruction, in addition to, or instead of, the instruction itself. For instance, the instruction cache 602 may include a decoding block (not shown), and may provide a result of decoding the instruction to the tag processing hardware 140.

The inventors have recognized and appreciated that, in some ISAs, an instruction may include one or more bits that are not relevant for metadata processing. For instance, in RISC-V, a 32-bit instruction may include 10 bits that are only used to hold immediate values, which may not be relevant for metadata processing. Accordingly, in some embodiments, the decoding block may identify and remove one or more such bits, to obtain a reduced representation of the instruction (e.g., a 22-bit representation of a 32-bit RISC-V instruction, removing 10 bits of immediate data).

Additionally, or alternatively, the decoding block may transform an opcode in an ISA of the host processor 110 to an opcode in an ISA for metadata processing. The inventors have recognized and appreciated that multiple opcodes in the ISA of the host processor 110 may be considered equivalent for metadata processing purposes, and therefore may be mapped to a same opcode in the ISA for metadata processing. Thus, the ISA for metadata processing may have fewer opcodes than the ISA of the host processor 110, so that an opcode in the ISA for metadata processing may be encoded using fewer bits. For instance, a 7-bit opcode in RISC-V may be mapped to a 3-bit opcode in an ISA for metadata processing.

If both types of reduction described above are applied, the decoding block may decode a 32-bit RISC-V instruction into a 14-bit representation. In this manner, 44% fewer bits may be stored in the fetch trace buffer 1002, which may advantageously reduce chip area. However, it should be appreciated that aspects of the present disclosure are not limited to storing any particular representation of an instruction in the fetch trace buffer 1002, or any representation at all.

In some embodiments, an entry in the fetch trace buffer 1002 may store one or more operand addresses extracted from an instruction. For instance, the instruction may be of the form, Op R3, R2, R1, where Op may indicate an operation (e.g., adding, multiplying, etc.) to be performed on values stored in registers R1 and R2, and a result of the operation may be stored in register R3. Accordingly, addresses of the registers R1 and R2 in a register file may be stored in the entry in the fetch trace buffer 1002 for the instruction.

In some embodiments, the buffer 1004 may be a load trace buffer. Although not shown in FIG. 10, the execute stage 504 may, in some instances, provide a target address of a load instruction to the data cache 604 (e.g., as shown in the example of FIG. 8A). An entry in the load trace buffer 1004 may store metadata corresponding to the target address. Additionally, or alternatively, the entry in the load trace buffer 1004 may store the target address itself and/or data returned by the data cache 604 to the execute stage 504.

The inventors have recognized and appreciated that the host processor 110 may, in some instances, read application data from the data cache 604 pursuant to an operation other than a load instruction. For instance, in response to receiving an interrupt signal, the host processor 110 may push contents of one or more registers to an application memory region designated as stack memory, without executing any store instruction. Additionally, or alternatively, interrupt handler code may, upon finishing, perform a designated operation that is interpreted by the host processor 110 as a return from interrupt. In response, the host processor 110 may restore contents of the one or more registers from the stack memory, without executing any load instruction. Accordingly, in some embodiments, an entry in the load trace buffer 1004 may store metadata corresponding to a stack memory address from which register content has been restored, the stack memory address itself, and/or the register content.

In some embodiments, the buffer 1006 may be a store trace buffer. For instance, the retire stage 506 may provide a target address of a store instruction, along with data to be stored, to the data cache 604. An entry in the store trace buffer 1006 may store metadata corresponding to the target address. Additionally, or alternatively, the entry in the store trace buffer 1006 may store the target address itself and/or the data to be stored.

In some embodiments, the data cache 604 may include a store tag fetch block (not shown in FIG. 10). The store tag fetch block may, in response to receiving a write request from the retire stage 506, determine whether a target address in the write request matches any entry in the data cache 604. If there is a matching entry, the store tag fetch block may read metadata from the matching entry, and may enqueue the target address, application data in the write request from the retire stage 506, and/or the metadata read from the matching entry into the store trace buffer 1006.

If, on the other hand, there is no matching entry, cache miss processing may be performed. For instance, the tag map table 804 may be used to map the target address to metadata and/or one or more metadata addresses. If the tag map table 804 returns one or more metadata addresses, the one or more metadata addresses may be used to read metadata from the illustrative metadata memory 125 in the example of FIG. 1 (not shown in FIG. 10). The metadata returned by the tag map table 804 (if any), the metadata read from the metadata memory 125 (if any), and/or some suitable combination thereof may be enqueued into the store trace buffer 1006, in addition to, or instead of, the target address and/or the application data in the write request from the retire stage 506.

Additionally, or alternatively, cache miss processing may include using the target address to read application data from the illustrative application memory 120 in the example of FIG. 1 (not shown in FIG. 10). This may be done in parallel with retrieving metadata from the tag map table 804 and/or the metadata memory 125, or may be postponed until the tag processing hardware 140 has determined that a store instruction corresponding to the write request should be allowed.

In some embodiments, one or more most significant bits (e.g., [31:4]) of the target address may be used to determine a memory block to which the target address belongs. Cache miss processing may include reading application data from the entire memory block to fill a cache line indexed by one or more index bits (e.g., [10:4]) of the target address. The application data in the write request may be written to the cache line at an appropriate offset (e.g., [3:2] of the target address), replacing one or more words read from the application memory 120.

However, it should be appreciated that aspects of the present disclosure are not limited to reading the entire memory block to fill the cache line. In some embodiments, the application data in the write request may be written to the cache line at the appropriate offset, while the rest of that cache line may remain unfilled. One or more flags may be maintained in the cache line, indicating one or more locations that are filled, and/or one or more locations that are unfilled. If a subsequent read request targets a filled location, application data from that location may be returned. If a subsequent read request targets an unfilled location, the entire memory block may be read from the application memory 120, and all unfilled locations in the cache line may be filled. (The filled locations may not be updated, because the application data from the application memory 120 may be out of date for those locations.) In this manner, reading from the application memory 120 may be postponed or even avoided, which may reduce power consumption and/or bus bandwidth. However, cache logic for responding to read requests may be more complex.

As described above in connection with the example of FIG. 9, the data cache 604 may, in some embodiments, enqueue the target address and the application data in the write request from the retire stage 506 into the buffer 902. Additionally, or alternatively, if there is an entry matching the target address, the data cache 604 may lock that entry until the tag processing hardware 140 has determined that a store instruction corresponding to the write request should be allowed.

In some embodiments, the illustrative interlock 904 in the example of FIG. 9 may include a commit block (not shown in FIG. 10). In response to receiving an indication from the tag processing hardware 140 that the corresponding store instruction should be allowed, the commit block may commit the application data in the write request from the retire stage 506, and/or metadata G received from the tag processing hardware 140 (not shown in FIG. 10), into the entry matching the target address.

In some embodiments, the application data in the write request from the retire stage 506 may be written to the application memory 120 at the target address. Additionally, or alternatively, the metadata G received from the tag processing hardware 140 may be used to update metadata stored in the tag map table 804 and/or in the metadata memory 125 at the one or more metadata addresses to which the tag map table 804 maps the target address. This may be done, for instance, if the write request from the retire stage 506 is an uncached write, and/or if the data cache 604 is configured as a write-through cache.

The inventors have recognized and appreciated that the host processor 110 may, in some instances, write application data to the data cache 604 pursuant to an operation other than a store instruction. For instance, as described above in connection with the illustrative load trace buffer 1004, the host processor 110 may, in response to receiving an interrupt signal, push contents of one or more registers to stack memory, without executing any store instruction. Accordingly, in some embodiments, an entry in the store trace buffer 1006 may store metadata corresponding to a stack memory address where register content has been pushed, the stack memory address itself, and/or the register content.

In some embodiments, the buffer 1008 may be a retire trace buffer. The inventors have recognized and appreciated that the host processor 110 may not finish executing every instruction fetched by the fetch stage 502, and that an aborted instruction may pose a relatively low risk to security, privacy, safety, etc. Accordingly, in some embodiments, an aborted instruction may not be checked by the tag processing hardware 140, which may improve performance.

For instance, an entry in the retire trace buffer 1008 may store instruction addresses of instructions that the host processor 110 has retired. In some embodiments, the tag processing hardware 140 may, prior to commencing checking of a next instruction in the fetch trace buffer 1002, compare an instruction address of the instruction against a next instruction address in the retire trace buffer 1008. If the instruction addresses do not match, it may be inferred that the host processor 110 did not finish executing the instruction, and therefore the tag processing hardware 140 may decide not to check the instruction. In this manner, the tag processing hardware 140 may continue to dequeue the fetch trace buffer 1002 until an entry is encountered that matches the next instruction address in the retire trace buffer 1008.

Figure 11:
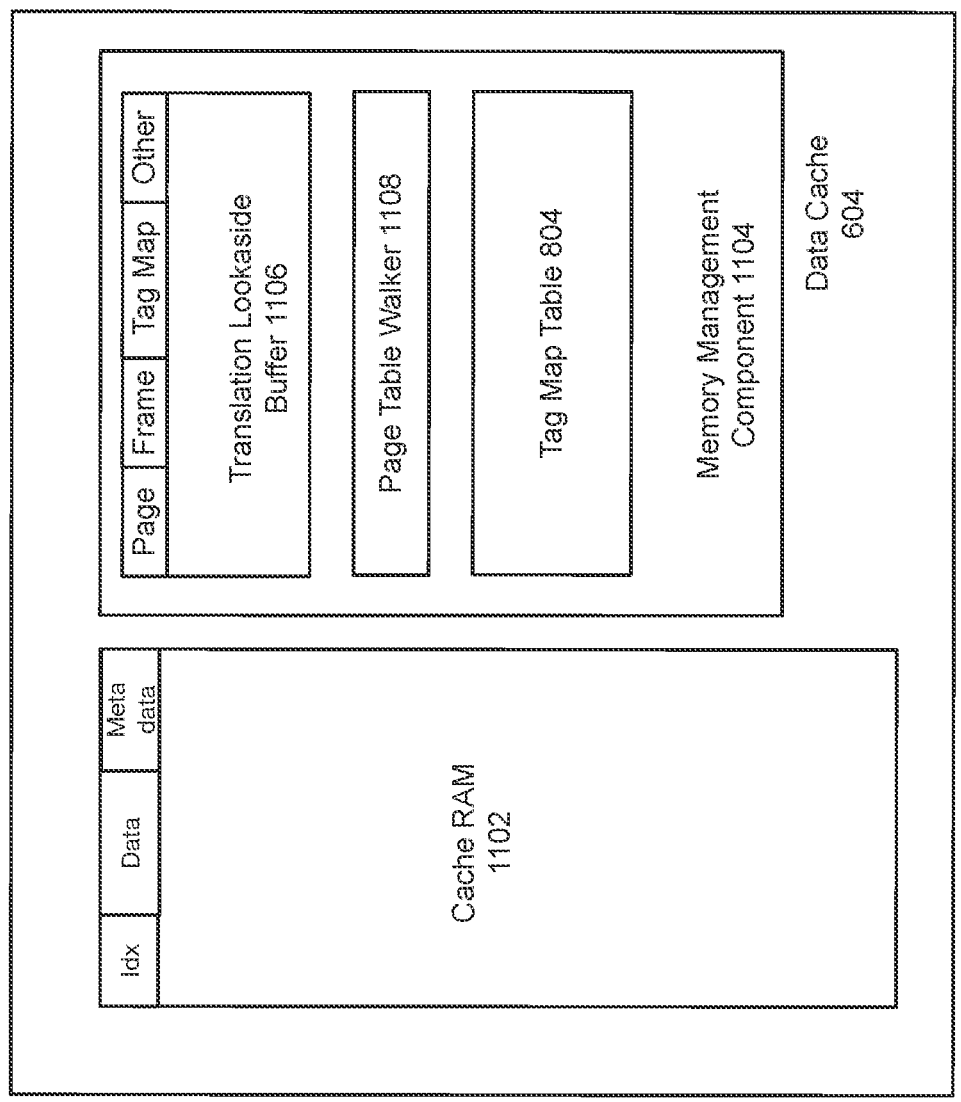
FIG. 11 shows an illustrative cache RAM 1102 and an illustrative memory management component 1104, in accordance with some embodiments.

FIG. 11 shows an illustrative cache RAM 1102 and an illustrative memory management component 1104, in accordance with some embodiments. In this example, the cache RAM 1102 and the memory management component 1104 are part of the illustrative data cache 604 in the examples of FIGS. 8A-B and 9-10. The cache RAM 1102 may store cache entries, while the memory management component 1104 may control cache operations such as looking up, reading from, writing to, and/or evicting cache entries.

Although not shown, the illustrative instruction cache 602 in the examples of FIGS. 8A-B and 9-10 may have a similar cache RAM and a similar memory management component. However, it should be appreciated that aspects of the present disclosure are not limited to having a cache with any particular combination or arrangement of components, or any cache at all.

The inventors have recognized and appreciated that, in some instances, the host processor 110 may use a virtual address space, instead of a physical address space (e.g., addresses in the illustrative application memory 120 in the example of FIG. 1). In some embodiments, the virtual address space may be simpler for an application to handle, compared to the physical address space. For example, the virtual address space may start from zero, and/or may be contiguous, while corresponding physical addresses may be spread out at various offsets.

In some embodiments, different applications executing on the host processor 110 may have respective virtual address spaces. An operating system may, upon switching context, configure a memory management component (which may be different from the memory management component 1104 in the example of FIG. 11) to use an appropriate virtual address space. However, it should be appreciated that aspects of the present disclosure are not limited to having application-specific virtual address spaces. In some embodiments, all applications executing on the host processor 110 may use a same virtual address space, or no virtual address space at all.

In the example of FIG. 11, the memory management component 1104 includes a translation lookaside buffer (TLB) 1106 and a page table walker (PTW) 1108. The translation lookaside buffer 1106 may be implemented using a cache of the memory management component 1104, and may store recently and/or frequently used mappings between virtual addresses and physical addresses.

In some embodiments, the host processor 110 may issue read requests and/or write requests using virtual addresses, instead of physical addresses. Additionally, or alternatively, the host processor 110 may perform calculations and/or comparisons with virtual addresses, instead of physical addresses. Accordingly, in some embodiments, the cache RAM 1102 may be indexed by virtual addresses, so that one or more index bits of a virtual address received from the host processor 110 may be used to look up the cache RAM 1102. Additionally, or alternatively, a cache tag in a cache line of the cache RAM 1102 may store one or more tag bits of a physical address from which application data in the cache line has been read.

However, it should be appreciated that aspects of the present disclosure are not limited to using virtual index bits or physical tag bits. In some embodiments, physical index bits and/or virtual tag bits may be used.

In some embodiments, in response to receiving a read/write request from the host processor 110 with a virtual address, the memory management component 1104 may translate the virtual addresses to a physical address, and may use one or more tag bits of the physical address to confirm whether a cache line indexed by one or more index bits of the virtual address is indeed a cache hit.

Figure 12:
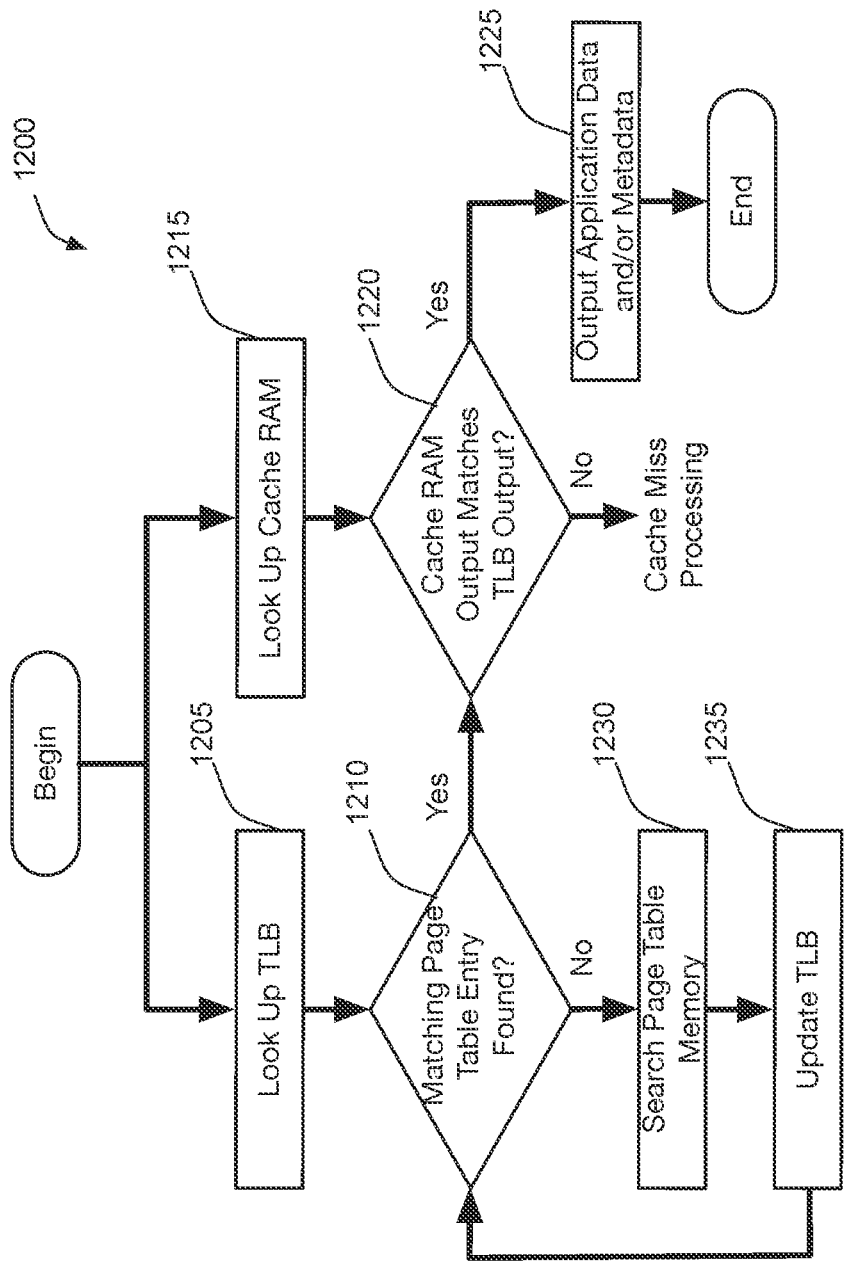
FIG. 12 shows an illustrative process 1200 for cache lookup, in accordance with some embodiments.

FIG. 12 shows an illustrative process 1200 for cache lookup, in accordance with some embodiments. For instance, the process 1200 may be performed by the memory management component 1104 in response to receiving a virtual address from the host processor 110.

At act 1205, one or more upper bits of the virtual address may be used to look up the translation lookaside buffer 1106. In some embodiments, the translation lookaside buffer 1106 may use the one or more upper bits to look for a page table entry corresponding to a virtual memory page to which the virtual address belongs. If it is determined at act 1210 that the translation lookaside buffer 1106 has such a page table entry, one or more instructions for translating the virtual address to a physical address may be retrieved from the page table entry.

In some embodiments, the one or more instructions for translating the virtual address to a physical address may include a physical address of a physical memory page corresponding to the virtual memory page. Additionally, or alternatively, one or more lower bits of the virtual address may be used to determine an offset from a beginning of the physical memory page. For instance, the translation lookaside buffer 1106 may map bits [31:11] of the virtual address to bits [31:11] of a physical address, which may then be concatenated with bits [10:0] of the virtual address to complete the physical address.

At act 1215, the virtual address may be used to look up the cache RAM 1102. For instance, one or more index bits of the virtual address (e.g., bits [10:4]) may be used to identify a cache set having one or more cache lines (e.g., from one or more respective cache ways), and a valid bit in each cache line may be checked to determine if the cache line is empty.

At act 1220, a cache tag may be read from each non-empty cache line, and may be compared against a physical address output by the translation lookaside buffer 1106 at act 1210 (e.g., the physical address of the physical memory page corresponding to the virtual memory page, or the physical address obtained by adding an offset to the physical address of the physical memory page).

If the cache tag from a non-empty cache line matches the physical address output by the translation lookaside buffer 1106, it may be determined that application data in that cache line was read from the physical address output by the translation lookaside buffer 110 (as a result of translating the virtual address from the host processor 110). Accordingly, at act 1225, the application data from the cache line may be returned to the host processor 110. Additionally, or alternatively, metadata from the cache line may be provided to the tag processing hardware 140.

If no non-empty cache line has a cache tag that matches the physical address output by the translation lookaside buffer 1106, it may be determined that the physical address output by the translation lookaside buffer 1106, and thus the virtual address from the host processor 110, is not presently cached. Accordingly, cache missing processing may be performed (e.g., as described below in connection with the example of FIG. 13).

In some embodiments, if it is determined at act 1210 that the translation lookaside buffer 1106 does not have a page table entry matching the one or more upper bits of the virtual address, the page table walker 1108 may be used, at act 1230, to step through one or more page tables stored in the application memory 120, to look for such a page table entry. The page table walker 1108 may be implemented in any suitable manner, for example, using hardware and/or software.

If a page table entry matching the one or more upper bits of the virtual address is found by the page table walker 1108, the translation lookaside buffer 1106 may be updated at act 1235 with that page table entry. The process 1200 may then return to act 1210 to retrieve, from the page table entry, one or more instructions for translating the virtual address to a physical address.

If no such page table entry is found by the page table walker 1108, an exception may be raised.

Figure 13:
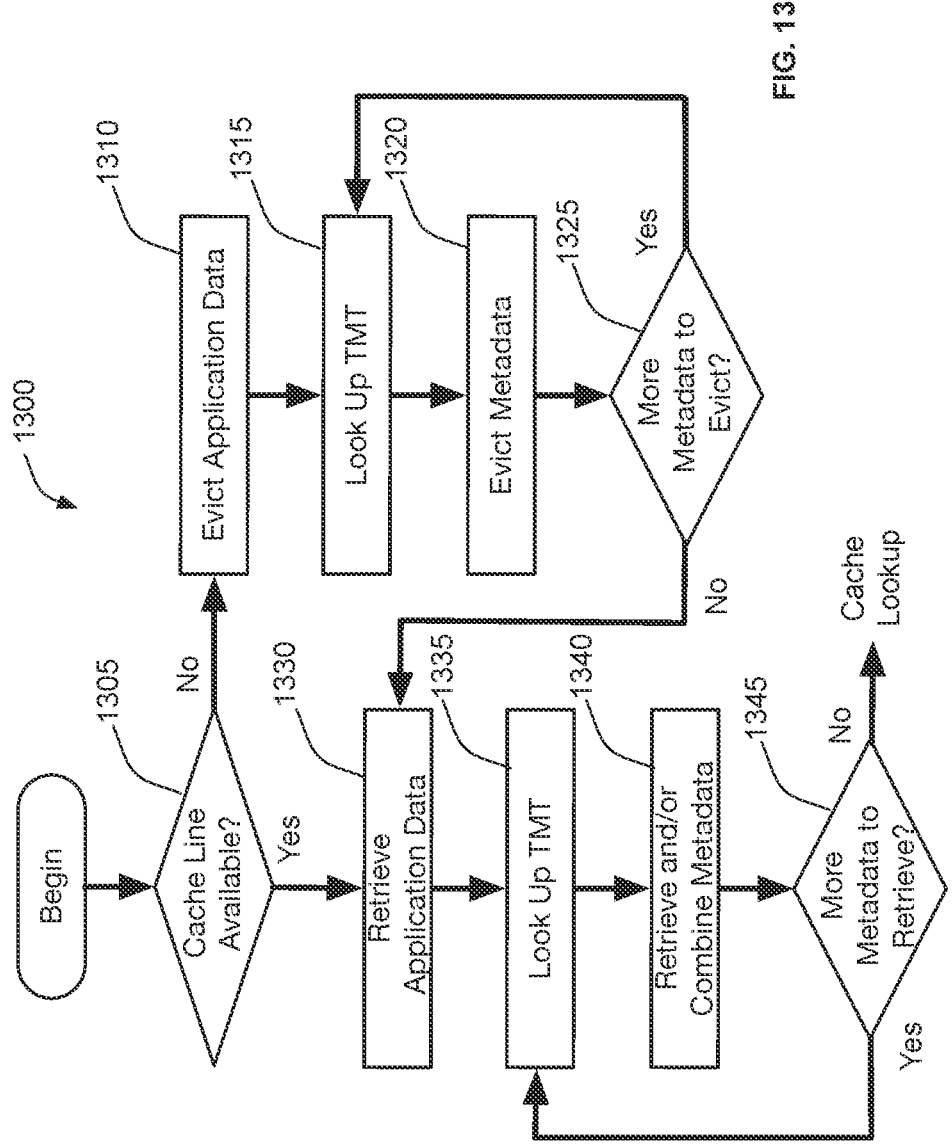
FIG. 13 shows an illustrative process 1300 for cache miss processing, in accordance with some embodiments.

FIG. 13 shows an illustrative process 1300 for cache miss processing, in accordance with some embodiments. For instance, the process 1300 may be performed by the memory management component 1104 in response to determining that an input virtual address is not presently cached (e.g., at act 1220 in the example of FIG. 12).

At act 1305, it may be determined whether a cache line is available for the input virtual address. For instance, one or more index bits (e.g., bits [10:4]) of the input virtual address may be mapped to a cache set having one or more cache lines (e.g., from one or more respective cache ways). It may be determined if at least one of the one or more cache lines is empty, for example, by checking a valid bit in each cache line until an empty cache line is found.

If it is determined at act 1305 that no cache line is available, one of the one or more cache lines of the cache set may be selected for eviction. Any suitable eviction policy may be applied. For instance, an oldest and/or least frequently accessed cache line may be selected.

At act 1310, application data from the selected cache line may be written to the illustrative application data memory 120 in the example of FIG. 1. For instance, a cache tag may be read from the selected cache line, and may include one or more upper bits (e.g., bits [31:11]) of a first physical address. The one or more upper bits may be concatenated with an index of the cache line (e.g., bits [10:4] of the input virtual address) and/or one or more suitable lower bits (e.g., four trailing zeros), to complete the first physical address. The application data from the cache line may then be written at the first physical address.

At act 1315, the first physical address may be used to look up the tag map table 804, which may return a tag map table entry matching the first physical address. The tag map table entry may store metadata and/or one or more metadata memory addresses corresponding to the first physical address (e.g., a base metadata memory address and/or one or more offsets to be added to the base metadata memory address).

At act 1320, metadata from the selected cache line may be written to the illustrative metadata memory 125 in the example of FIG. 1. For instance, one or more first bits of the metadata may be written to a first metadata memory address obtained based on the tag map table entry, one or more second bits of the metadata may be written to a second metadata memory address obtained based on the tag map table entry, etc. Additionally, or alternatively, one or more bits of the metadata may be written to the tag map table entry itself, or may simply be discarded.

At act 1325, it may be determined whether there is more metadata to be evicted. For instance, in some embodiments, a tag map table entry may store a flag that indicates whether more metadata and/or metadata memory addresses may be retrieved from another tag map table entry. As an example, the flag may include a single bit indicating whether more metadata and/or metadata memory addresses may be retrieved from an immediately following tag map table entry. As another example, the flag may include an index for looking up another tag map table entry from which more metadata and/or metadata memory addresses may be retrieved.

If it is determined at act 1325 that there is more metadata to be evicted, the process 1300 may return to act 1315 to obtain another tag map table entry. Otherwise, the process 1300 may proceed to fill the selected cache line, which may now be available. For instance, at act 1330, application data may be read from the application data memory 120 using a second physical address, which may correspond to the input virtual address. The retrieved application data may be stored in the selected cache line.

At act 1335, the second physical address may be used to look up the tag map table 804, which may return a tag map table entry matching the second physical address. The tag map table entry may store metadata and/or one or more metadata memory addresses corresponding to the second physical address (e.g., a base metadata memory address and/or one or more offsets to be added to the base metadata memory address).

At act 1340, metadata may be retrieved from the metadata memory 125. For instance, one or more first bits of metadata may be read from a first metadata memory address obtained based on the tag map table entry, one or more second bits of metadata may be read from a second metadata memory address obtained based on the tag map table entry, etc. Such metadata bits, and/or one or more metadata bits from the tag map table entry itself, may be combined (e.g., concatenated). The combined metadata may be stored in the selected cache line, along with the application stored at act 1130.

At act 1345, it may be determined whether there is more metadata to be retrieved. For instance, as described above in connection with act 1325, a tag map table entry may, in some embodiments, store a flag that indicates whether more metadata and/or metadata memory addresses may be retrieved from another tag map table entry.

If it is determined at act 1345 that there is more metadata to be retrieved, the process 1300 may return to act 1335 to obtain another tag map table entry. Otherwise, the process 1300 may return to a cache lookup process, such as act 1215 in the illustrative process 1200 in the example of FIG. 12.

Referring again to the example of FIG. 11, the tag map table 804 may be managed by the memory management component 1104. In some embodiments, the tag map table 804 may be indexed by physical addresses. Thus, if the translation lookaside buffer 1106 has a page table entry matching an input virtual address, a physical address returned by the translation lookaside buffer 1106 may be used to look up the tag map table 804. Similarly, if the translation lookaside buffer 1106 does not have a page table entry matching the virtual address, but the page table walker 1108 is able to find such a page table entry, a physical address determined based on the matching page table entry may be used to look up the tag map table 804.

The inventors have recognized and appreciated that the above approach may be desirable in situations where it may not be efficient or practical to modify the translation lookaside buffer 1106 or the page table walker 1108. However, performance degradation may result from serializing: (1) translating a virtual address to a physical address (by the translation lookaside buffer 1106 and/or the page table walker 1108) and (2) mapping the physical address to a metadata address (by the tag map table 804). Moreover, certain hardware may be duplicated, which may increase chip area and/or power consumption. For instance, the tag map table 804 may have its own address comparison logic that is separate from the translation lookaside buffer 1106, and/or its own page table walker that is separate from the page table walker 1108.

Accordingly, in some embodiments, one or more tag map table entries may be included in a page table entry stored in the application memory 120. For instance, as described above in connection with the example of FIG. 12, a page table entry may store information for translating a virtual address in a virtual address page to a physical address in a physical address page. Such a page table entry may, in some embodiments, also store one or more tag map table entries that map addresses in the physical address page to corresponding metadata and/or one or more metadata addresses. For example, the inventors have recognized and appreciated that, in many page table designs, lower bits in page table entries may be reserved for storing implementation-specific information, and that such bits may be used for tag map table entries.

In some embodiments, access to one or more tag map table entries stored in a page table entry may be managed using one or more memory protection techniques. For instance, the tag processing hardware 140 in the example of FIG. 1 may enforce one or more memory protection policies. Additionally, or alternatively, the host processor 110 may include a memory protection component that enforces one or more access rules, which may be statically and/or dynamically configured. Additionally, or alternatively, the host processor 110 may provide an execution environment that is isolated from some processes running on the host processor 110. Additionally, or alternatively, processes executing on the host processor 110 may have different privilege levels governed by different access rules.

The inventors have further recognized and appreciated that, in some instances, a mapping from physical addresses to metadata addresses may be more straightforward than a mapping from virtual addresses to physical addresses. For instance, a mapping from physical addresses to metadata addresses may simply indicate an offset to be added to physical addresses to obtain corresponding metadata addresses, whereas a mapping from virtual addresses to physical addresses may involve multiple offsets. In such a situation, there may be fewer tag map table entries than there are page table entries, and therefore some tag map table entries may be duplicated in multiple page table entries.

Accordingly, in some embodiments, a page table entry may store information that may be used to retrieve one or more tag map table entries, instead of the one or more tag map table entries themselves. In this manner, only the retrieval information may be duplicated, instead of the one or more tag map table entries themselves. This may advantageously reduce an amount of memory used to store page table entries.

In some embodiments, upon determining that a page table entry stored in the application memory 120 matches an input virtual address, the page table walker 1108 may provide address translation information from the page table entry to the translation lookaside buffer 1106. Additionally, or alternatively, the page table walker 1108 may provide one or more tag map table entries (or retrieval information therefor) from the page table entry to the tag map table 804.

In some embodiments, the translation lookaside buffer 1106 may use the address translation information to translate the input virtual address into a physical address, which may in turn be used to look up an appropriate tag map table entry from the tag map table 804. Because the page table walker 1108 has just provided the one or more tag map table entries from the page table entry to the tag map table 804, the appropriate tag map table entry may be present in a fully associative array of the tag map table 804, so that no table walking may be performed by the tag map table 804. This may advantageously improve performance and/or reduce power consumption. In some embodiments, the tag map table 804 may even be implemented without its own page table walker, which may reduce chip area.

Additionally, or alternatively, the page table walker 1108 may provide the one or more tag map table entries (or the retrieval information therefor) to the translation lookaside buffer 1106, which may forward the one or more tag map table entries (or the retrieval information therefor) to the tag map table 804, along with the physical address translated from the input virtual address. If the retrieval information is provided, the tag map table 804 may use the retrieval information to determine one or more addresses in the metadata memory 125 from which the one or more tag map table entries may be read.

In this manner, the tag map table 804 may simply use the physical address to select the appropriate tag map table entry from the one or more tag map table entries, without performing any matching in the fully associative array of the tag map table 804. This may advantageously improve performance and/or reduce power consumption. In some embodiments, the tag map table 804 may even be implemented without any fully associative array, or with a smaller fully associative array, which may reduce chip area.

In some embodiments, the translation lookaside buffer 1106 may be configured to hold a first number of entries (e.g., 32 entries), while the fully associative array of the tag map table 804 may be configured to hold a second number of entries (e.g., 16 entries). The first number may be the same as, or different from, the second number.

In some embodiments, a page table entry in the translation lookaside buffer 1106 may store a tag map table index that may be used to access an entry of the tag map table 804 directly, without performing any matching. For instance, in the above example, there are 16=2^4 tag map table entries, so a page table entry may store 4 bits for directly accessing an entry of the tag map table 804. In some embodiments, a page table entry may store multiple such indices, pointing to multiple tag map table entries, respectively. Additionally, or alternatively, multiple page table entries may point to a same tag map table entry.

The inventors have recognized and appreciated that, in some instances, a trace interface of the host process 110 may provide instruction addresses and/or target addresses that are virtual addresses. If a tag map table receives instruction addresses and/or target addresses via such a trace interface, the tag map table may include its own address translation functionalities, which may duplicate those of the translation lookaside buffer 1106 and/or the page table walker 1108.

By contrast, the tag map table 804 in the example of FIG. 11 may have access to physical addresses translated by the translation lookaside buffer 1106 and/or the page table walker 1108. This may advantageously improve performance, and/or reduce chip area and/or power consumption. However, it should be appreciated that aspects of the present disclosure are not limited to the tag map table 804 being part of the host processor 110. In some embodiments, the tag map table 804 may be separate from the host processor 110, and a trace interface may be configured to provide instruction addresses and/or target addresses that are physical addresses.

In accordance with some embodiments, a system comprising a processor and a metadata processing system with at least one cache and at least one memory storing application data and associated metadata may be provided, wherein the at least one cache is configured to: (a) fetch application data and associated metadata from disjoint addresses of the at least one memory upon a cache miss; (b) store the application data and the associated metadata in a memory of the at least one cache; and (c) present the application data and associated metadata as a pair to the processor and the metadata processing system.

In some embodiments, an association between the application data and the metadata may be determined by a tag map table.

In some embodiments, the tag map table may be embedded inside the at least one cache.

In some embodiments, the at least one cache may comprise multiple caches, which share a common tag map table.

In some embodiments, the metadata processing system may be a part of the processor and the processor may be configured to wait until the metadata processing system has completed metadata processing for an instruction before the processor completes execution of the instruction.

In some embodiments, the metadata processing system may be external to the processor, the processor may be configured to inform the metadata processing system when the processor aborts an instruction, and the processor may be configured to wait until the metadata processing system has completed the metadata processing for an instruction before the processor completes execution of the instruction.

In some embodiments, the metadata processing system may be external to the processor and the processor completes execution of an instruction independently of completion of metadata processing for the instruction.

In some embodiments, the metadata processing system may receive at least one instruction metadata tag and at least one data metadata tag from the at least one cache for every access the processor makes.

In some embodiments, the metadata processing system may receive from the processor, a trace of addresses of executed instruction addresses.

In some embodiments, the metadata processing system may receive trace information from the processor, and may be configured to use the trace information to determine a sequence of instructions executed by the processor.

In accordance with some embodiments, the metadata processing system may be configured to discard an instruction metadata tag received from the at least one cache for which it is determined a corresponding instruction was not executed by the processor.

In some embodiments, the at least one cache may be configured to: upon a store request with a store address and a store value, send an existing metadata word associated with the store address to the metadata processing system; buffer the store request in an interlock until the store request is validated by the metadata processing system; and upon validation of the store request by the metadata processing system, write the store value to the memory of the at least one cache.

In some embodiments, the at least one cache may be configured to, upon validation of the store request by the metadata processing system, write a metadata word to the memory of the at least one cache, in association with the store value.

Illustrative configurations of various aspects of the present disclosure are provided below.

1. A computer-implemented method for caching metadata, the method comprising acts of: in response to an access request comprising an application memory address, determining whether the application memory address matches an entry of at least one cache; in response to determining that the application memory address does not match any entry of the at least one cache: using the application memory address to retrieve application data; mapping the application memory address to at least one metadata memory address; and using the at least one metadata memory address to retrieve metadata corresponding to the application memory address; and creating an entry in the at least one cache, wherein: the entry is indexed by the application memory address; and the entry stores both the application data retrieved using the application memory address, and the corresponding metadata retrieved using the at least one metadata memory address.

2. The method of configuration 1, wherein: the application data is retrieved from at least one application memory; the corresponding metadata is retrieved from at least one metadata memory; and the at least one application memory and the at least one metadata memory are separate physical memories, or disjoint portions of a same physical memory.

3. The method of configuration 1, wherein: mapping the application memory address to at least one metadata memory address comprises using the application memory address to look up a tag map table; and the at least one metadata memory address is returned by the tag map table.

4. The method of configuration 1, wherein: the access request is received from a fetch stage of a processor pipeline; the application memory address comprises an instruction address; the at least one cache comprises an instruction cache; and the method further comprises acts of: returning the application data to the fetch stage as an instruction to be executed by the processor pipeline; and providing the metadata corresponding to the instruction address to a metadata processing system.

5. The method of configuration 1, wherein: the access request is received from an execute stage of a processor pipeline; the application memory address comprises a target address of a load instruction; the at least one cache comprises a data cache; and the method further comprises acts of: returning the application data to the execute stage as data loaded from the target address of the load instruction; and providing the metadata corresponding to the target address to a metadata processing system.

6. The method of configuration 5, wherein: the metadata retrieved using the at least one metadata memory address comprises first metadata corresponding to the application memory address; and the method further comprising acts of: receiving, from the metadata processing system, second metadata corresponding to the application memory address, the second metadata resulting from the metadata processing system checking the load instruction in accordance with one or more policies; and updating the entry indexed by the application memory address, comprising writing into the entry the second metadata received from the metadata processing system, replacing the first metadata retrieved using the at least one metadata memory address.

7. The method of configuration 1, wherein: the application data retrieved using the application memory address comprises first application data; the application memory address comprises a target address of a store instruction; the access request further comprises second application data, the second application data to be stored by the store instruction; the at least one cache comprises a data cache; and the method further comprises acts of: holding the application data to be stored in a buffer; providing the metadata corresponding to the application memory address to a metadata processing system; and in response to receiving, from the metadata processing system, an indication to allow the store instruction: releasing the second application data from the buffer; and writing the second application data into the entry indexed by the application memory address, replacing the first application data.

8. The method of configuration 7, wherein: the metadata provided to the metadata processing system comprises first metadata corresponding to the application memory address; the indication from the metadata processing system to allow the store instruction comprises second metadata corresponding to the application memory address, the second metadata resulting from the metadata processing system checking the store instruction in accordance with one or more policies; and the method further comprising an act of: writing the second metadata into the entry indexed by the application memory address, replacing the first metadata.

9. The method of configuration 1, wherein: the application memory address comprises a virtual address; determining whether the application memory address matches an entry of at least one cache comprises: matching the virtual address to a page table entry storing address translation information; and using the address translation information from the page table entry to map the virtual address to a physical address; the page table entry further stores metadata mapping information; and the application memory address is mapped to the at least one metadata memory address using the metadata mapping information from the page table entry.

10. The method of configuration 9, wherein: the metadata mapping information comprises an index identifying an entry in a tag map table; and the at least one metadata memory address is retrieved from the entry in the tag map table.

11. The method of configuration 1, wherein: the application memory address comprises a first application memory address; the at least one metadata memory address comprises at least one first metadata memory address; the method further comprising acts of: in response to determining that the application memory address does not match an entry of the at least one cache, determining whether any cache line matching one or more index bits of the application memory address is available; in response to determining that no cache line matching the one or more index bits of the application memory address is available, selecting, for eviction, a cache line matching the one or more index bits of the application memory address; and evicting the selected cache line, comprising: determining a second application memory address, the second application memory address being cached at the selected cache line; mapping the second application memory address to at least one second metadata memory address; using the second application memory address to write application data from the selected cache line to an application memory; and using the at least one second metadata memory address to write metadata from the selected cache line to a metadata memory; and the entry indexed by the application memory address is created at the selected cache line after the selected cache line has been evicted.

12. A computer-implemented method for caching metadata, the method comprising acts of: upon a cache miss, fetching application data and associated metadata from, respectively, a first address and a second address of the at least one memory, wherein the first and second addresses are not adjacent; storing the application data and the associated metadata in an entry of the at least one cache; and presenting the application data and the associated metadata to the processor and the metadata processing system, respectively.

13. The method of configuration 12, wherein: an association between the application data and the metadata is determined by a tag map table.

14. The method of configuration 13, wherein: the tag map table is embedded inside the at least one cache.

15. The method of configuration 13, wherein: the at least one cache comprises multiple caches, which share a common tag map table.

16. The method of configuration 12, wherein: the metadata processing system is part of the processor; and the processor is configured to wait until the metadata processing system has completed metadata processing for an instruction before the processor retires the instruction.

17. The method of configuration 12, wherein: the metadata processing system is external to the processor; the processor is configured to inform the metadata processing system which instructions the processor has retired; and the processor is configured to wait until the metadata processing system has completed the metadata processing for an instruction before the processor retires the instruction.

18. The method of configuration 12, wherein: the metadata processing system receives at least one instruction metadata tag and/or at least one data metadata tag from the at least one cache in response to a read or write request made by the processor.

19. The method of configuration 12, wherein: the metadata processing system is configured to discard an instruction metadata tag received from the at least one cache for which it is determined that a corresponding instruction was not retired by the processor.

20. A system comprising circuitry and/or one or more processors programmed by executable instructions, wherein the circuitry and/or the one or more programmed processors are configured to perform the method of any of configurations 1-19.

21. At least one computer-readable medium having stored thereon at least one netlist for the circuitry of configuration 20.

22. At least one computer-readable medium having stored thereon at least one hardware description that, when synthesized, produces the at least one netlist of configuration 20.

23. The at least one computer-readable medium of configuration 22, wherein the at least one hardware description is in an encrypted form.

24. At least one computer-readable medium having stored thereon the executable instructions of configuration 20.

Figure 14:
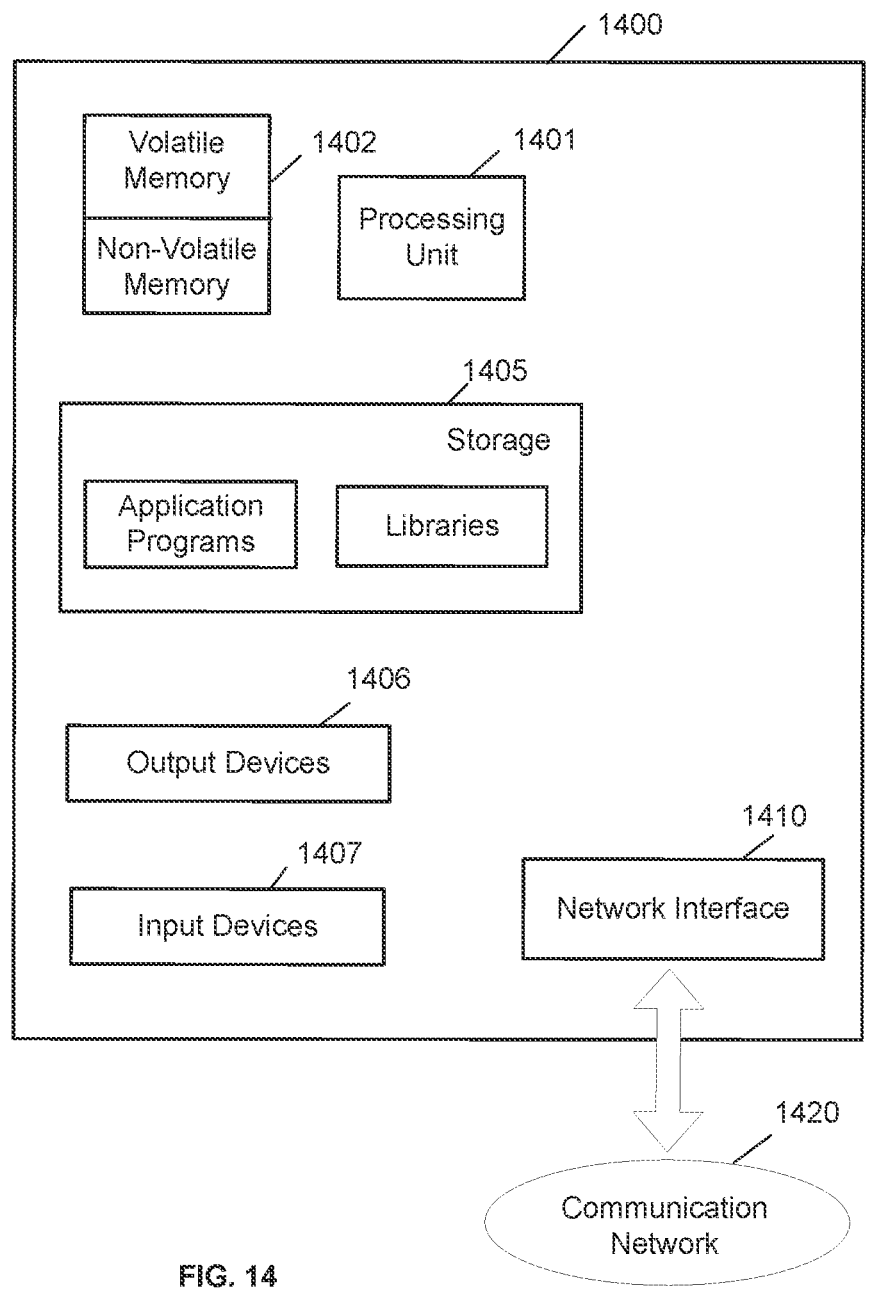
FIG. 14 shows, schematically, an illustrative computer 1400 on which any aspect of the present disclosure may be implemented.

FIG. 14 shows, schematically, an illustrative computer 1400 on which any aspect of the present disclosure may be implemented. In the example shown in FIG. 14, the computer 1400 includes a processing unit 1401 having one or more processors and a computer-readable storage medium 1402 that may include, for example, volatile and/or non-volatile memory. The memory 1402 may store one or more instructions to program the processing unit 1401 to perform any of the functions described herein. The computer 1400 may also include other types of computer-readable medium, such as storage 1405 (e.g., one or more disk drives) in addition to the system memory 1402. The storage 1405 may store one or more application programs and/or resources used by application programs (e.g., software libraries), which may be loaded into the memory 1402.

The computer 1400 may have one or more input devices and/or output devices, such as output devices 1406 and input devices 1407 illustrated in FIG. 14. These devices may be used, for instance, to present a user interface. Examples of output devices that may be used to provide a user interface include printers, display screens, and other devices for visual output, speakers and other devices for audible output, braille displays and other devices for haptic output, etc. Examples of input devices that may be used for a user interface include keyboards, pointing devices (e.g., mice, touch pads, and digitizing tablets), microphones, etc. For instance, the input devices 1407 may include a microphone for capturing audio signals, and the output devices 1406 may include a display screen for visually rendering, and/or a speaker for audibly rendering, recognized text.

In the example of FIG. 14, the computer 1400 may also include one or more network interfaces (e.g., network interface 1410) to enable communication via various networks (e.g., communication network 1420). Examples of networks include local area networks (e.g., an enterprise network), wide area networks (e.g., the Internet), etc. Such networks may be based on any suitable technology, and may operate according to any suitable protocol. For instance, such networks may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure may be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple non-transitory computer-readable media) (e.g., a computer memory, one or more floppy discs, compact discs, optical discs, magnetic tapes, flash memories, circuit configurations in Field Programmable Gate Arrays or other semiconductor devices, or other tangible computer-readable media) encoded with one or more programs that, when executed on one or more processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey how the fields are related. However, any suitable mechanism may be used to relate information in fields of a data structure, including through the use of pointers, tags, or other mechanisms that how the data elements are related.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," "based on," "according to," "encoding," and variations thereof herein, is meant to encompass the items listed thereafter and equivalents thereof as well as additional items.

What is claimed is:

1. A computer-implemented method for caching metadata, the method comprising acts of:

in response to an access request comprising an application memory address, determining whether the application memory address matches an entry of at least one cache;

in response to determining that the application memory address does not match any entry of the at least one cache:
  using the application memory address to retrieve application data;
  mapping the application memory address to at least one metadata memory address; and
  using the at least one metadata memory address to retrieve metadata corresponding to the application memory address; and creating an entry in the at least one cache, wherein:
  the entry is indexed by the application memory address; and
  the entry stores both the application data retrieved using the application memory address, and the corresponding metadata retrieved using the at least one metadata memory address.

2. The method of claim 1, wherein:
the application data is retrieved from at least one application memory;
the corresponding metadata is retrieved from at least one metadata memory; and
the at least one application memory and the at least one metadata memory are separate physical memories, or disjoint portions of a same physical memory.

3. The method of claim 1, wherein:
mapping the application memory address to at least one metadata memory address comprises using the application memory address to look up a tag map table; and
the at least one metadata memory address is returned by the tag map table.

4. The method of claim 1, wherein:
the access request is received from a fetch stage of a processor pipeline;
the application memory address comprises an instruction address;
the at least one cache comprises an instruction cache; and
the method further comprises acts of:
  returning the application data to the fetch stage as an instruction to be executed by the processor pipeline; and
  providing the metadata corresponding to the instruction address to a metadata processing system.

5. The method of claim 1, wherein:
the access request is received from an execute stage of a processor pipeline;
the application memory address comprises a target address of a load instruction;
the at least one cache comprises a data cache; and
the method further comprises acts of:
  returning the application data to the execute stage as data loaded from the target address of the load instruction; and
  providing the metadata corresponding to the target address to a metadata processing system.

6. The method of claim 5, wherein:
the metadata retrieved using the at least one metadata memory address comprises first metadata corresponding to the application memory address; and
the method further comprising acts of:
  receiving, from the metadata processing system, second metadata corresponding to the application memory address, the second metadata resulting from the metadata processing system checking the load instruction in accordance with one or more policies; and updating the entry indexed by the application memory address, comprising writing into the entry the second metadata received from the metadata processing system, replacing the first metadata retrieved using the at least one metadata memory address.

7. The method of claim 1, wherein:
the application data retrieved using the application memory address comprises first application data;
the application memory address comprises a target address of a store instruction;
the access request further comprises second application data, the second application data to be stored by the store instruction;
the at least one cache comprises a data cache; and
the method further comprises acts of:
  holding the application data to be stored in a buffer;
  providing the metadata corresponding to the application memory address to a metadata processing system; and
  in response to receiving, from the metadata processing system, an indication to allow the store instruction:
    releasing the second application data from the buffer; and
    writing the second application data into the entry indexed by the application memory address, replacing the first application data.

8. The method of claim 7, wherein:
the metadata provided to the metadata processing system comprises first metadata corresponding to the application memory address;
the indication from the metadata processing system to allow the store instruction comprises second metadata corresponding to the application memory address, the second metadata resulting from the metadata processing system checking the store instruction in accordance with one or more policies; and
the method further comprising an act of:
  writing the second metadata into the entry indexed by the application memory address, replacing the first metadata.

9. The method of claim 1, wherein:
the application memory address comprises a virtual address;
determining whether the application memory address matches an entry of at least one cache comprises:
  matching the virtual address to a page table entry storing address translation information; and
  using the address translation information from the page table entry to map the virtual address to a physical address;
the page table entry further stores metadata mapping information; and
the application memory address is mapped to the at least one metadata memory address using the metadata mapping information from the page table entry.

10. The method of claim 9, wherein:
the metadata mapping information comprises an index identifying an entry in a tag map table; and
the at least one metadata memory address is retrieved from the entry in the tag map table.

11. The method of claim 1, wherein:
the application memory address comprises a first application memory address;

the at least one metadata memory address comprises at least one first metadata memory address;
the method further comprising acts of:
  in response to determining that the application memory address does not match an entry of the at least one cache, determining whether any cache line matching one or more index bits of the application memory address is available;
  in response to determining that no cache line matching the one or more index bits of the application memory address is available, selecting, for eviction, a cache line matching the one or more index bits of the application memory address; and
  evicting the selected cache line, comprising:
    determining a second application memory address, the second application memory address being cached at the selected cache line;
    mapping the second application memory address to at least one second metadata memory address;
    using the second application memory address to write application data from the selected cache line to an application memory; and
    using the at least one second metadata memory address to write metadata from the selected cache line to a metadata memory; and
  the entry indexed by the application memory address is created at the selected cache line after the selected cache line has been evicted.

12. A system comprising circuitry and/or one or more processors programmed by executable instructions, wherein the circuitry and/or the one or more programmed processors are configured to:
  in response to an access request comprising an application memory address, determine whether the application memory address matches an entry of at least one cache;
  in response to determining that the application memory address does not match any entry of the at least one cache:
    use the application memory address to retrieve application data;
    map the application memory address to at least one metadata memory address; and
    use the at least one metadata memory address to retrieve metadata corresponding to the application memory address; and
  create an entry in the at least one cache, wherein:
    the entry is indexed by the application memory address; and
    the entry stores both the application data retrieved using the application memory address, and the corresponding metadata retrieved using the at least one metadata memory address.

13. The system of claim 12, wherein:
the application data is retrieved from at least one application memory;
the corresponding metadata is retrieved from at least one metadata memory; and
the at least one application memory and the at least one metadata memory are separate physical memories, or disjoint portions of a same physical memory.

14. The system of claim 12, wherein:
the circuitry and/or the one or more programmed processors are configured to map the application memory address to at least one metadata memory address at least in part by using the application memory address to look up a tag map table; and the at least one metadata memory address is returned by the tag map table.

15. The system of claim 12, wherein:
the access request is received from a fetch stage of a processor pipeline;
the application memory address comprises an instruction address;
the at least one cache comprises an instruction cache; and
the circuitry and/or the one or more programmed processors are further configured to:
  return the application data to the fetch stage as an instruction to be executed by the processor pipeline; and
  provide the metadata corresponding to the instruction address to a metadata processing system.

16. The system of claim 12, wherein:
the access request is received from an execute stage of a processor pipeline;
the application memory address comprises a target address of a load instruction;
the at least one cache comprises a data cache; and
the circuitry and/or the one or more programmed processors are further configured to:
  return the application data to the execute stage as data loaded from the target address of the load instruction; and
  provide the metadata corresponding to the target address to a metadata processing system.

17. The system of claim 16, wherein:
the metadata retrieved using the at least one metadata memory address comprises first metadata corresponding to the application memory address; and
the circuitry and/or the one or more programmed processors are further configured to:
  receive, from the metadata processing system, second metadata corresponding to the application memory address, the second metadata resulting from the metadata processing system checking the load instruction in accordance with one or more policies; and
  update the entry indexed by the application memory address, at least in part by writing into the entry the second metadata received from the metadata processing system, replacing the first metadata retrieved using the at least one metadata memory address.

18. The system of claim 12, wherein:
the application data retrieved using the application memory address comprises first application data;
the application memory address comprises a target address of a store instruction;
the access request further comprises second application data, the second application data to be stored by the store instruction;
the at least one cache comprises a data cache; and
the circuitry and/or the one or more programmed processors are further configured to:
  hold the application data to be stored in a buffer;
  provide the metadata corresponding to the application memory address to a metadata processing system; and
  in response to receiving, from the metadata processing system, an indication to allow the store instruction:
    release the second application data from the buffer; and
    write the second application data into the entry indexed by the application memory address, replacing the first application data.

19. The system of claim 18, wherein:
the metadata provided to the metadata processing system comprises first metadata corresponding to the application memory address;
the indication from the metadata processing system to allow the store instruction comprises second metadata corresponding to the application memory address, the second metadata resulting from the metadata processing system checking the store instruction in accordance with one or more policies; and
the circuitry and/or the one or more programmed processors are further configured to:
  write the second metadata into the entry indexed by the application memory address, replacing the first metadata.

20. The system of claim 12, wherein:
the application memory address comprises a virtual address;
the circuitry and/or the one or more programmed processors are configured to determine whether the application memory address matches an entry of at least one cache at least in part by:
  matching the virtual address to a page table entry storing address translation information; and
  using the address translation information from the page table entry to map the virtual address to a physical address;
the page table entry further stores metadata mapping information; and
the application memory address is mapped to the at least one metadata memory address using the metadata mapping information from the page table entry.

21. The system of claim 20, wherein:
the metadata mapping information comprises an index identifying an entry in a tag map table; and
the at least one metadata memory address is retrieved from the entry in the tag map table.

22. The system of claim 12, wherein:
the application memory address comprises a first application memory address;
the at least one metadata memory address comprises at least one first metadata memory address;
the circuitry and/or the one or more programmed processors are further configured to:
  in response to determining that the application memory address does not match an entry of the at least one cache, determine whether any cache line matching one or more index bits of the application memory address is available;
  in response to determining that no cache line matching the one or more index bits of the application memory address is available, select, for eviction, a cache line matching the one or more index bits of the application memory address; and
  evict the selected cache line, at least in part by:
    determining a second application memory address, the second application memory address being cached at the selected cache line;
    mapping the second application memory address to at least one second metadata memory address;
    using the second application memory address to write application data from the selected cache line to an application memory; and
    using the at least one second metadata memory address to write metadata from the selected cache line to a metadata memory; and the entry indexed by the application memory address is created at the selected cache line after the selected cache line has been evicted.

23. At least one non-transitory computer-readable medium having stored thereon at least one hardware description for circuitry, wherein the circuitry is configured to:
in response to an access request comprising an application memory address, determine whether the application memory address matches an entry of at least one cache;
in response to determining that the application memory address does not match any entry of the at least one cache:
use the application memory address to retrieve application data;
map the application memory address to at least one metadata memory address; and
use the at least one metadata memory address to retrieve metadata corresponding to the application memory address; and
create an entry in the at least one cache, wherein:
the entry is indexed by the application memory address; and
the entry stores both the application data retrieved using the application memory address, and the corresponding metadata retrieved using the at least one metadata memory address.

24. The at least one non-transitory computer-readable medium of claim 23, wherein the at least one hardware description is in an encrypted form.

25. The at least one non-transitory computer-readable medium of claim 23, wherein the at least one hardware description, when synthesized, produces at least one netlist for the circuitry.

* * * * *